(12) United States Patent
Burroughs et al.

(10) Patent No.: US 7,884,816 B2
(45) Date of Patent: Feb. 8, 2011

(54) CORRECTING PYRAMIDAL ERROR OF POLYGON SCANNER IN SCANNING BEAM DISPLAY SYSTEMS

(75) Inventors: Alan C. Burroughs, San Jose, CA (US); Mark A. Pajdowski, Los Gatos, CA (US); David L. Kent, Framingham, MA (US); Roger A. Hajjar, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 276 days.

(21) Appl. No.: 11/610,479

(22) Filed: Dec. 13, 2006

(65) Prior Publication Data

US 2007/0187616 A1 Aug. 16, 2007

Related U.S. Application Data

(63) Continuation-in-part of application No. 11/515,420, filed on Sep. 1, 2006.

(60) Provisional application No. 60/773,993, filed on Feb. 15, 2006, provisional application No. 60/776,553, filed on Feb. 24, 2006, provisional application No. 60/779,261, filed on Mar. 3, 2006, provisional application No. 60/800,870, filed on May 15, 2006.

(51) Int. Cl.
G09G 5/00 (2006.01)
(52) U.S. Cl. .................... 345/213; 345/32
(58) Field of Classification Search .............. 345/10, 345/213, 32
See application file for complete search history.

(56) References Cited

U.S. PATENT DOCUMENTS 2,439,181 A 5/1946 Nicoll
3,025,161 A 3/1962 Thaddeus
3,556,637 A 1/1971 Palmquist
3,652,956 A 3/1972 Pinnow et al.
3,691,482 A 9/1972 Pinnow et al.
3,750,189 A * 7/1973 Fleischer .................... 347/137
4,165,154 A 8/1979 Takahashi
4,166,233 A 8/1979 Stanley
4,307,320 A 12/1981 Kotera et al.
4,401,362 A 8/1983 Maeda (Continued)

FOREIGN PATENT DOCUMENTS

DE 10044603 4/2001

(Continued)

OTHER PUBLICATIONS

"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].

(Continued)

*Primary Examiner*—Alexander Eisen
*Assistant Examiner*—Stuart McCommas
(74) *Attorney, Agent, or Firm*—Fish & Richardson P.C.

(57) ABSTRACT

Scanning beam display systems using fluorescent screens and various servo feedback control mechanisms to control display imaging qualities, including techniques and mechanism for measuring and correcting pyramidal errors of a polygon scanner.

30 Claims, 40 Drawing Sheets

U.S. PATENT DOCUMENTS

| | | | |
|---|---|---|---|
| 4,512,911 A | 4/1985 | Kotera et al. | |
| 4,613,201 A | 9/1986 | Shortle et al. | |
| 4,624,528 A | 11/1986 | Brueggemann | |
| 4,661,419 A | 4/1987 | Nakamura | |
| 4,707,093 A | 11/1987 | Testa | |
| 4,737,840 A | 4/1988 | Morishita | |
| 4,816,920 A | 3/1989 | Paulsen | |
| 4,923,262 A | 5/1990 | Clay | |
| 4,978,202 A | 12/1990 | Yang | |
| 4,979,030 A | 12/1990 | Murata | |
| 5,054,866 A | 10/1991 | Tomita et al. | |
| 5,080,467 A | 1/1992 | Kahn et al. | |
| 5,089,907 A | 2/1992 | Yoshikawa et al. | |
| 5,094,788 A | 3/1992 | Schrenk et al. | |
| 5,122,905 A | 6/1992 | Wheatley et al. | |
| 5,136,426 A | 8/1992 | Linden et al. | |
| 5,138,441 A | 8/1992 | Tanaka | |
| 5,140,604 A | 8/1992 | Alablanche et al. | |
| 5,146,355 A | 9/1992 | Prince et al. | |
| 5,166,944 A | 11/1992 | Conemac | |
| 5,175,637 A | 12/1992 | Jones et al. | |
| 5,182,659 A | 1/1993 | Clay et al. | |
| 5,198,679 A | 3/1993 | Katoh et al. | |
| 5,255,113 A | 10/1993 | Yoshikawa et al. | |
| 5,269,995 A | 12/1993 | Ramanathan et al. | |
| 5,270,842 A | 12/1993 | Clay et al. | |
| 5,296,922 A | 3/1994 | Mitani et al. | |
| 5,365,288 A | 11/1994 | Dewald et al. | |
| 5,389,324 A | 2/1995 | Lewis et al. | |
| 5,414,521 A | 5/1995 | Ansley | |
| 5,442,254 A | 8/1995 | Jaskie | |
| 5,473,396 A | 12/1995 | Okajima et al. | |
| 5,475,524 A | 12/1995 | Harris | |
| 5,477,285 A | 12/1995 | Riddle et al. | |
| 5,477,330 A * | 12/1995 | Dorr | 358/296 |
| 5,491,578 A | 2/1996 | Harris | |
| 5,526,166 A | 6/1996 | Genovese | |
| 5,541,731 A | 7/1996 | Freedenberg et al. | |
| 5,550,667 A | 8/1996 | Krimmel et al. | |
| 5,587,818 A | 12/1996 | Lee | |
| 5,594,556 A * | 1/1997 | Vronsky et al. | 358/482 |
| 5,598,292 A | 1/1997 | Yoshikawa et al. | |
| 5,602,445 A | 2/1997 | Solanki et al. | |
| 5,614,961 A | 3/1997 | Gibeau et al. | |
| 5,633,736 A | 5/1997 | Griffith et al. | |
| 5,646,766 A | 7/1997 | Conemac | |
| 5,648,181 A | 7/1997 | Watanabe | |
| 5,666,174 A | 9/1997 | Cupolo, III | |
| 5,668,662 A | 9/1997 | Magocs et al. | |
| 5,670,209 A | 9/1997 | Wyckoff | |
| 5,684,552 A | 11/1997 | Miyamoto et al. | |
| 5,698,857 A | 12/1997 | Lambert et al. | |
| 5,715,021 A | 2/1998 | Gibeau et al. | |
| 5,716,118 A | 2/1998 | Sato et al. | |
| 5,870,224 A | 2/1999 | Saitoh et al. | |
| 5,882,774 A | 3/1999 | Jonza et al. | |
| 5,907,312 A | 5/1999 | Sato et al. | |
| 5,920,361 A | 7/1999 | Gibeau et al. | |
| 5,959,296 A * | 9/1999 | Cyr et al. | 250/271 |
| 5,973,813 A | 10/1999 | Takeuchi | |
| 5,976,424 A | 11/1999 | Weber et al. | |
| 5,978,142 A | 11/1999 | Blackham et al. | |
| 5,994,722 A | 11/1999 | Averbeck et al. | |
| 5,998,918 A | 12/1999 | Do et al. | |
| 5,998,925 A | 12/1999 | Shimizu et al. | |
| 6,008,925 A | 12/1999 | Conemac | |
| 6,010,751 A | 1/2000 | Shaw et al. | |
| 6,057,953 A | 5/2000 | Ang | |
| 6,064,417 A | 5/2000 | Harrigan et al. | |
| 6,066,861 A | 5/2000 | Hohn et al. | |
| 6,069,599 A | 5/2000 | Py et al. | |
| 6,080,467 A | 6/2000 | Weber et al. | |
| 6,088,163 A | 7/2000 | Gilbert et al. | |
| 6,101,032 A | 8/2000 | Wortman et al. | |
| 6,117,530 A | 9/2000 | Jonza et al. | |
| 6,118,516 A | 9/2000 | Irie et al. | |
| 6,128,131 A | 10/2000 | Tang | |
| 6,134,050 A | 10/2000 | Conemac | |
| 6,137,461 A * | 10/2000 | Deter et al. | 345/84 |
| 6,154,259 A | 11/2000 | Hargis et al. | |
| 6,157,490 A | 12/2000 | Wheatley et al. | |
| 6,172,810 B1 | 1/2001 | Fleming et al. | |
| 6,175,440 B1 | 1/2001 | Conemac | |
| 6,219,168 B1 | 4/2001 | Wang | |
| 6,224,216 B1 | 5/2001 | Parker | |
| 6,226,126 B1 | 5/2001 | Conemac | |
| 6,252,254 B1 | 6/2001 | Soules et al. | |
| 6,255,670 B1 | 7/2001 | Srivastava et al. | |
| 6,276,802 B1 | 8/2001 | Naito | |
| 6,288,817 B2 | 9/2001 | Rowe | |
| 6,329,966 B1 | 12/2001 | Someya et al. | |
| 6,333,724 B1 | 12/2001 | Taira et al. | |
| 6,417,019 B1 | 7/2002 | Mueller et al. | |
| 6,429,583 B1 | 8/2002 | Levinson et al. | |
| 6,429,584 B2 | 8/2002 | Kubota | |
| 6,463,585 B1 | 10/2002 | Hendricks et al. | |
| 6,531,230 B1 | 3/2003 | Weber et al. | |
| 6,576,156 B1 | 6/2003 | Ratna et al. | |
| 6,621,593 B1 | 9/2003 | Wang et al. | |
| 6,621,609 B1 | 9/2003 | Conemac | |
| 6,627,060 B1 | 9/2003 | Yum et al. | |
| 6,628,248 B2 | 9/2003 | Masumoto et al. | |
| 6,678,081 B2 | 1/2004 | Nishihata et al. | |
| 6,717,704 B2 | 4/2004 | Nakai | |
| 6,765,237 B1 | 7/2004 | Doxsee et al. | |
| 6,777,861 B2 | 8/2004 | Russ et al. | |
| 6,809,347 B2 | 10/2004 | Tasch et al. | |
| 6,809,781 B2 | 10/2004 | Setlur et al. | |
| 6,839,042 B2 | 1/2005 | Conemac et al. | |
| 6,853,131 B2 | 2/2005 | Srivastava et al. | |
| 6,900,916 B2 | 5/2005 | Okazaki et al. | |
| 6,905,220 B2 | 6/2005 | Wortman et al. | |
| 6,937,221 B2 | 8/2005 | Lippert et al. | |
| 6,937,383 B2 | 8/2005 | Morikawa et al. | |
| 6,947,198 B2 | 9/2005 | Morikawa et al. | |
| 6,986,581 B2 | 1/2006 | Sun et al. | |
| 6,987,610 B2 | 1/2006 | Piehl | |
| 7,068,406 B2 | 6/2006 | Shimomura | |
| 7,088,335 B2 | 8/2006 | Hunter et al. | |
| 7,090,355 B2 | 8/2006 | Liu et al. | |
| 7,147,802 B2 | 12/2006 | Sugimoto et al. | |
| 7,181,417 B1 | 2/2007 | Langseth et al. | |
| 7,213,923 B2 | 5/2007 | Liu et al. | |
| 7,230,767 B2 | 6/2007 | Walck et al. | |
| 7,239,436 B2 * | 7/2007 | Oettinger et al. | 359/214 |
| 7,283,301 B2 * | 10/2007 | Peeters et al. | 359/443 |
| 7,302,174 B2 | 11/2007 | Tan et al. | |
| 7,474,286 B2 | 1/2009 | Hajjar et al. | |
| 2001/0019240 A1 | 9/2001 | Takahashi | |
| 2001/0024086 A1 | 9/2001 | Fox et al. | |
| 2001/0050371 A1 | 12/2001 | Odaki et al. | |
| 2002/0003233 A1 | 1/2002 | Mueller-Mach et al. | |
| 2002/0008854 A1 | 1/2002 | Leigh Travis | |
| 2002/0024495 A1 | 2/2002 | Lippert et al. | |
| 2002/0041418 A1 * | 4/2002 | Fillion et al. | 359/201 |
| 2002/0050963 A1 | 5/2002 | Conemac et al. | |
| 2002/0122260 A1 | 9/2002 | Okazaki et al. | |
| 2002/0124250 A1 | 9/2002 | Proehl et al. | |
| 2002/0145685 A1 | 10/2002 | Mueller-Mach et al. | |
| 2002/0163702 A1 | 11/2002 | Hori et al. | |
| 2002/0185965 A1 | 12/2002 | Collins et al. | |
| 2003/0015692 A1 | 1/2003 | Teng et al. | |
| 2003/0094893 A1 | 5/2003 | Ellens et al. | |
| 2003/0184209 A1 | 10/2003 | Russ et al. | |

| | | | | | |
|---|---|---|---|---|---|
| 2003/0184531 A1 | 10/2003 | Morikawa et al. | WO | WO 92/22109 | 12/1992 |
| 2003/0184613 A1 | 10/2003 | Nakamura et al. | WO | WO 00/20912 | 4/2000 |
| 2003/0184842 A1 | 10/2003 | Morikawa et al. | WO | WO 00/33389 | 6/2000 |
| 2004/0027465 A1 | 2/2004 | Smith et al. | WO | WO 01/24229 | 4/2001 |
| 2004/0070551 A1 | 4/2004 | Walck et al. | WO | WO 01/88609 | 11/2001 |
| 2004/0141220 A1 | 7/2004 | Hama et al. | WO | WO 02/11173 | 2/2002 |
| 2004/0145312 A1 | 7/2004 | Ouderkirk et al. | WO | WO 02/23962 | 3/2002 |
| 2004/0156079 A1 | 8/2004 | Marshall et al. | WO | WO 02/33970 | 4/2002 |
| 2004/0160516 A1 | 8/2004 | Ford | WO | WO 02/057838 | 7/2002 |
| 2004/0165642 A1 * | 8/2004 | Lamont ............... 372/107 | WO | WO 02/071148 | 9/2002 |
| 2004/0184123 A1 | 9/2004 | Morikawa et al. | WO | WO 2005/119797 | 12/2005 |
| 2004/0223100 A1 | 11/2004 | Kotchick et al. | WO | WO 2006/097876 | 9/2006 |
| 2004/0227465 A1 | 11/2004 | Menkara et al. | WO | WO 2006/107720 | 10/2006 |
| 2004/0263074 A1 | 12/2004 | Baroky et al. | WO | WO 2007/050662 | 5/2007 |
| 2005/0001225 A1 | 1/2005 | Yoshimura et al. | WO | WO 2007/095329 | 8/2007 |
| 2005/0012446 A1 | 1/2005 | Jermann et al. | WO | WO 2007/114918 | 10/2007 |
| 2005/0023962 A1 | 2/2005 | Menkara et al. | WO | WO 2007/131195 | 11/2007 |
| 2005/0023963 A1 | 2/2005 | Menkara et al. | WO | WO 2007/134329 | 11/2007 |
| 2005/0051790 A1 | 3/2005 | Ueda | WO | WO 2008/116123 | 9/2008 |
| 2005/0093818 A1 | 5/2005 | Hatam-Tabrizi et al. | WO | WO 2008/124707 | 10/2008 |
| 2005/0094266 A1 | 5/2005 | Liu et al. | WO | WO 2008/144673 | 11/2008 |
| 2006/0050015 A1 | 3/2006 | Kusunoki et al. | WO | WO 2009/003192 | 12/2008 |
| 2006/0066508 A1 | 3/2006 | Walck et al. | | | |
| 2006/0081793 A1 | 4/2006 | Nestorovic et al. | | | |
| 2006/0082873 A1 | 4/2006 | Allen et al. | | | |
| 2006/0088951 A1 | 4/2006 | Hayashi et al. | | | |
| 2006/0132021 A1 | 6/2006 | Naberhuis et al. | | | |
| 2006/0139580 A1 | 6/2006 | Conner | | | |
| 2006/0197922 A1 | 9/2006 | Liu et al. | | | |
| 2006/0221021 A1 | 10/2006 | Hajjar et al. | | | |
| 2006/0221022 A1 | 10/2006 | Hajjar | | | |
| 2006/0227087 A1 | 10/2006 | Hajjar et al. | | | |
| 2006/0262243 A1 | 11/2006 | Lester et al. | | | |
| 2006/0266958 A1 | 11/2006 | Shimizu et al. | | | |
| 2006/0290898 A1 | 12/2006 | Liu et al. | | | |
| 2007/0014318 A1 | 1/2007 | Hajjar et al. | | | |
| 2007/0183466 A1 | 8/2007 | Son et al. | | | |
| 2007/0187580 A1 | 8/2007 | Kykta et al. | | | |
| 2007/0188417 A1 | 8/2007 | Hajjar et al. | | | |
| 2007/0206258 A1 | 9/2007 | Malyak et al. | | | |
| 2007/0228927 A1 | 10/2007 | Kindler et al. | | | |
| 2007/0229946 A1 | 10/2007 | Okada et al. | | | |
| 2008/0018558 A1 | 1/2008 | Kykta et al. | | | |
| 2008/0066107 A1 | 3/2008 | Moonka et al. | | | |
| 2008/0068295 A1 | 3/2008 | Hajjar | | | |
| 2008/0235749 A1 | 9/2008 | Jain et al. | | | |
| 2008/0247020 A1 | 10/2008 | Malyak et al. | | | |
| 2008/0291140 A1 | 11/2008 | Kent et al. | | | |
| 2009/0001272 A1 | 1/2009 | Hajjar | | | |
| 2009/0116107 A1 | 5/2009 | Kindler et al. | | | |
| 2009/0153582 A1 | 6/2009 | Hajjar et al. | | | |
| 2009/0174632 A1 | 7/2009 | Hajjar et al. | | | |

FOREIGN PATENT DOCUMENTS

| | | |
|---|---|---|
| EP | 0196862 | 10/1986 |
| EP | 0271650 | 6/1988 |
| EP | 1150361 | 10/2001 |
| JP | 56164826 | 12/1981 |
| JP | 59-155826 | 9/1984 |
| JP | 02-157790 | 6/1990 |
| JP | 2-199975 | 8/1990 |
| JP | 5232583 | 9/1993 |
| JP | 6-46461 | 2/1994 |
| JP | 2000-49380 | 2/2000 |
| JP | 2001-210122 | 8/2001 |
| JP | 2001-316664 | 11/2001 |
| JP | 2002-83549 | 3/2002 |
| JP | 2006-323391 | 11/2006 |
| KR | 10-2001-0097415 | 11/2001 |
| KR | 2002-0024425 | 3/2002 |
| KR | 2003-0068589 | 8/2003 |
| WO | WO 90/12387 | 10/1990 |

OTHER PUBLICATIONS

"Quantum Dots Explained," http://www.evidenttech.com/quantum-dots-explained.html (1 page) [accessed May 27, 2008].

"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].

Collins et al., "Process Control of the Chlorobenzene Single-Step Liftoff Process with a Diazo-Type Resist," IBM J. Res. Develop. 26(5): 596-604 (Sep. 1982).

Cusano, D.A., "Cathodo-, Photo-, and D.C.-Electroluminescence in Zinc Sulfide Layers," Luminescence of Organic and Inorganic Materials, Kallman, H.P. and G.M. Spruch (Eds.), New York University, pp. 494-522 (1962).

Daud, A. et al., "Transparent $Y_2O_2S:Eu^{3+}$ phosphor thin films grown by reactive evaporation and their luminescent properties," Journal of the Society for Information Display (SID), vol. 4, No. 3, pp. 193-196 (1996).

Donofrio, R.L. and C.H. Rehkopf," Screen Weight Optimization," Journal of the Electrochemical Society, vol. 126, No. 9, pp. 1563-1567 (Sep. 1979).

Greer, J.A. et al., "38.4:P-53 Thin Film Phosphors Prepared by Pulsed—Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).

International Search Report and Written Opinion dated Aug. 29, 2008, for PCT/US2008/059603, filed Apr. 7, 2008, entitled: "Post-Objective Scanning Beam Systems".

International Search Report and Written Opinion dated Jul. 20, 2006 and International Preliminary Report on Patentability for dated Oct. 3, 2007 for PCT/US2006/11757, now WO 2006/107720, published on Oct. 12, 2006, entitled: "Display Systems and Devices Having Screens with Optical Fluorescent Materials".

International Search Report and Written Opinion dated Jun. 27, 2008 for PCT/US2008/057763, filed Mar. 20, 2008, entitled: "Delivering and Displaying Advertisement or Other Application Data to Display Systems".

International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Florescent Screens".

International Search Report and Written Opinion dated May 28, 2008 for PCT/US06/41584, now WO 2007/050662, published on May 3, 2007, entitled: "Optical Designs for Scanning Beam Display Systems Using Fluorescent Screens," 9 pages.

Kalkhoran, N.M. et al., "LP-E: *Late News Poster*: Luminescence Study of Ion-Implanted $ZnGa_2O_4$ Thin Films on Flexible Organic Substrates," 1997 SID International Symposium Digest of Technical Papers (SID '97 Digest), vol. XXVIII, pp. 632-636 (May 1997).

Kim, J.M. et al. "6.3: Development of 4-in. Full Color FED, Devices," 1997 SID International Symposium Digest of Technical Papers ( SID '97 Digest), vol. XVIII, pp. 56-59 (May 1997).

Kramer, C.J., "Hologon deflectors for graphic arts applications: an overview," SPIE Proceedings on Beam Deflection and Scanning Technologies 1454: 68-100 (1991).

Kramer, C.J., "Hologon deflectors incorporating dispersive optical elements for scan line bow correction," SPIE Proceedings on Holographic Optics: Design and Applications, 883: 230-244 (1988).

Loewen, E.G. et al., "Grating efficiency theory as it applies to blazed and holographic gratings," Applied Optics, vol. 16, No. 10, p. 2711-2721 (Oct. 1977).

McDonald, L. W. and A. C. Lowe (Eds.), *Display Systems, Design Applications*, John Wiley & Sons: Chichester, England, pp. 195-196 (1997).

Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).

Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Pringsheim, P. and M.Vogel, *Luminescence of Liquids and Solids and its Practical Applications*, Interscience Publishers, Inc.: New York, N.Y., pp. 144-145 (1946).

Rowe, D.M., "Developments in holographic-based scanner designs," Proc. SPIE, Optical Scanning Systems: Design and Applications, Leo Beiser and Stephen F. Sagan, Eds. vol. 3131: 52-58 (1997).

Rynearson, R.L. et al., "Low-cost, mechanically rigid, high-aspect-ratio mirrors," SPIE Proceedings on Design, Fabrication, and Applications of Precision Plastics Optics 2600: 137-143 (1995).

Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).

Schlesinger et al., "Screening," Design, Development, and Fabrication of Ultra-High-Resolution Cathode Ray tube. Technial Report ECOM-00476, pp. 64-72, Feb. 1969.

Smith, D.C. et. al., "32.5: Late-News Paper: Crystalline-As-Deposited $CaGa_2S_4$:Ce via Low Temperature Metal Organic Chemical Vapor Deposition," 1995 SID International Symposium Digest of Technical Papers (SID '95 Digest), vol. XXVI, pp. 728-731 (May 1995).

Smith, W.J., "Scanner/f-0 and Laser Disk Collimator Lenses," Chapter 22 in Modern Lens Design: A Resource Manual, pp. 411-430, Boston, Mass.: McGraw-Hill, Inc., 1992.

Withnall et al., "Studies of UV stimulated luminescence from phosphors of commercial importance," Central Laser Facility Annual Report 2004/2005 http://www.clf.rl.ac.uk/Reports/2004-2005/pdf/64.pdf [accessed on Mary 23, 2008], 2 pages.

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).

Županc-Mežnar, L. and M. Žumer, "26.4:Preparation of P43 Suspension and Screen-Quality Evaluation in 1 -in. CRTs", 1997 SID International Symposium Digest of Technial Papers ( SID '97 Digest), vol. XVIII, pp. 440-443 (May 1997).

Supplementary European Search Report dated Jul. 29, 2009 for European Patent Application No. 06836510.5 (6 pages).

Supplementary European Search Report dated Mar. 25, 2009 for European Patent Application No. 06740108.3 (7 pages).

The Korean Intellectual Property Office, Office Action dated Mar. 31, 2009 for Korean Patent Application No. 10-2007-7025455 (4 pages).

English language translation of the The Korean Intellectual Property Office, Office Action dated Mar. 31, 2009 for Korean Patent Application No. 10-2007-7025455 (4 pages).

International Search Report and Written Opinion dated Nov. 24, 2008 for PCT/US07/68989, now WO 2007/134329, published on Nov. 22, 2007 and entitled: "Multilayered Fluorescent Screens for Scanning Beam Display Systems" 9 pages.

International Search Report and Written Opinion dated Nov. 28, 2008 for PCT/US2008/064169, now WO 2008/144673, published on Nov. 27, 2007 and entitled: "Multilayered Screens with Light-Emitting Stripes for Scanning Beam Display Systems" 9 pages.

International Search Report and Written Opinion dated Nov. 26, 2008 for PCT/US2008/068679, now WO 2009/003192, published on Dec. 31, 2008 and entitled: "Servo Feedback Control Based On Designated Scanning Servo Beam In Scanning Beam Display Systems With Light-Emitting Screens" 11 pages.

* cited by examiner

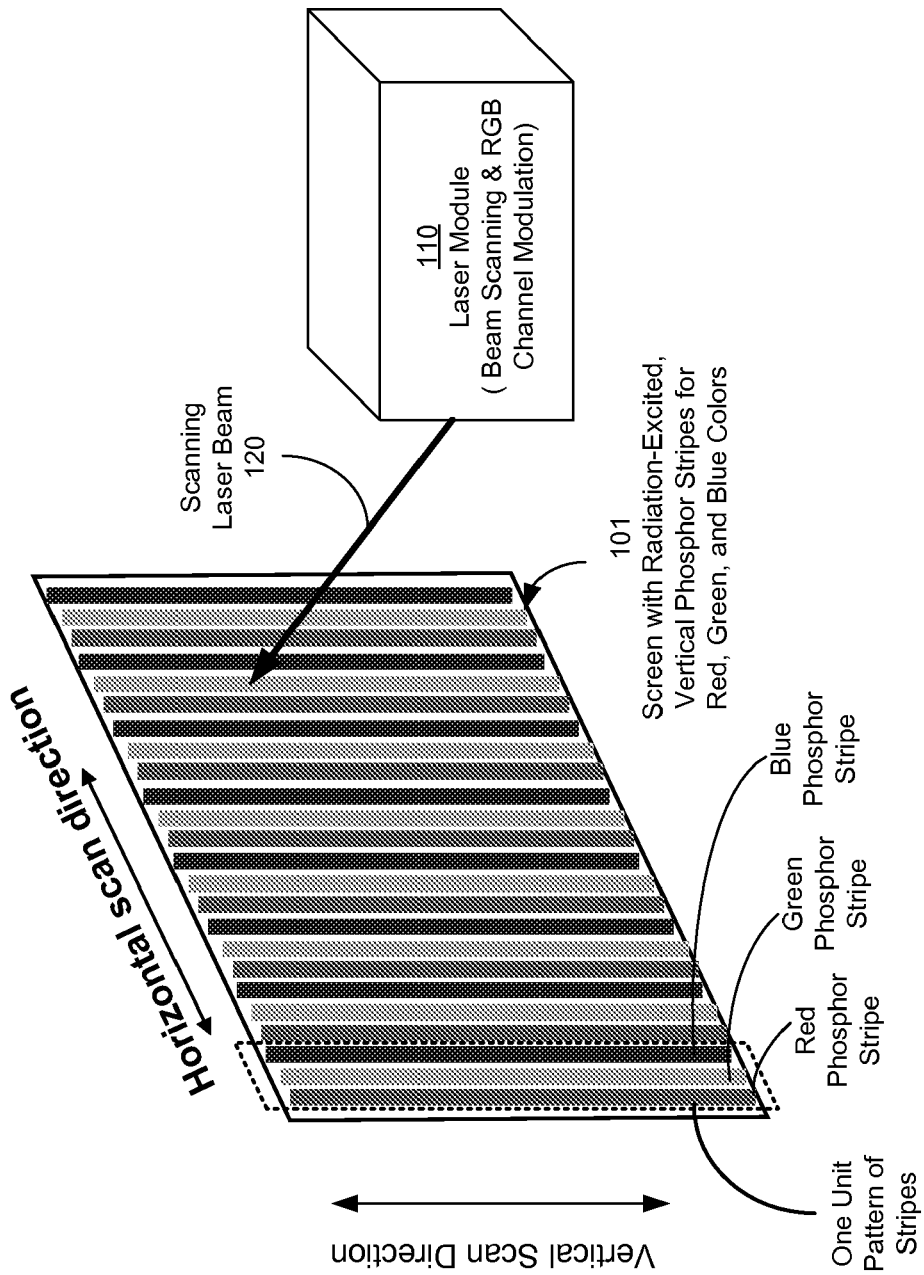

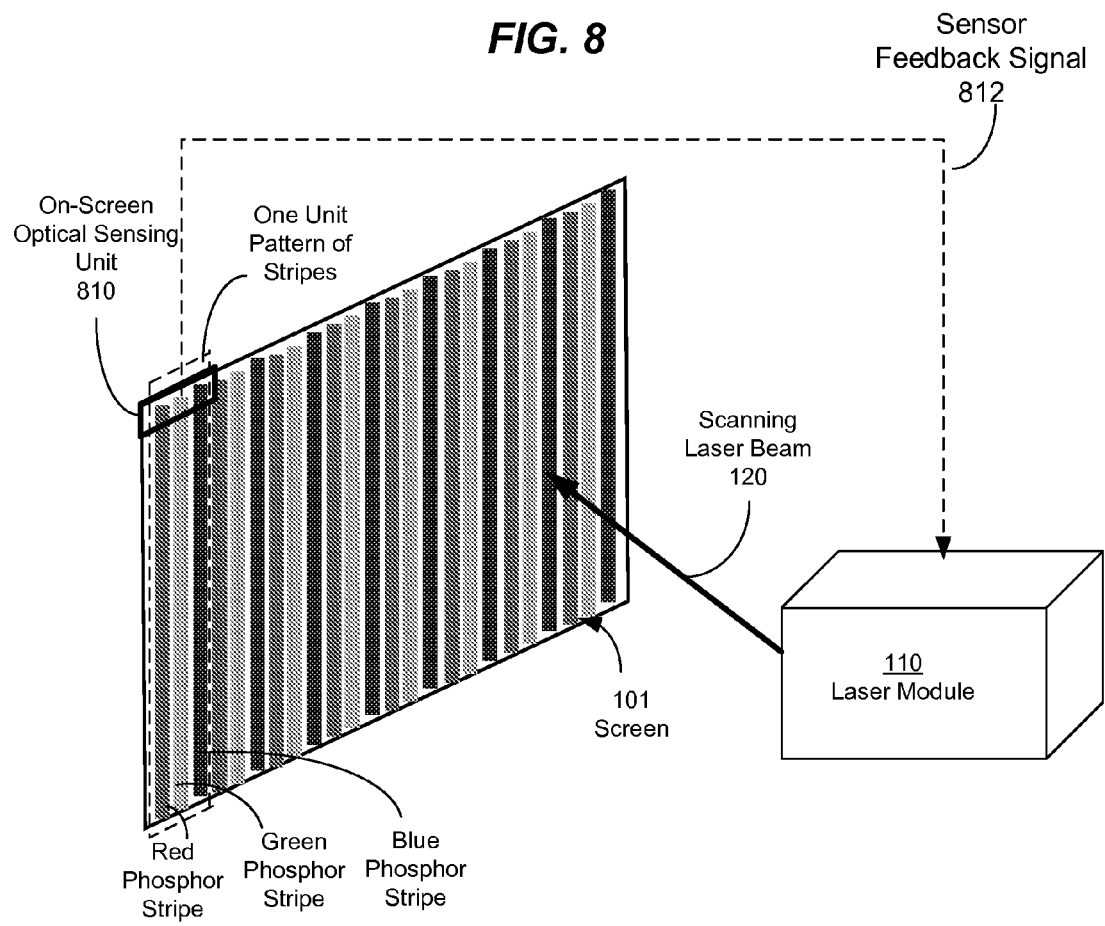
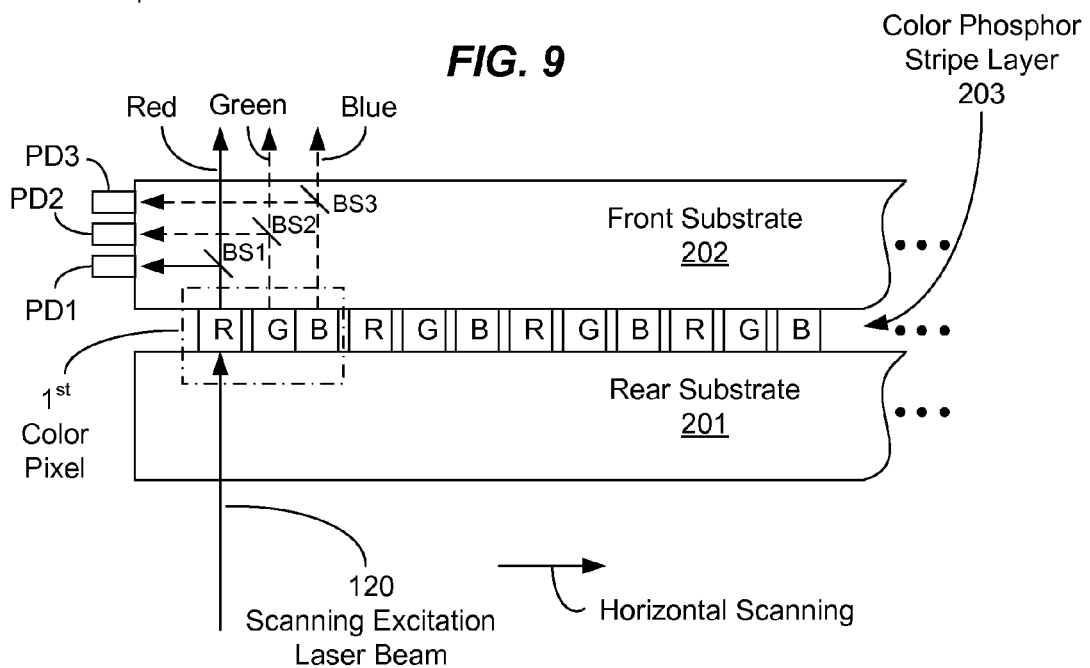

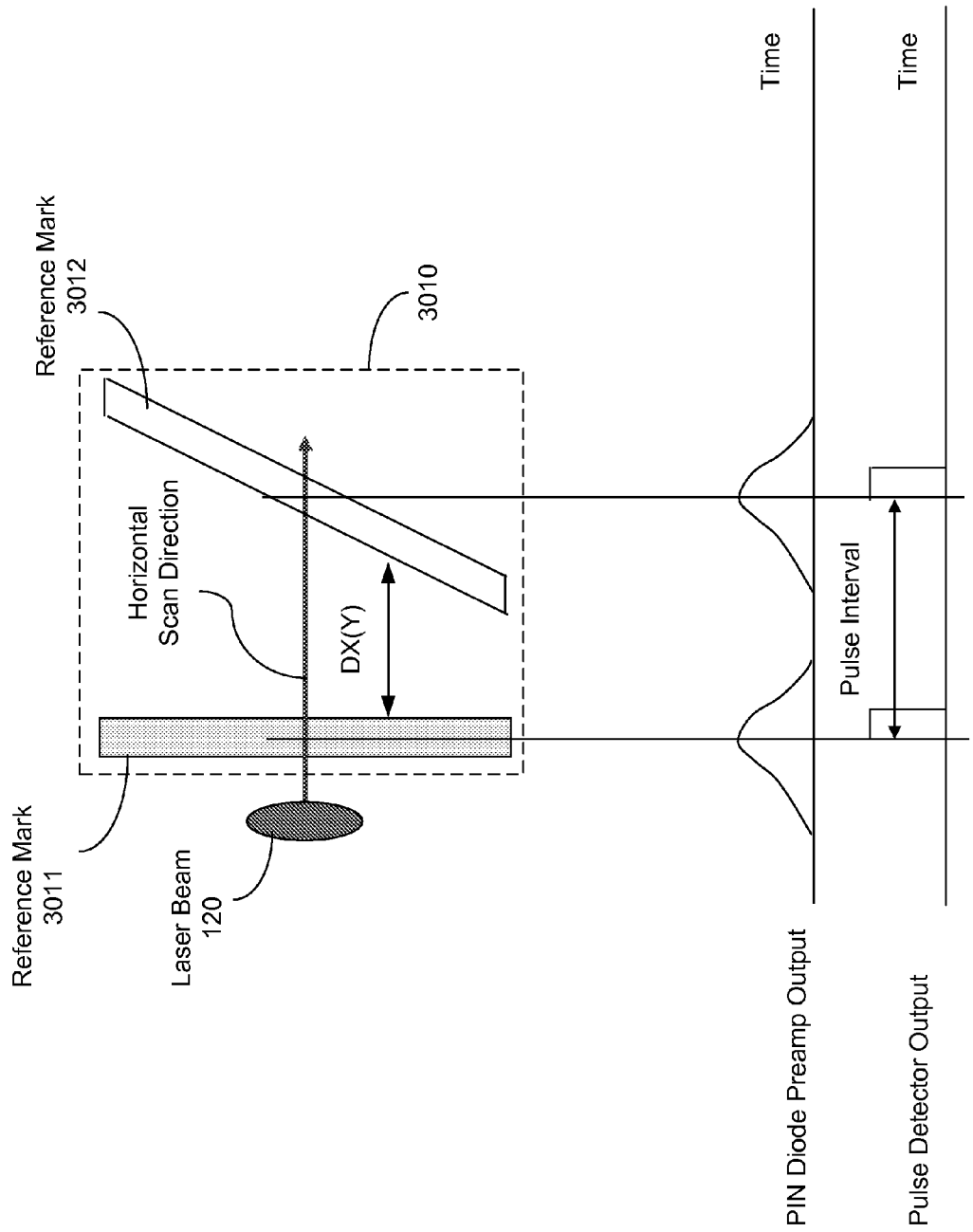

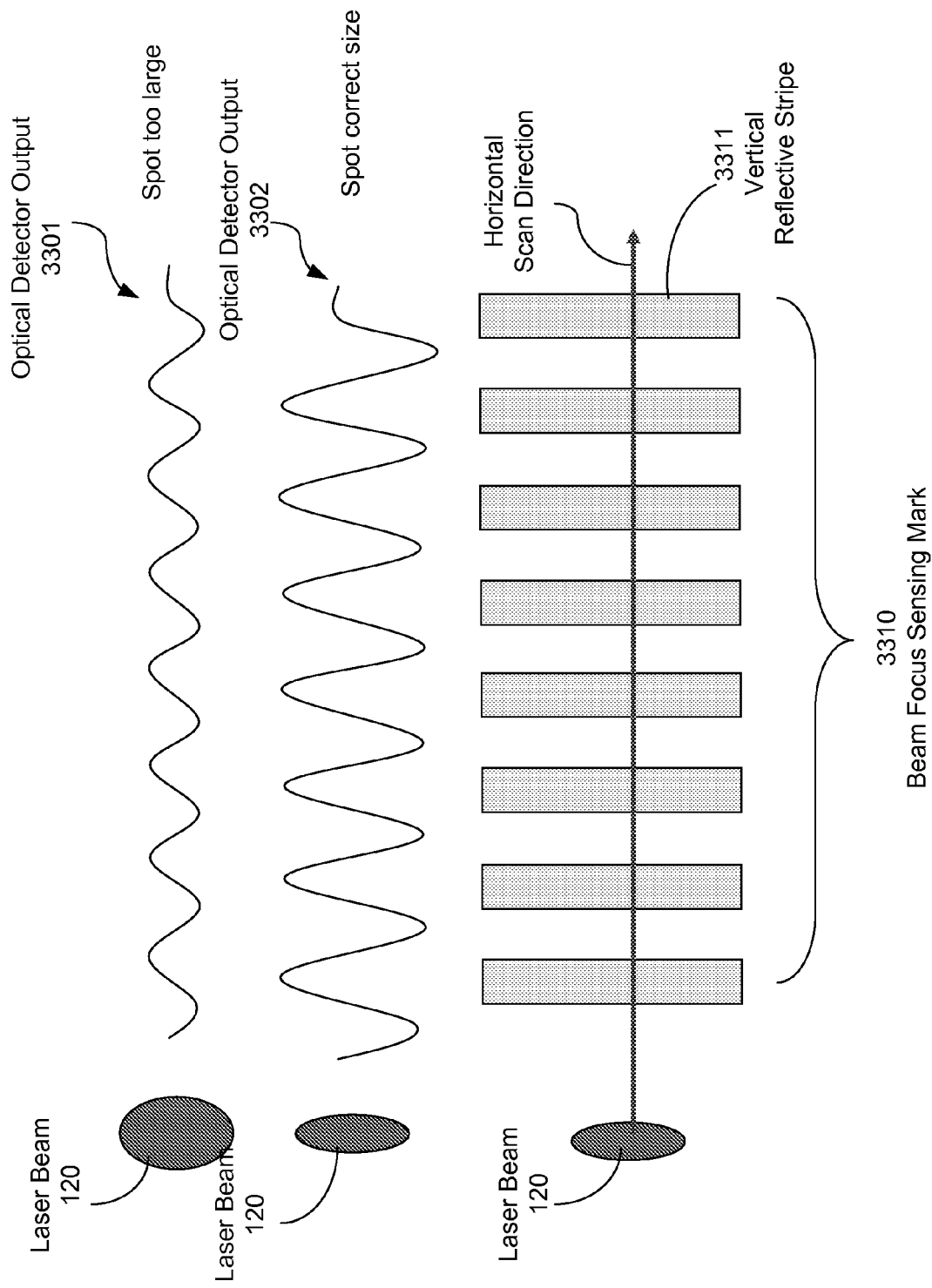

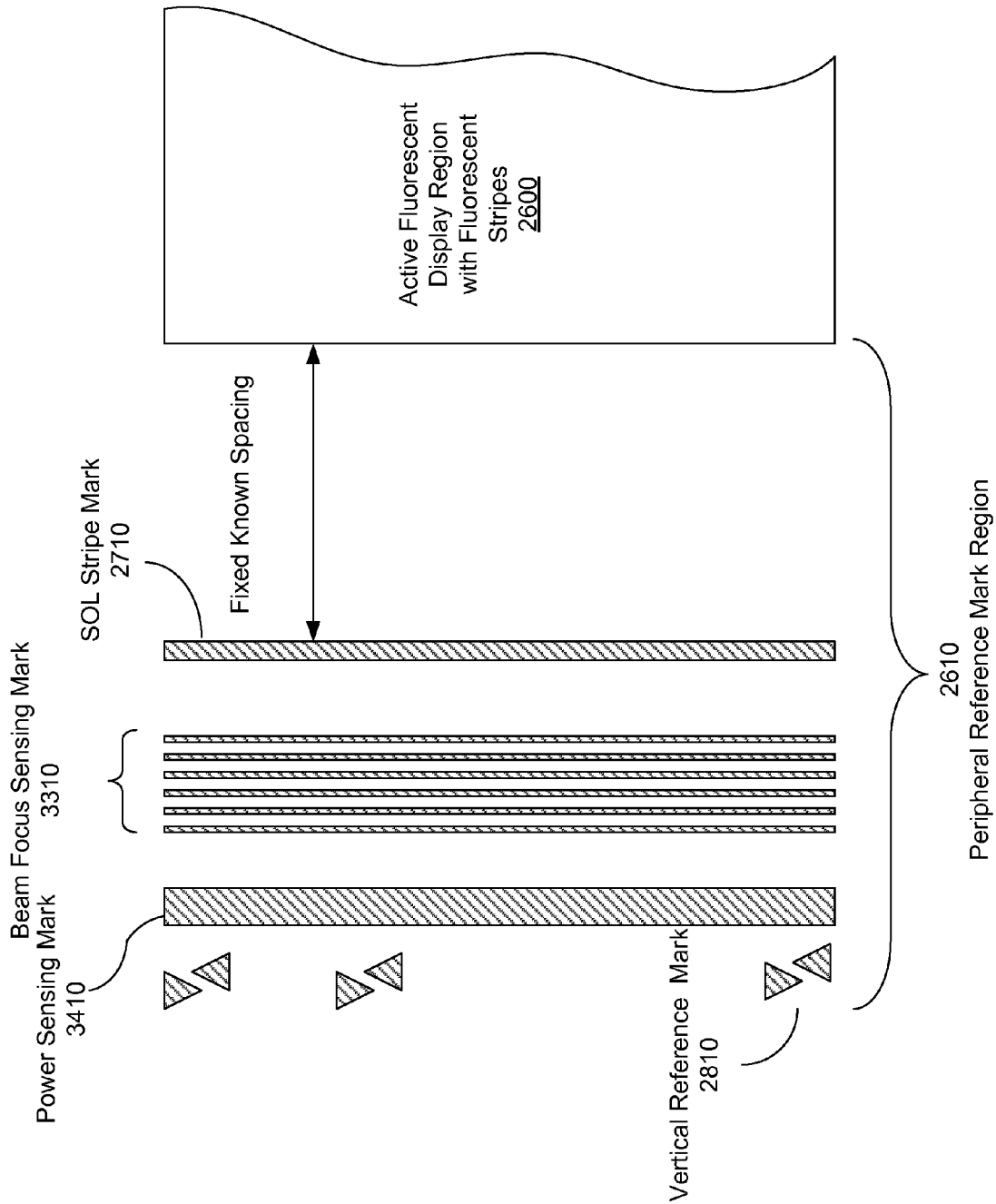

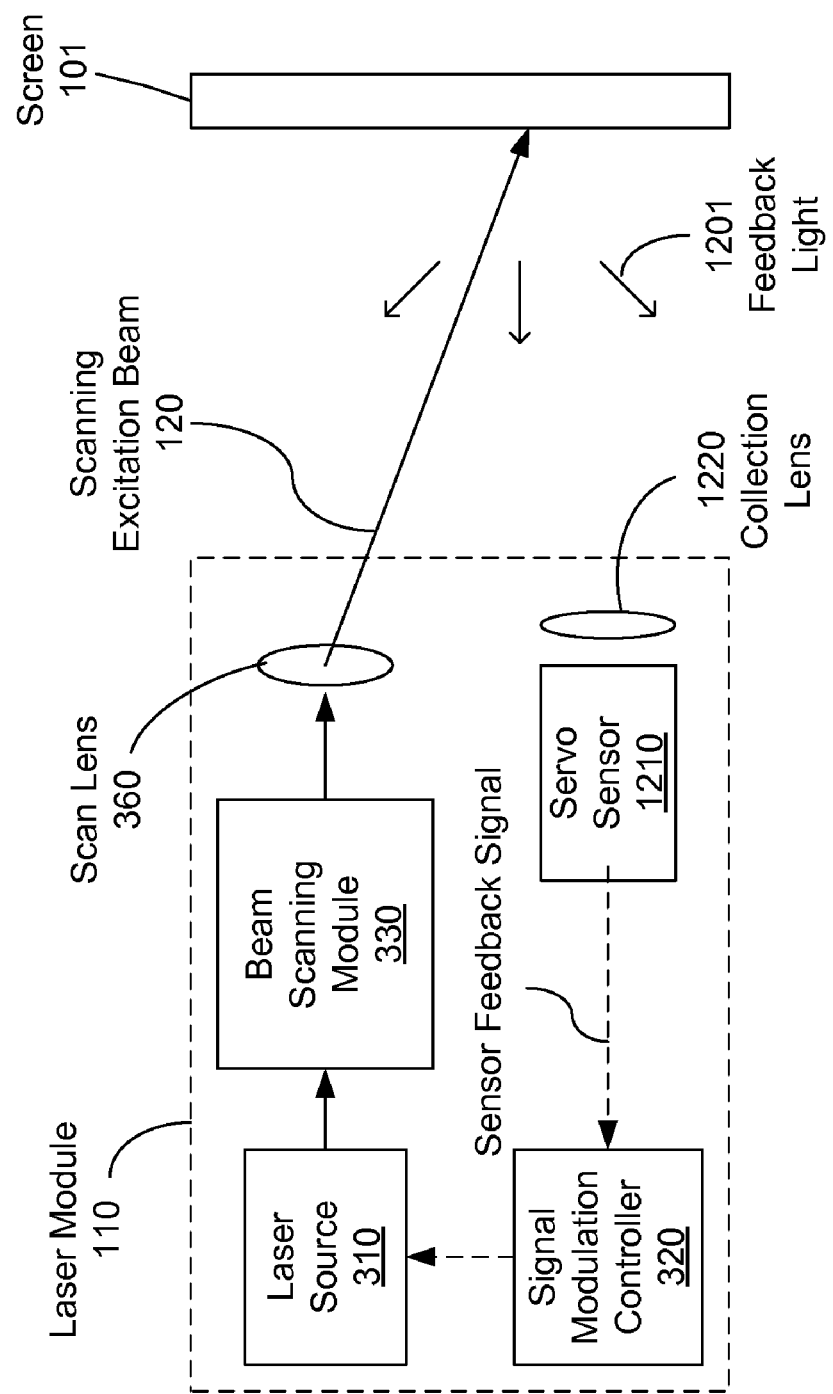

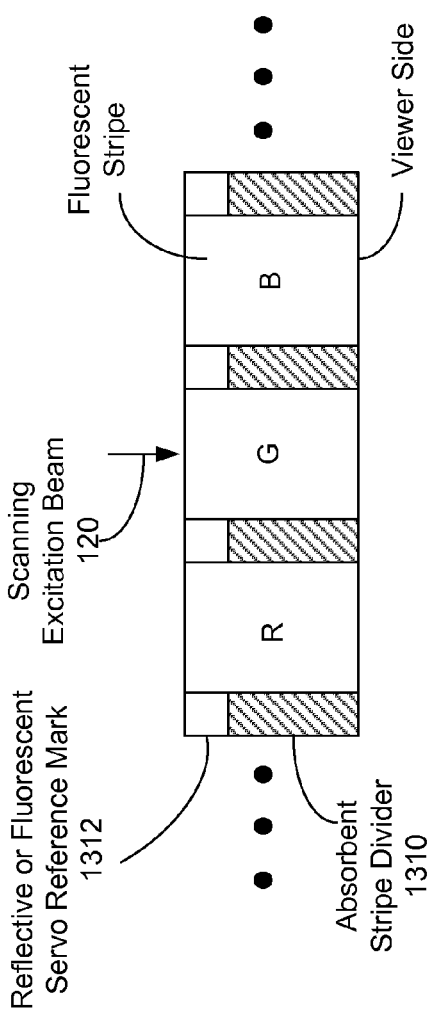
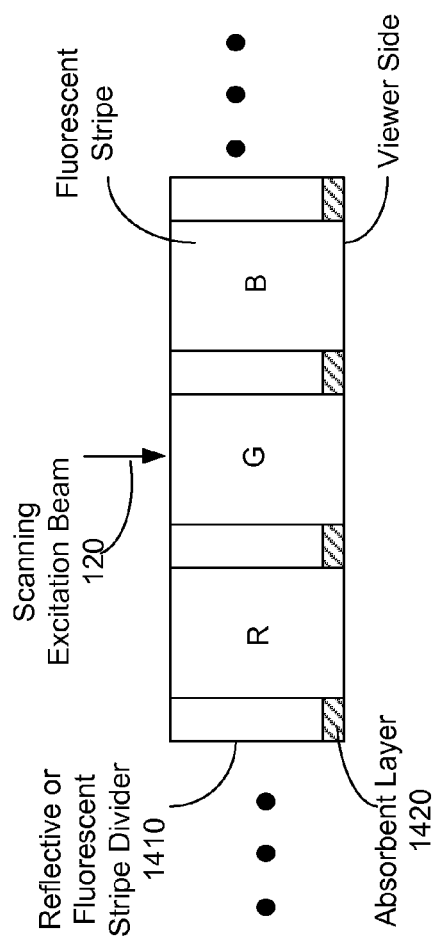

CORRECTING PYRAMIDAL ERROR OF POLYGON SCANNER IN SCANNING BEAM DISPLAY SYSTEMS

This application claims the benefits of the following U.S. Provisional Patent Applications 1. Ser. No. 60/773,993 entitled "Display Systems Using Optical Fluorescent Screens and Servo Feedback Control for Such Systems" and filed on Feb. 15, 2006;

2. Ser. No. 60/776,553 entitled "Pyramidal Error Correction in Laser Displays Using Polygon Scanners" and filed on Feb. 24, 2006;

3. Ser. No. 60/779,261 entitled "Display Systems Using Scanning Light and Electronic Correction of Optical Distortion by Imaging Lens Assembly" and filed on Mar. 3, 2006; and 4. Ser. No. 60/800,870 entitled "Display Systems Using Fluorescent Screens Including Fluorescent Screens With Prismatic Layer" and filed on May 15, 2006.

This application claims the benefit of PCT patent application No. PCT/US2006/11757 entitled "Display Systems Having Screens With Optical Fluorescent Materials" and filed Mar. 31, 2006.

In addition, this application is a continuation-in-part application of and claims the benefits of U.S. application Ser. No. 11/515,420 entitled "Servo-Assisted Scanning Beam Display Systems Using Fluorescent Screens" and filed Sep. 1, 2006, which claims the benefits of the U.S. Provisional Patent Applications Nos. 1, 3 and 4 listed above and the above referenced PCT application.

This application incorporates by reference the entire disclosures of the above referenced patent applications as part of the specification of this application.

BACKGROUND

This application relates to scanning-beam display systems including systems that use polygon scanners to scan one or more optical beams on screens.

In a scanning-beam display system, an optical beam can be scanned over a screen to form images on the screen. Many display systems such as laser display systems use a polygon scanner with multiple reflective facets to provide horizontal scanning and a vertical scanning mirror such as a galvo-driven mirror to provide vertical scanning. In operation, one facet of the polygon scanner scans one horizontal line as the polygon scanner spins to change the orientation and position of the facet and the next facet scans the next horizontal line. The horizontal scanning and the vertical scanning are synchronized to each other to project images on the screen.

Such scanning-beam display systems can be in various configurations. For example, scanning-beam display systems may use passive screens that do not emit light but make light of the scanning beam visible to a viewer by one or a combination of mechanisms, such as optical reflection, optical diffusion, optical scattering and optical diffraction. Various front and rear projection displays use passive screens. Scanning-beam display systems can also use active screens such as fluorescent screens that include fluorescent materials to emit colored light under optical excitation where the emitted light forms the images visible to viewers.

SUMMARY

The specification of this application describes, among others, display systems and devices based on scanning light on a screen. Multiple lasers can be used to simultaneously scan multiple laser beams to illuminate one screen. For example, the multiple laser beams can illuminate one screen segment at a time and sequentially scan multiple screen segments to complete a full screen. The screen can include fluorescent materials which emit visible light under excitation of the scanning light to form images with the emitted visible light.

In one implementation, a scanning beam display system is described to include an optical module operable to produce a scanning beam of excitation light having optical pulses that are sequential in time and carry image information; a fluorescent screen which absorbs the excitation light and emits visible fluorescent light to produce images carried by the scanning beam; and an optical sensor positioned to receive a feedback optical signal generated by the fluorescent screen under illumination of the scanning beam and to produce a monitor signal indicating a spatial alignment of the optical pulses on the fluorescent screen. The optical module comprises a feedback control unit operable to adjust timing of the optical pulses carried by the scanning beam in response to the monitor signal to control the spatial alignment of spatial positions of the optical pulses on the fluorescent screen.

In the above scanning beam display system, the screen can include parallel fluorescent stripes which produce the images carried by the scanning beam, and servo reference marks respectively located at boundaries of the fluorescent stripes to produce the feedback optical signal under illumination of the scanning beam. The feedback optical signal varies in amplitude with a position of the scanning beam across each fluorescent stripe, and the optical module is operable to create a temporal variation in timing of the optical pulses in the scanning beam to shift positions of the optical pulses on the screen along a beam scanning direction perpendicular to the fluorescent stripes. In addition, the feedback control unit is operable to adjust timing of the optical pulses in response to information in the monitor signal to direct a position of each optical pulse towards a center of a fluorescent stripe along the beam scanning direction.

In another implementation, a method for controlling a scanning beam display system is described. In this method, a beam of excitation light modulated with optical pulses is scanned on a screen with parallel fluorescent stripes in a beam scanning direction perpendicular to the fluorescent stripes to excite the fluorescent strips to emit visible fluorescent light which forms images. A temporal variation in timing of the optical pulses in the beam of excitation light is provided to advance or delay a spatial position of each optical pulse along the beam scanning direction on the screen. A reflection of the beam of excitation light from the screen is detected to produce a monitor signal whose amplitude varies with a position of the beam relative to a fluorescent stripe. Next, the monitor signal is processed to obtain information on a spatial offset of a position of an optical pulse on the screen relative to a center of a fluorescent stripe and the timing of the optical pulses in the beam of excitation light is adjusted to reduce the spatial offset.

In the above method, the following operations may be conducted to further control the system. A peripheral servo reference mark can be provided outside the fluorescent stripes in the beam scanning direction to produce a feedback light when illuminated by the scanning beam. The scanning beam is then controlled to scan over the peripheral servo reference mark during a scan over the fluorescent area. The scanning beam is controlled to be in a CW mode when the scanning beam is scanning over the peripheral servo reference mark and to be in a pulsed mode to carry the optical pulses when the scanning beam is scanning over the fluorescent stripes. The feedback light from the peripheral servo reference mark is used to detect a beam parameter of the scanning beam and the detected beam parameter is used to adjust the scanning beam. The peripheral servo reference mark may be used to achieve various controls, such as beam focusing, vertical beam position on the screen, and the beam power on the screen.

In yet another implementation, a scanning beam display system can include an optical module operable to produce a scanning beam of excitation light having optical pulses that are sequential in time and carry image information, and a fluorescent screen that includes a fluorescent area and a peripheral servo reference mark area outside the fluorescent area. The fluorescent area absorbs the excitation light and emits visible fluorescent light to produce images carried by the scanning beam. The fluorescent area includes first servo reference marks which produce a first feedback optical signal under illumination of the scanning beam. The peripheral servo reference mark area includes at least one second servo reference mark that produces a second feedback optical signal under illumination of the scanning beam. This system also includes a first optical sensor positioned to receive the first feedback optical signal and to produce a first monitor signal indicating a spatial alignment of the optical pulses on the fluorescent screen, and a second optical sensor positioned to receive the second feedback optical signal and to produce a second monitor signal indicating an optical property of the scanning beam on the fluorescent screen. The optical module includes a feedback control unit to adjust the scanning beam in response to the first and second monitor signals to control at least the spatial alignment of spatial positions of the optical pulses on the fluorescent screen.

The screen in the above system may further include a light pipe formed in the peripheral servo reference mark area of the screen. This light pipe has an input portion that is coupled to receive the second feedback optical signal generated by the second servo reference mark and an output portion that is coupled to the second optical sensor to direct the received second feedback optical signal to the second optical sensor. The second servo reference mark may be optically transmissive to direct a transmitted portion of the scanning beam to the light pipe as the second feedback optical signal.

Examples of scanning beam display systems with a first scanner and a second polygon scanner are described. In example, such a system include an optical module and a screen. The optical module includes a first scanner to scan along a first direction at least one scanning beam having optical pulses that are sequential in time and carry image information, and a second scanner having a polygon with reflective facets. The polygon is operable to rotate around a rotation axis that is along the first direction to scan the at least one scanning beam along a second direction perpendicular to the first direction. The screen is positioned to receive the at least one scanning beam from the optical module and configured to include (1) a display region which displays images carried by the at least one scanning beam, and (2) reference marks positioned in paths along the second direction of the least one scanning beam on the screen and displaced from one another along the first direction. Each reference mark is operable to produce an optical monitor signal when illuminated by the at least one scanning beam. The system also includes an optical detector positioned to receive the optical monitor signal from the screen and to produce a detector signal containing information on a position offset of the least one scanning beam relative to a respective reference mark on the screen, and a first scanner control that measures a pyramidal error of the polygon from the detector signal and controls scanning of the second scanner to correct the position offset caused by the pyramidal error.

A method for operating a scanning beam display system with two scanners for scanning along two directions is also described. This method includes using a first scanner to scan at least one beam of light modulated with optical pulses to carry images along a first direction on a screen and a second polygon scanner with reflective facets to scan the at least one beam along a second, perpendicular direction on the screen to display the images. Reference marks on the screen at positions that are respectively in beam scanning paths of the at least one beam by the reflective facets, respectively, are used to produce optical monitor signals when illuminated by the at least one beam during scanning. Each optical monitor signal has information on a position offset of the least one beam relative to a respective reference mark on the screen caused by a pyramidal error of a respective reflective facet in the polygon scanner. This method further includes detecting the optical monitor signals from the screen to produce a detector signal containing the information on the position offset; and adjusting the scanning of the first scanner along the first direction to reduce the position offset of the at least one beam on the screen in response to the position offset in the detector signal.

Another example of a scanning beam display system with two scanners includes an optical module operable to produce a scanning beam of excitation light having optical pulses that are sequential in time and carry image information, a first scanner to scan the scanning beam along a first direction, a second scanner comprising a polygon having reflective facets and operable to spin around an axis parallel to the first direction and to use the reflective facets to scan the scanning beam along a second, perpendicular direction, and a fluorescent screen comprising a fluorescent area having parallel fluorescent stripes each long the first direction and spatially displaced from one another along the second direction and a peripheral servo reference mark area outside the fluorescent area. The fluorescent stripes absorb the excitation light and emit visible fluorescent light to produce images carried by the scanning beam. The fluorescent area also includes first servo reference marks producing a first feedback optical signal under illumination of the scanning beam to indicate a spatial alignment of the optical pulses to the fluorescent stripes along the second direction. The peripheral servo reference mark area includes second servo reference marks each producing a second feedback optical signal under illumination of the scanning beam indicating a position offset of the scanning beam along the first direction. This system also includes a first optical sensor positioned to receive the first feedback optical signal and to produce a first monitor signal indicating the spatial alignment of the optical pulses relative to the fluorescent stripes, a second optical sensor positioned to receive the second feedback optical signal and to produce a second monitor signal indicating the position offset of the scanning beam along the first direction when scanned by a respective reflective facet, and a control unit operable to adjust the scanning beam in response to the first and second monitor signals to control at least the spatial alignment of spatial positions of the optical pulses relative to the fluorescent stripes and to reduce the position offset of the scanning beam along the first direction.

This application also describes an example of a scanning beam display system with two scanners that includes a polygon scanner having reflector facets and operable to rotate to scan an optical beam along a first direction, a second scanner having a reflector to cause the optical beam to scan in a second direction perpendicular to the first direction, and a control unit in communication with the second scanner to control scanning of the second scanner. The control unit is operable to dither the second scanner to cause the optical beam to change its direction back and forth along the second direction during each scanning at a dither frequency higher than a frame rate of an image carried by the optical beam.

In addition, this application describes an example of a method for display using two scanners that uses a polygon scanner having reflector facets to scan an optical beam along a first direction and uses a second scanner having a reflector to scan the optical beam in a second direction perpendicular to the first direction. This method also includes controlling the scanning of the optical beam to scan the optical beam with different facets of the polygon scanner at each horizontal scanning line in successive frames.

These and other examples and implementations are described in detail in the drawings, the detailed description and the claims.

BRIEF DESCRIPTION OF THE DRAWINGS

FIG. 1 shows an example scanning laser display system having a fluorescent screen made of laser-excitable fluorescent materials (e.g., phosphors) emitting colored lights under excitation of a scanning laser beam that carries the image information to be displayed.

FIG. 8 shows one example of a scanning display system using a servo feedback control and an on-screen optical sensing unit.

FIG. 9 shows one example of a fluorescent screen with on-screen optical servo detectors.

FIGS. 15 and 16 show another example of a vertical beam position reference mark for the screen in FIG. 11 and a corresponding servo feedback control circuit.

FIG. 18 shows an example of a beam focus sensing mark for the screen in FIG. 11 to provide a servo feedback for controlling the beam focus on the screen.

FIG. 19 shows one implementation of the screen in FIG. 11 that includes various reference marks including a power sensing mark for monitoring the optical power of the excitation beam on the screen

FIG. 21 shows one example of a scanning display system with servo feedback control based on servo reference marks on the screen and a temporal variation on the timing of the optical pulses in the excitation beam.

FIGS. 22, 23 and 24 show examples of fluorescent screens having servo reference marks that produce feedback light for the servo control.

DETAILED DESCRIPTION

Figure 2A:
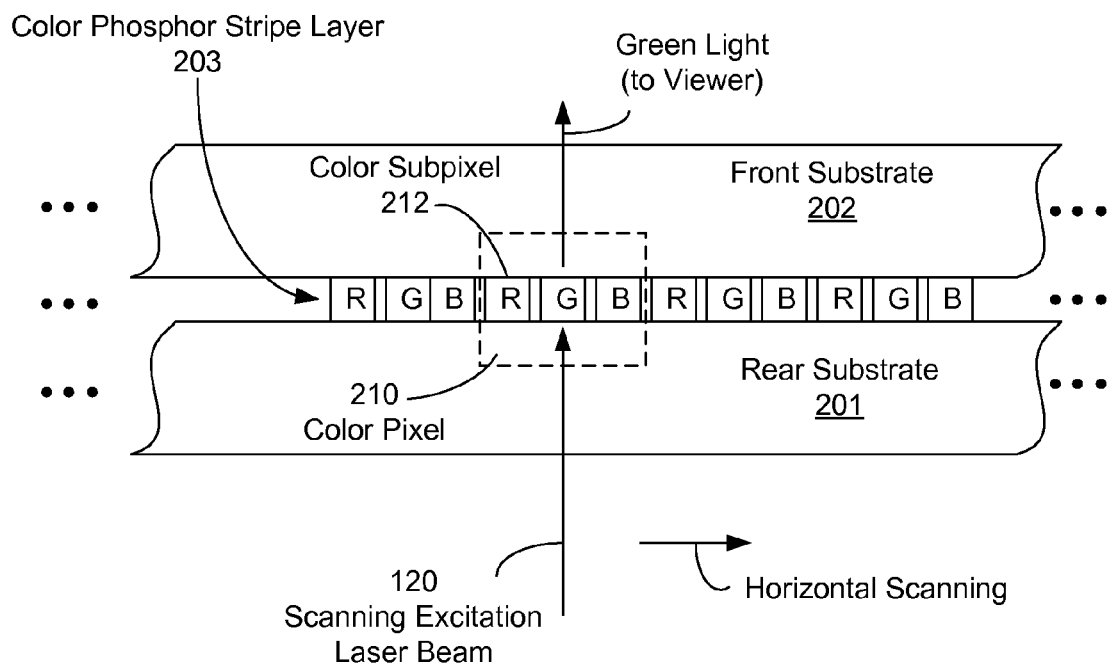
FIGS. 2A and 2B show one example screen structure with parallel fluorescent stripes and the structure of color pixels on the screen in FIG. 1.

Examples of scanning-beam display systems described in this application use a vertical scanning mirror and a rotating polygon mirror to provide the 2-dimensional scanning of one or more scanning beams on the screen to form images. A beam may be first directed to the vertical scanning mirror and then to the horizontal polygon mirror or in a reverse order. In operation, in tracing a horizontal line by scanning the polygon scanner, the vertical scanning mirror operates to displace the horizontal lines vertically. The vertical scanning mirror can be implemented by, e.g., using a mirror engaged to a galvanometer as the vertical scanner.

Different mirror facets on the polygon mirror may not be exactly at the same orientation with respect to the rotation axis of the polygon scanner (e.g., the vertical direction) and thus different facets may direct the same beam at different vertical directions. This deviation from one facet to another facet is known as the pyramidal error and can cause errors in vertical positions of different horizontal lines scanned by different facets of the polygon scanner. This pyramidal error can degrade the image quality on the screen. When a polygon is free of the pyramidal error, multiple horizontal lines on the screen scanned by different facets are equally spaced if the vertical scanning mirror operates at a constant scanning speed in the vertical direction. If the polygon scanner, however, has the pyramidal error, the horizontal lines on the screen from different facets are not equally spaced when the vertical scanner operates at a constant scanning speed in the vertical direction. The variation in the line spacing between two adjacent horizontal scan lines depends on the difference in orientations of the respective adjacent facets of the polygon scanner. Such uneven line spacing can distort the displayed images, and degrade the image quality such as colors, resolution, and other quality factors of the images displayed on the screen.

A polygon scanner can be designed and manufactured with a high precision to minimize the pyramidal error. Polygons with low pyramidal errors, however, can be expensive. To reduce the cost, a pyramidal error correction mechanism can be implemented in such a system to correct the known pyramidal errors of an installed polygon scanner. Implementation of this correction mechanism allows the use of relatively inexpensive polygons with pyramidal errors without compromising the display performance. In addition, the orientations of facets of a polygon scanner may change with time due to various factors, such as a change in temperature and other environmental factors (e.g., humidity), aging of the materials used in a polygon scanner over time, and others. Furthermore, a polygon scanner in a system may be replaced by a different polygon scanner due to malfunction or failure of the original polygon and such replacement can change the pyramidal errors because two different polygons tend to have different pyramidal errors. Hence, to maintain a high image quality in presence of variations of pyramidal errors, the pyramidal error correction mechanism can be designed to provide adjustable corrections to the pyramidal errors as the pyramidal errors of facets change.

This application describes examples of techniques and correction mechanisms for pyramidal error correction and other aspects of scanning-beam displays. The described techniques and correction mechanisms for pyramidal error correction can be implemented in scanning-beam displays with both "passive" screens and active screens. A passive screen does not emit light but makes light of the one or more scanning beams visible to a viewer by one or a combination of mechanisms, such as optical reflection, optical diffusion, optical scattering and optical diffraction. For example, a passive screen can reflect or scatter received scanning beam(s) to show images. An active screen emits light by absorbing the one or more scanning beams and the emitted light forms part of or all of the light that forms the displayed images. Such an active screen may include one or more fluorescent materials to emit light under optical excitation of the one or more scanning beams received by the screen to produce images. Screens with phosphor materials under excitation of one or more scanning excitation laser beams are described here as specific implementation examples of optically excited fluorescent materials in various system.

The following sections first describe examples of scanning beam display systems and devices that use fluorescent screens with fluorescent materials to emit light under optical excitation to produce images and then describe techniques and mechanisms for pyramidal error correction used in scanning-beam display systems using either passive screens or active screens.

Scanning-beam display systems using fluorescent screens can include laser vector scanner display devices and laser video display devices that use laser excitable fluorescent screens to produce images by absorbing excitation laser light and emitting colored light. Various examples of screen designs with fluorescent materials are described. Screens with phosphor materials under excitation of one or more scanning excitation laser beams are described in details and are used as specific implementation examples of optically excited fluorescent materials in various system and device examples in this application. In one implementation, for example, three different color phosphors that are optically excitable by the laser beam to respectively produce light in red, green, and blue colors suitable for forming color images can be formed on the screen as repetitive red, green and blue phosphor stripes in parallel. Various examples described in this application use screens with parallel color phosphor stripes for emitting light in red, green, and blue to illustrate various features of the laser-based displays. Phosphor materials are one type of fluorescent materials. Various described systems, devices and features in the examples that use phosphors as the fluorescent materials are applicable to displays with screens made of other optically excitable, light-emitting, non-phosphor fluorescent materials.

For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

Some implementations of laser-based display techniques and systems described here use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminance is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

FIG. 1 illustrates an example of a laser-based display system using a screen having color phosphor stripes. Alternatively, color phosphor dots may also be used to define the image pixels on the screen. The system includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear scanner systems where the viewer and the laser module 110 are on the opposite sides of the screen 101. Alternatively, such display systems may be configured as front scanner systems where the viewer and laser module 110 are on the same side of the screen 101.

FIG. 2A shows an exemplary design of the screen 101 in FIG. 1. The screen 101 in this particular example includes a rear substrate 201 which is transparent to the scanning laser beam 120 and faces the laser module 110 to receive the scanning laser beam 120. A second front substrate 202 is fixed relative to the rear substrate 201 and faces the viewer so that the fluorescent light transmits through the substrate 202 towards the viewer. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 2B:
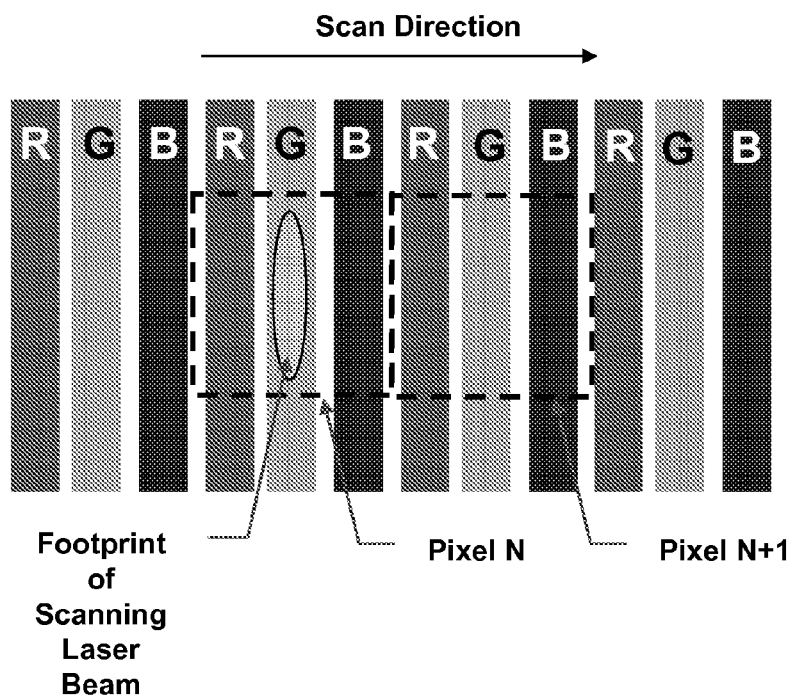

In FIG. 2A, the scanning laser beam 120 is directed at the green phosphor stripe within a pixel to produce green light for that pixel. FIG. 2B further shows the operation of the screen 101 in a view along the direction perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Figure 2C:
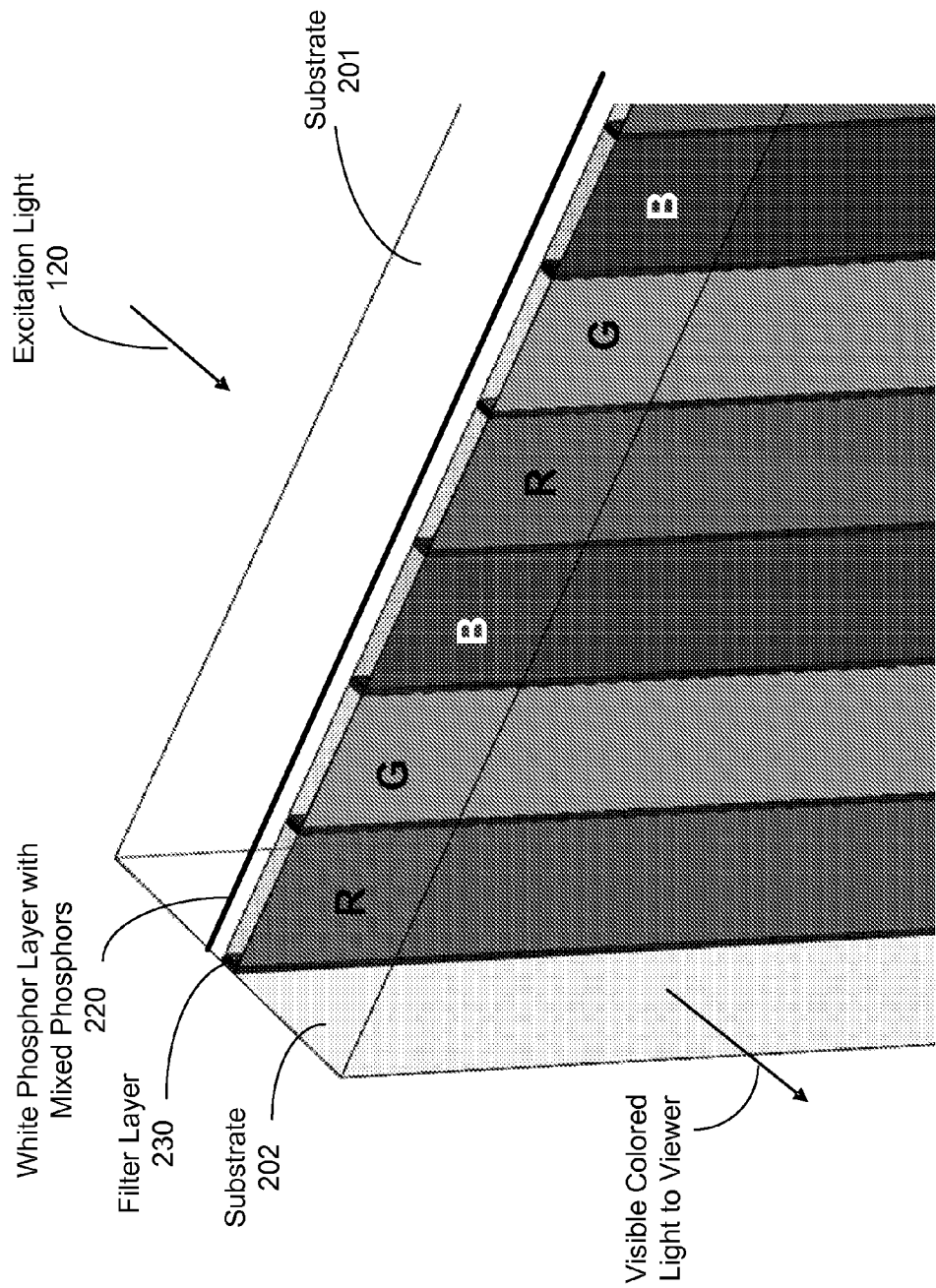
FIG. 2C shows another example for a fluorescent screen with fluorescent stripes formed by placing parallel optical filters over the layer of a uniform fluorescent layer which emits white light under optical excitation.

Alternatively, FIG. 2C illustrates an example of a fluorescent screen design that has a contiguous and uniform layer 220 of mixed phosphors. This mixed phosphor layer 220 is designed and constructed to emit white light under optical excitation of the excitation light 120. The mixed phosphors in the mixed phosphor layer 220 can be designed in various ways and a number of compositions for the mixed phosphors that emit white light are known and documented. Notably, a layer 210 of color filters, such as stripes of red-transmitting, green-transmitting and blue-transmitting filters, is placed on the viewer side of the mixed phosphor layer 220 to filter the white light and to produce colored output light. The layers 210 and 220 can be sandwiched between substrates 201 and 202. The color filters may be implemented in various configurations, including in designs similar to the color filters used in color LCD panels. In each color filter region e.g., a red-transmitting filter, the filter transmits the red light and absorbs light of other colors including green light and blue light. Each filter in the layer 210 may be a multi-layer structure that effectuates a band-pass interference filter with a desired transmission band. Various designs and techniques may be used for designing and constructing such filters. U.S. Pat. No. 5,587,818 entitled "Three color LCD with a black matrix and red and/or blue filters on one substrate and with green filters and red and/or blue filters on the opposite substrate," and U.S. Pat. No. 5,684,552 entitled "Color liquid crystal display having a color filter composed of multilayer thin films," for example, describe red, green and blue filters that may be used in the screen design in FIG. 2C. Hence, a fluorescent stripe in the fluorescent screen 101 in various examples described in this application is a fluorescent stripe that emits a designated color under optical excitation and can be either a fluorescent stripe formed of a particular fluorescent material that emits the designed color in FIG. 2A or a combination of a stripe color filter and a white fluorescent layer in FIG. 2C.

Figure 3:
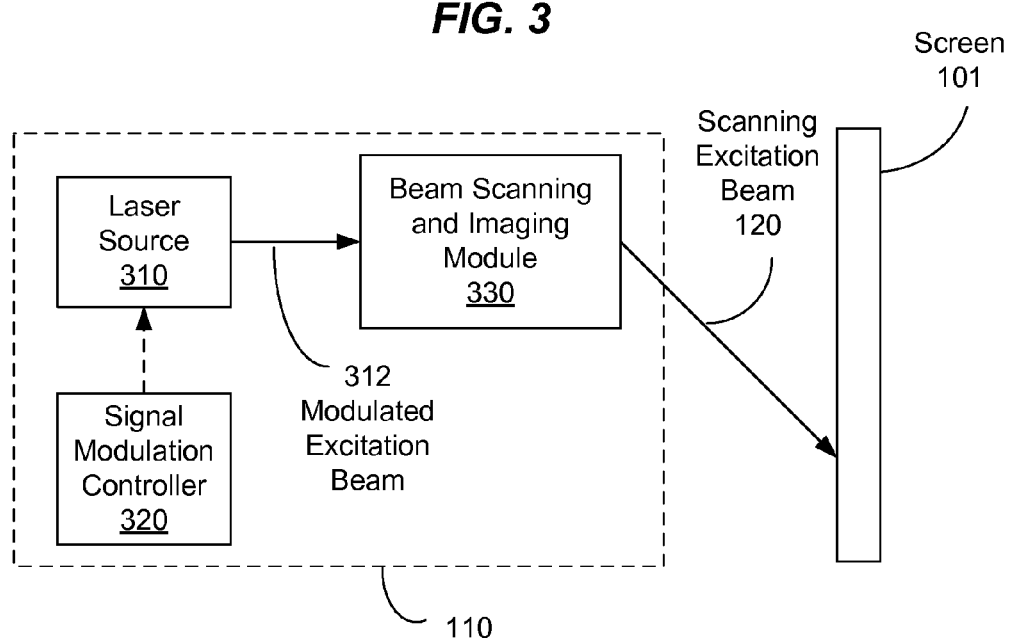
FIGS. 3 and 4 show two different scanning beam displays.

The optical modulation in the laser module 110 in FIG. 1 can be implemented in two different configurations. FIG. 3 shows an implementation of the display in FIG. 1 where a laser source 310 such as a diode laser is directly modulated to produce a modulated excitation beam 312 that carries the image signals in red, green and blue. The laser module 110 in this implementation includes a signal modulation controller 320 which modulates the laser source 310 directly. For example, the signal modulation controller 320 can control the driving current of a laser diode as the laser source 310. A beam scanning and imaging module 330 then scans and projects the modulated excitation beam 312 as the scanning excitation beam 120 to the screen 101 to excite the color phosphors.

Figure 4:
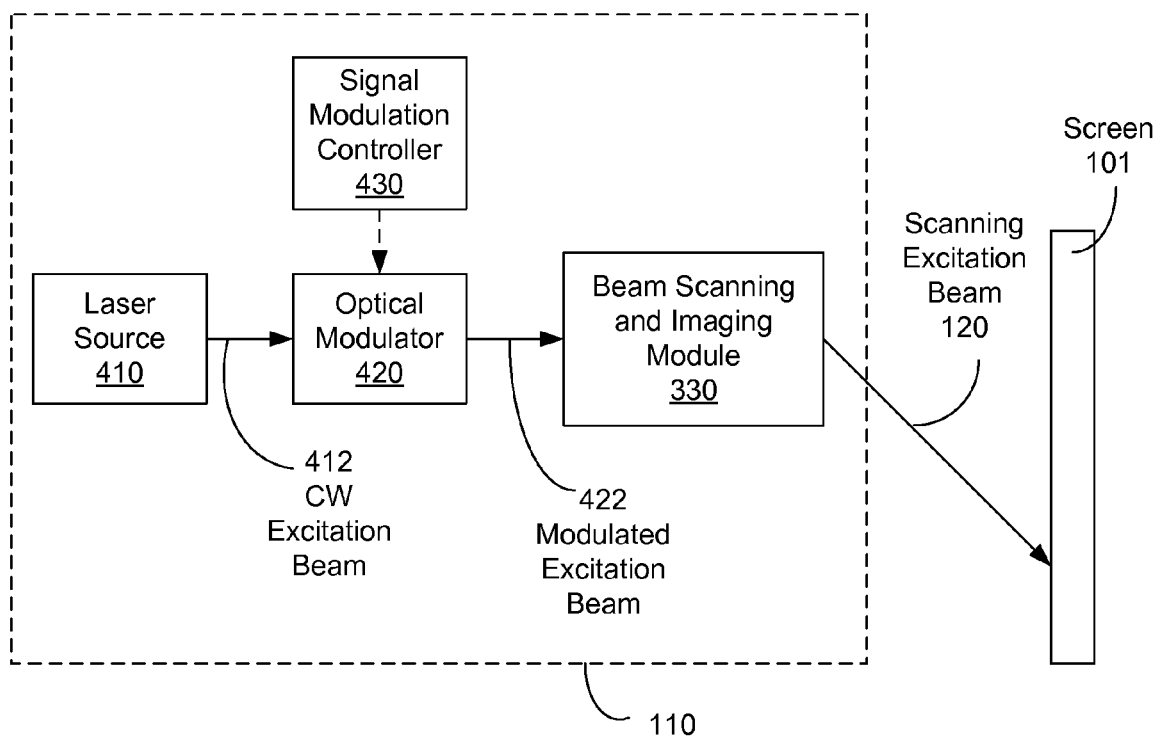

Alternatively, FIG. 4 shows another implementation of the display in FIG. 1 where a laser source 410 is used to generate a CW unmodulated excitation laser beam 412 and an optical modulator 420 is used to modulate the CW excitation laser beam 412 with the image signals in red, green and blue and to produce a modulated excitation beam 422. A signal modulation controller 430 is used to control the optical modulator 420. For example, an acousto-optic modulator or an electro-optic modulator may be used as the optical modulator 420. The modulated beam 422 from the optical modulator 420 is then scanned and projected onto the screen 101 by the beam scanning and imaging module 330 as the scanning excitation beam 120.

Figure 5:
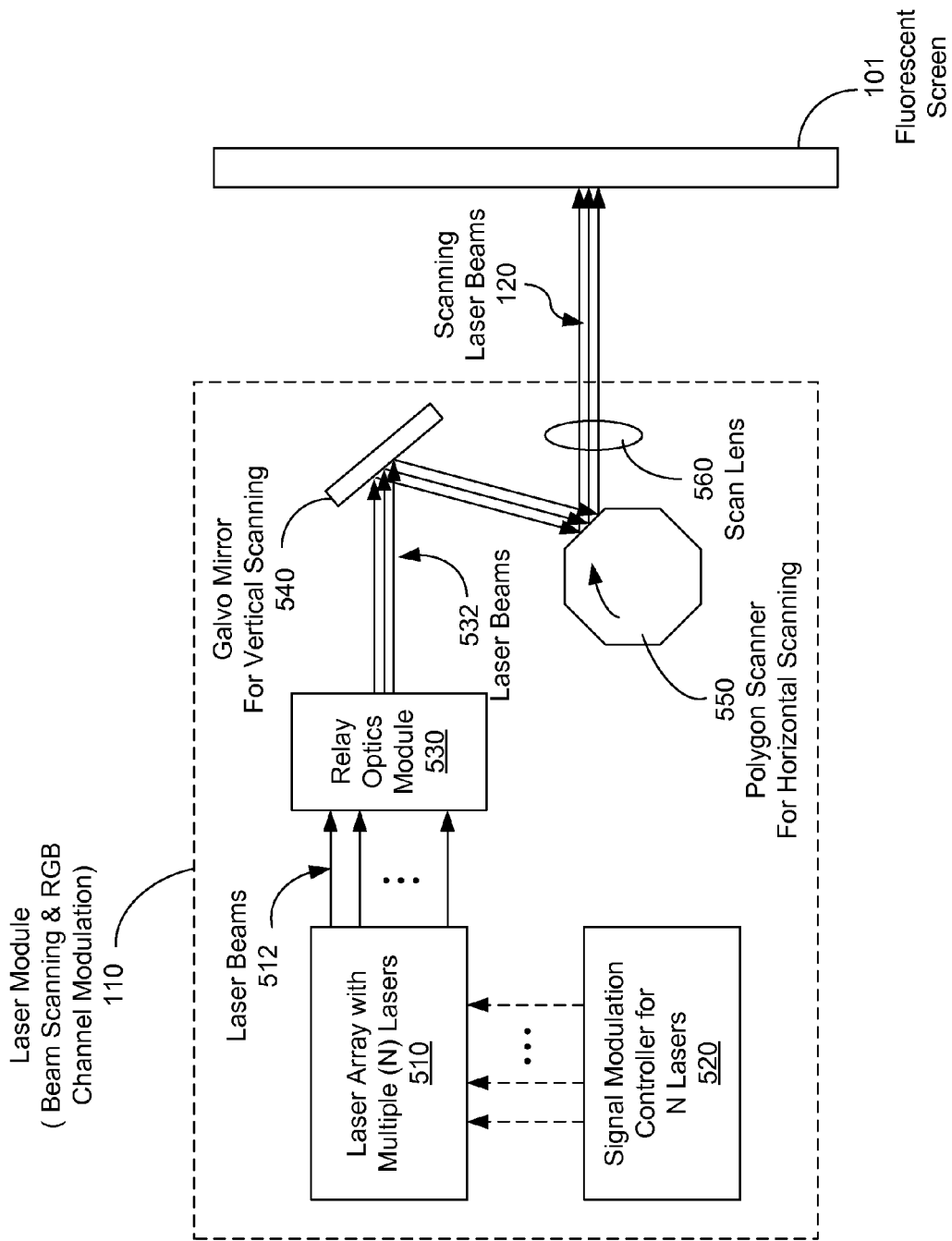
FIG. 5 shows an example implementation of the laser module in FIG. 3 having multiple lasers that direct multiple laser beams on the screen.

FIG. 5 shows an example implementation of the laser module 110 in FIG. 1. A laser array 510 with multiple lasers is used to generate multiple laser beams 512 to simultaneously scan the screen 101 for enhanced display brightness. The laser array 510 can be implemented in various configurations, such as discrete laser diodes on separate chips arranged in an array and a monolithic laser array chip having integrated laser diodes arranged in an array. A signal modulation controller 520 is provided to control and modulate the lasers in the laser array 510 so that the laser beams 512 are modulated to carry the image to be displayed on the screen 101. The signal modulation controller 520 can include a digital image processor which generate the digital image signals for the three different color channels and laser driver circuits that produce laser control signals carrying the digital image signals. The laser control signals are then applied to modulate the lasers in the laser array 510, e.g., the currents for laser diodes.

The beam scanning is achieved by using a scanning mirror 540 such as a galvo mirror for the vertical scanning and a multi-facet polygon scanner 550 for the horizontal scanning. A scan lens 560 is used to project the scanning beams form the polygon scanner 550 onto the screen 101. The scan lens 560 is designed to image each laser in the laser array 510 onto the screen 101. Each of the different reflective facets of the polygon scanner 550 simultaneously scans N horizontal lines where N is the number of lasers. In the illustrated example, the laser beams are first directed to the galvo mirror 540 and then from the galvo mirror 540 to the polygon scanner 550. The output scanning beams 120 are then projected onto the screen 101. A relay optics module 530 is placed in the optical path of the laser beams 512 to modify the spatial property of the laser beams 512 and to produce a closely packed bundle of beams 532 for scanning by the galvo mirror 540 and the polygon scanner 550 as the scanning beams 520 projected onto the screen 101 to excite the phosphors and to generate the images by colored light emitted by the phosphors.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 520. The beam scanning thus maps the timely coded image signals in the beams 120 onto the spatial pixels on the screen 101.

Figure 6:
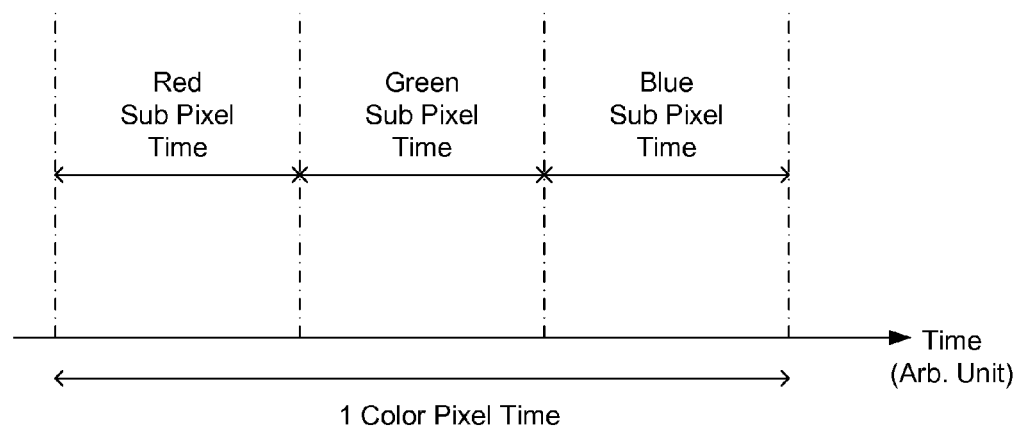
FIG. 6 shows one example for time division on each modulated laser beam 120 where each color pixel time is equally divided into three sequential time slots for the three color channels.

For example, FIG. 6 shows one example for time division on each modulated laser beam 120 where each color pixel time is equally divided into three sequential time slots for the three color channels. The modulation of the beam 120 may use pulse modulation techniques, such as pulse width modulation, pulse amplitude modulation or a combination of pulse width modulation and pulse amplitude modulation, to produce desired grey scales in each color, proper color combination in each pixel, and desired image brightness.

The beams 120 on the screen 101 are located at different and adjacent vertical positions with two adjacent beams being spaced from each other on the screen 101 by one horizontal line of the screen 101 along the vertical direction. For a given position of the galvo mirror 540 and a given position of the polygon scanner 550, the beams 120 may not be aligned with each other along the vertical direction on the screen 101 and may be at different positions on the screen 101 along the horizontal direction. The beams 120 can cover one portion of the screen 101. At a fixed angular position of the galvo mirror 540, the spinning of the polygon scanner 550 causes the beams 120 from N lasers in the laser array 510 to scan one screen segment of N adjacent horizontal lines on the screen 101. At the end of each horizontal scan, the galvo mirror 540 is adjusted to a different fixed angular position so that the vertical positions of all N beams 120 are adjusted to scan the next adjacent screen segment of N horizontal lines. This process iterates until the entire screen 101 is scanned to produce a full screen display.

Figure 7:
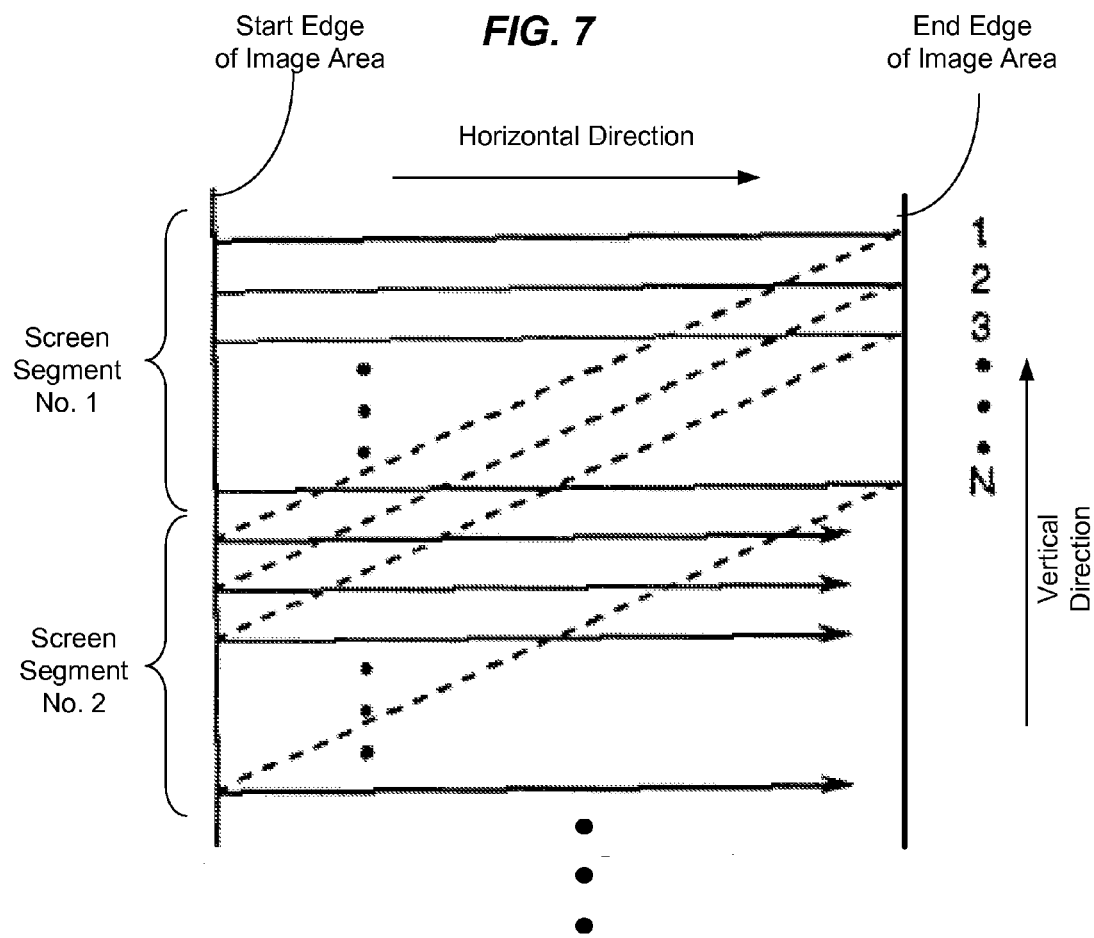
FIG. 7 shows one example for simultaneously scanning consecutive scan lines with multiple excitation laser beams.

FIG. 7 illustrates the above simultaneous scanning of one screen segment with multiple scanning laser beams 120 at a time. Visually, the beams 120 behaves like a paint brush to "paint" one thick horizontal stroke across the screen 101 at a time to cover one screen segment between the start edge and the end edge of the image area of the screen 101 and then subsequently to "paint" another thick horizontal stroke to cover an adjacent vertically shifted screen segment. Assuming the laser array 310 has 36 lasers, a 1080-line progressive scan of the screen 101 would require scanning 30 vertical screen segments for a full scan. Hence, this configuration in an effect divides the screen 101 along the vertical direction into multiple screen segments so that the N scanning beams scan one screen segment at a time with each scanning beam scanning only one line in the screen segment and different beams scanning different sequential lines in that screen segment. After one screen segment is scanned, the N scanning beams are moved at the same time to scan the next adjacent screen segment.

In the above design with multiple laser beams, each scanning laser beam 120 scans only a number of lines across the entire screen along the vertical direction that is equal to the number of screen segments. Hence, the polygon scanner 550 for the horizontal scanning can operate at slower speeds than scanning speeds required for a single beam design where the single beam scans every line of the entire screen. For a given number of total horizontal lines on the screen (e.g., 1080 lines in HDTV), the number of screen segments decreases as the number of the lasers increases. Hence, with 36 lasers, the galvo mirror and the polygon scanner scan 30 lines per frame while a total of 108 lines per frame are scanned when there are only 10 lasers. Therefore, the use of the multiple lasers can increase the image brightness which is approximately proportional to the number of lasers used, and, at the same time, can also advantageously reduce the response speeds of the scanning system.

A scanning display system described in this specification can be calibrated during the manufacture process so that the laser beam on-off timing and position of the laser beam relative to the fluorescent stripes in the screen 101 are known and are controlled within a permissible tolerance margin in order for the system to properly operate with specified image quality. However, the screen 101 and components in the laser module 101 of the system can change over time due to various factors, such as scanning device jitter, changes in temperature or humidity, changes in orientation of the system relative to gravity, settling due to vibration, aging and others. Such changes can affect the positioning of the laser source relative to the screen 101 over time and thus the factory-set alignment can be altered due to such changes. Notably, such changes can produce visible and, often undesirable, effects on the displayed images. For example, a laser pulse in the scanning excitation beam 120 may hit a subpixel that is adjacent to an intended target subpixel for that laser pulse due to a misalignment of the scanning beam 120 relative to the screen along the horizontal scanning direction. When this occurs, the coloring of the displayed image is changed from the intended coloring of the image. Hence, a red flag in the intended image may be displayed as a green flag on the screen. For another example, a laser pulse in the scanning excitation beam 120 may hit both the intended target subpixel and an adjacent subpixel next to the intended target subpixel due to a misalignment of the scanning beam 120 relative to the screen along the horizontal scanning direction. When this occurs, the coloring of the displayed image is changed from the intended coloring of the image and the image resolution deteriorates. The visible effects of these changes can increase as the screen display resolution increases because a smaller pixel means a smaller tolerance for a change in position. In addition, as the size of the screen increases, the effect of a change that can affect the alignment can be more pronounced because a large moment arm associated with a large screen means that an angular error can lead to a large position error on the screen. For example, if the laser beam position on the screen for a known beam angle changes over time, the result is a color shift in the image. This effect can be noticeable and thus undesirable to the viewer.

Implementations of various alignment mechanisms are provided in this specification to maintain proper alignment of the scanning beam 120 on the desired sub-pixel to achieved desired image quality. These alignment mechanisms include reference marks on the screen, both in the fluorescent area and in one or more peripheral area outside the fluorescent area, to provide feedback light that is caused by the excitation beam 120 and represents the position and other properties of the scanning beam on the screen. The feedback light can be measured by using one or more optical servo sensors to produce a feedback servo signal. A servo control in the laser module 110 processes this feedback servo signal to extract the information on the beam positioning and other properties of the beam on the screen and, in response, adjust the direction and other properties of the scanning beam 120 to ensure the proper operation of the display system.

For example, a feedback servo control system can be provided to use peripheral servo reference marks positioned outside the display area unobservable by the viewer to provide control over various beam properties, such as the horizontal positioning along the horizontal scanning direction perpendicular to the fluorescent stripes, the vertical positioning along the longitudinal direction of the fluorescent stripes, the beam focusing on the screen for control the image sharpness, and the beam power on the screen for control the image brightness. For another example, a screen calibration procedure can be performed at the startup of the display system to measure the beam position information as a calibration map so having the exact positions of sub-pixels on the screen in the time domain. This calibration map is then used by the laser module 110 to control the timing and positioning of the scanning beam 120 to achieve the desired color purity. For yet another example, a dynamic servo control system can be provided to regularly update the calibration map during the normal operation of the display system by using servo reference marks in the fluorescent area of the screen to provide the feedback light without affecting the viewing experience of a viewer.

The following sections first describe examples of screen detection techniques and servo feedback implementations.

Two optical detection methods can be used to detect the location of a beam relative to a target feature on the screen, which may be a subpixel or a selected position on the screen such as the beginning edge of the fluorescent area. In the first optical detection method, the light impinging on a servo reference mark for the target feature can be guided as the feedback light through air or other medium to reach one or more respective optical servo sensing detectors which convert the optical light levels of the feedback light into electrical amplitude signals. The second optical detection method uses one or more optical servo sensing detectors placed in air to collect diffused light from a servo reference mark on the screen as the feedback light for the servo control. In detecting diffused light, an optical servo sensing detector can be placed behind a collection lens such as a hemispherical lens. Radiation detectors can be used to detect feedback light from diffusive type targets, e.g., targets that allow the light to diffuse in a wide angular spectrum. An example of a diffuse target is a rough surface such as a surface with a white paint. Both techniques can be used with reflective or transmissive servo reference marks.

FIG. 8 shows an exemplary scanning beam display system with an on-screen optical sensing unit and a feedback control to allow the laser module 110 to correct the horizontal misalignment. The screen 101 includes an on-screen optical sensing unit 810 for optically measuring the responses of color subpixels on the screen 101 to produce a sensor feedback signal 812. The laser module 110 has a feedback control to allow the laser module 110 to correct the misalignment in response to the feedback signal 812 from the screen 101.

FIG. 9 shows one example of the on-screen optical sensing unit 810 which includes three optical "direct" detectors PD1, PD2 and PD3 that are respectively configured to respond to red, green and blue light. In this specific example, three beam splitters BS1, BS2 and BS3 are placed behind red, green and blue subpixels of a color pixel, respectively and are used to split small fractions of red, green, and blue light beams emitted from the color sub pixels of the color pixel to the three detectors PD1, PD2 and PD3 formed on the front substrate of the screen 101. Alternatively, the above red, green and blue optical detectors PD1, PD2 and PD3 may also be positioned on the screen 101 to allow each detector to receive light from multiple pixels on the screen 101. Each optical detector is only responsive to its designated color to produce a corresponding detector output and does not produce a detector output when receiving light of other colors. Hence, the red optical detector PD1 detects only the red light and is not responsive to green and blue light; the green optical detector PD 2 detects only green light and is not responsive to red and blue light; and the blue optical detector PD3 detects only the blue light and is not responsive to red and green light. This color selective response of the one-screen optical sensing unit 810 may be achieved by, e.g., using red, green and blue optical bandpass filters in front of the optical detectors PD1, PD2 and PD3, respectively, when each detector is exposed to light of different colors from the screen 101, or placing the optical detectors PD1, PD2 and PD3 in a way that only light of a designated color can enter a respective optical detector for the designated color. Assume the adjacent color phosphor stripes are arranged in the order of red, green and blue from the left to the right in the horizontal direction of the screen 101. Consider a situation where a red image is generated by the display processor in the laser module 110. When the horizontal alignment is out of order or misaligned by one sub pixel, the red detector does not respond while either the blue detector or the green detector produces an output. Such detector outputs can be processed by the feedback control in the laser module 110 to detect the horizontal misalignment and, accordingly, can adjust the timing of the optical pulses in the scanning beam to correct misalignment.

Alternative to the beam splitter in FIG. 9 a light guide or light pipe can be used. Light guides are structures that guide a portion of the light to an optical servo sensing detector. A light guide can be formed on the screen to direct feedback light via total internal reflection (TIR) in the light guide to the detector.

Figure 10:
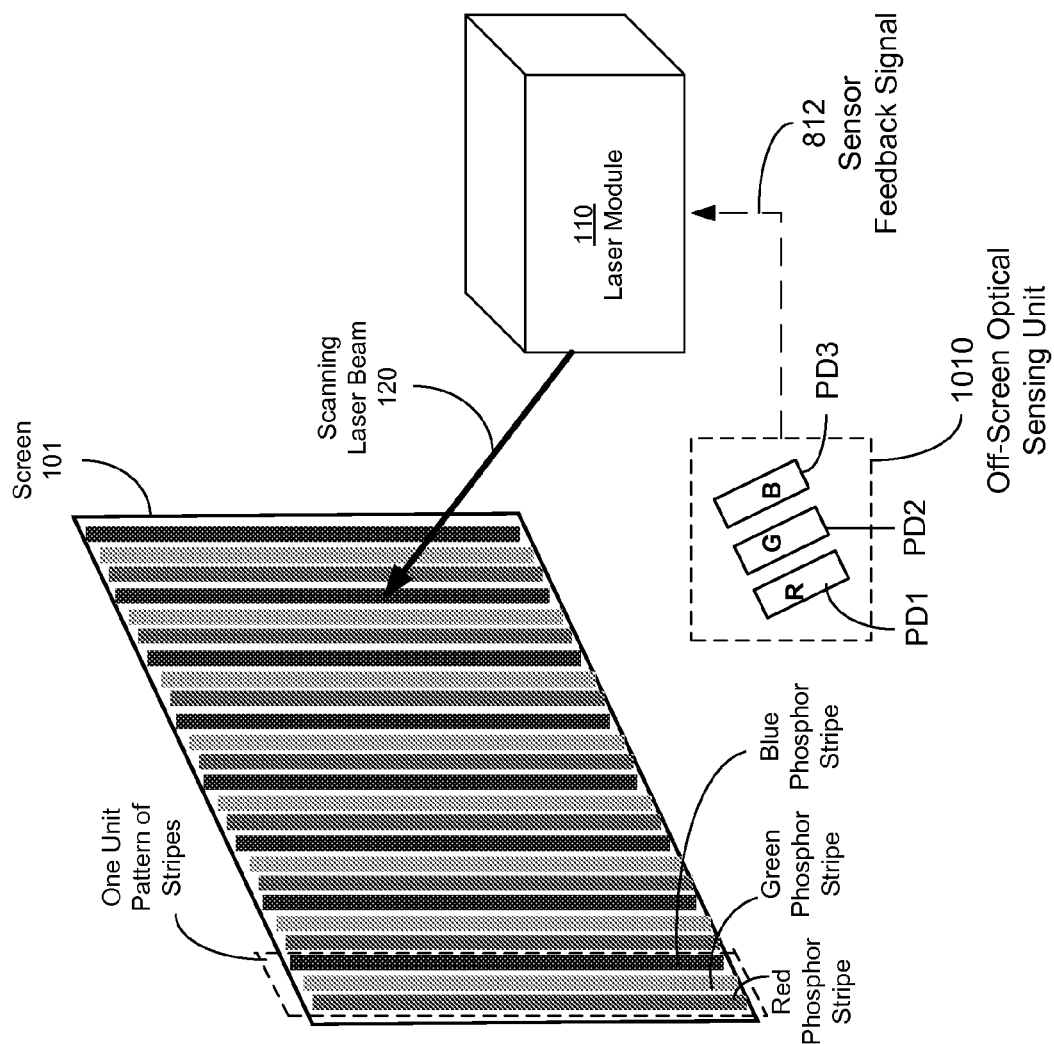
FIG. 10 shows one example of a scanning display system using a servo feedback control and an off-screen optical sensing unit.

FIG. 10 shows another scanning beam display system with a servo feedback control using a radiation style detector. In this system, an off-screen optical sensing unit 1010 is used to detect the red, green and blue light emitted from the screen. Three optical detectors PD1, PD2 and PD3 are provided in the sensing unit 1010 to detect the red, green and blue fluorescent light, respectively. Each optical detector is designed to receive light from a part of or the entire screen. A bandpass optical filter can be placed in front of each optical detector to select a designated color while rejecting light of other colors.

For the screen 101, additional alignment reference marks can be used to determine the relative position of the beam and the screen and other parameters of the excitation beam on the screen. For example, during a horizontal scan of the excitation beam 120 across the fluorescent stripes, a start of line mark can be provided for the system to determine the beginning of the active fluorescent display area of the screen 101 so that the signal modulation controller of the system can begin to deliver optical pulses to the targeted pixels. An end of line mark can also be provided for the system to determine the end of the active fluorescent display area of the screen 101 during a horizontal scan. For another example, a vertical alignment referenced mark can be provided for the system to determine whether the beam 120 is pointed to a proper vertical location on the screen. Other examples for reference marks may be one or more reference marks for measuring the beam spot size on the screen and one or more reference marks on the screen to measure the optical power of the excitation beam 120. Such reference marks can be placed a region outside the active fluorescent area of the screen 101, e.g., in one or more peripheral regions of the active fluorescent screen area.

Figure 11:
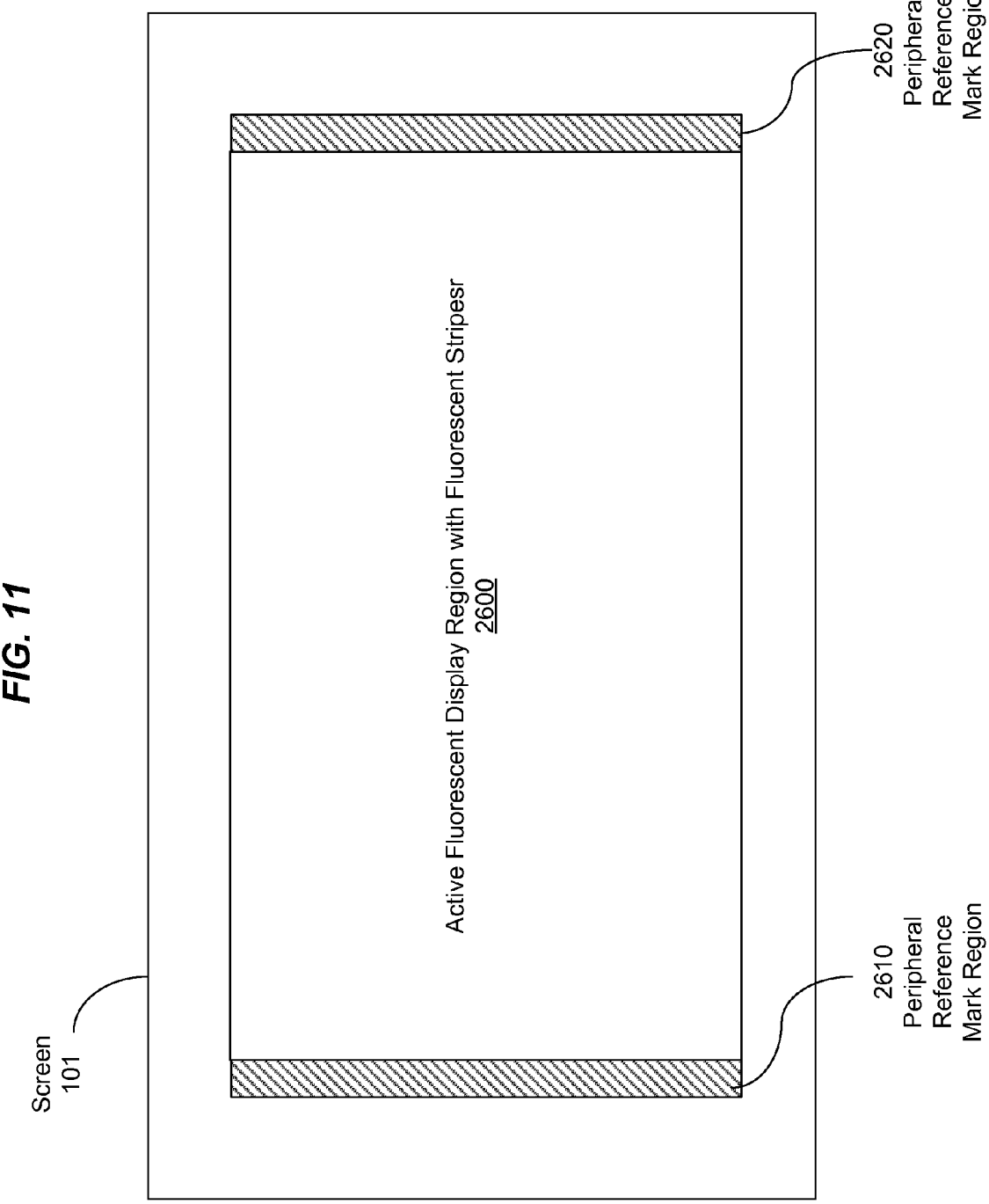
FIG. 11 shows an example of a fluorescent screen having peripheral reference mark regions that include servo reference marks that produce feedback light for various servo control functions.

FIG. 11 illustrates one example of a fluorescent screen 101 having peripheral reference mark regions. The screen 101 includes a central active fluorescent area 2600 with parallel fluorescent stripes for displaying images, two stripe peripheral reference mark regions 2610 and 2620 that are parallel to the fluorescent stripes. Each peripheral reference mark region can be used to provide various reference marks for the screen 101. In some implementations, only the left peripheral reference mark region 2610 is provided without the second region 2620 when the horizontal scan across the fluorescent stripes is directed from the left to the right of the area 2600.

Such a peripheral reference mark region on the screen 101 allows the scanning display system to monitor certain operating parameters of the system. Notably, because a reference mark in the peripheral reference mark region is outside the active fluorescent display area 2600 of the screen 101, a corresponding servo feedback control function can be performed outside the duration during the display operation when the excitation beam is scanning through the active fluorescent display area 2600 to display image. Therefore, a dynamic servo operation can be implemented without interfering the display of the images to the viewer. In this regard, each scan can include a CW mode period when an excitation beam sans through the peripheral referenced mark region for the dynamic servo sensing and control and a display mode period when the modulation of the excitation beam is turned on to produce image-carrying optical pulses as the excitation beam sans through the active fluorescent display area 2600.

Figure 12:
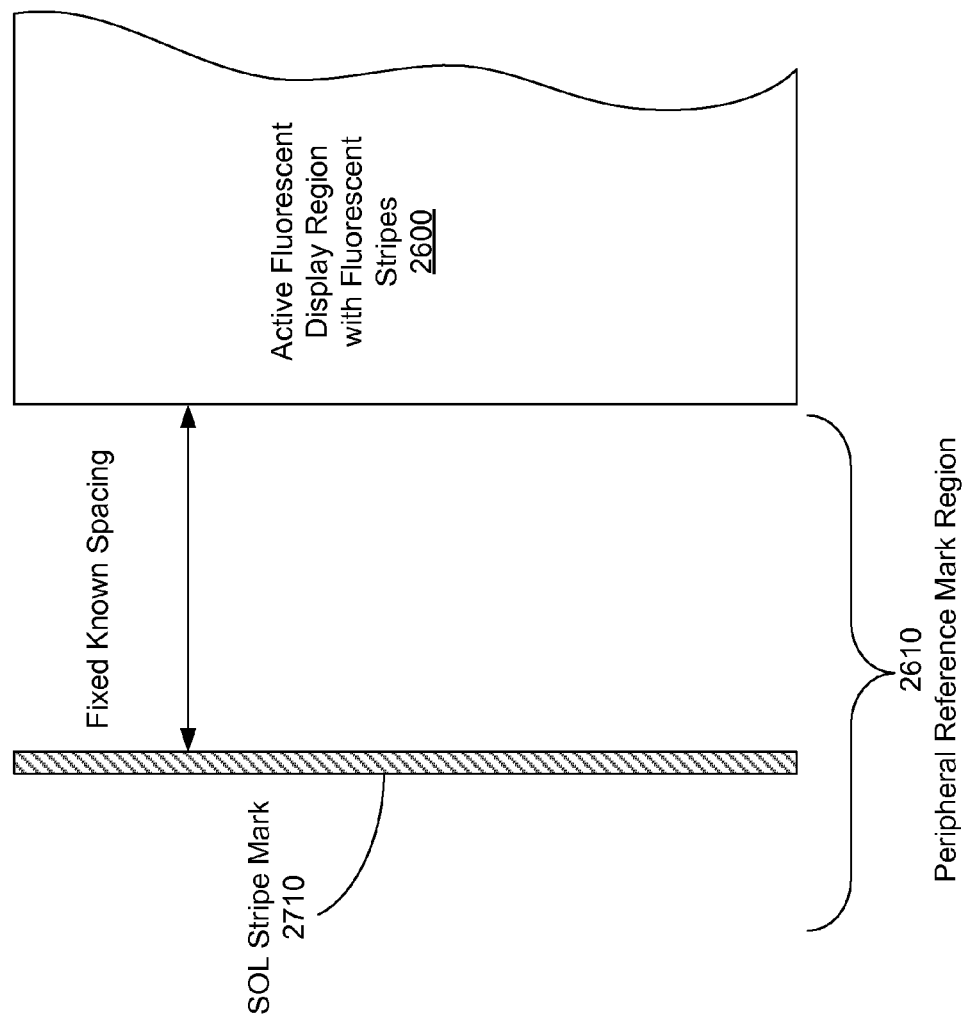
FIG. 12 shows a start of line reference mark in a peripheral reference mark region to provide a reference for the beginning of the active fluorescent area on the screen.

FIG. 12 shows an example of a start of line (SOL) reference mark 2710 in the left peripheral region 2610 in the screen 101. The SOL reference mark 2710 can be an optically reflective, diffusive or fluorescent stripe parallel to the fluorescent stripes in the active fluorescent region 2600 of the screen 101. The SOL reference mark 2710 is fixed at a position with a known distance from the first fluorescent stripe in the region 2600. SOL patterns may include multiple vertical lines with uniform or variable spacing. Multiple lines are selected for redundancy, increasing signal to noise, accuracy of position (time) measurement, and providing missing pulse detection.

In operation, the scanning excitation beam 120 is scanned from the left to the right in the screen 101 by first scanning through the peripheral reference mark region 2610 and then through the active fluorescent region 2600. When the beam 120 is in the peripheral reference mark region 2610, the signal modulation controller in the laser module 110 of the system sets the beam 120 in a CW mode without the modulated optical pulses that carry the image data. When the scanning excitation beam 120 scans through the SOL reference mark 2710, the light reflected, scattered or emitted by the SOL reference mark 2710 due to the illumination by the excitation beam 2710 can be measured at an SOL optical detector located near the SOL reference mark 2710. The presence of this signal indicates the location of the beam 120. The SOL optical detector can be fixed at a location in the region 2610 on the screen 101 or off the screen 101. Therefore, the SOL reference mark 2710 can be used to allow for periodic alignment adjustment during the lifetime of the system.

The laser beam is turned on continuously as a CW beam before the beam reaches the SOL mark 2710 in a scan. When the pulse from the SOL detected is detected, the laser can be controlled to operate in the image mode and carry optical pulses with imaging data. The system then recalls a previously measured value for the delay from SOL pulse to beginning of the image area. This process can be implemented in each horizontal scan to ensure that each line starts the image area properly aligned to the color stripes. The correction is made prior to painting the image for that line, so there is no lag in correction allowing for both high frequency (up to line scan rate) and low frequency errors to be corrected.

Physical implementation of the SOL sensor may be a reflective (specular or diffuse) pattern with an area detector(s), an aperture mask with light pipe to collect the transmitted light into a single detector or multiple detectors.

With reflective method, multiple lasers on and passing over reflective areas simultaneously may create self interference. A method to prevent this is to space the laser beams such that only one active beam passes over the reflective area at a time. It is likely that some reflection will come from the image area of the screen. To prevent this from interfering with the SOL sensor signal, the active laser beams may be spaced such that no other laser beams are active over any reflective area when the desired active laser beam is passing over the reflective SOL sensor area. The transmission method is not affected by reflections from the image area.

Similar to the SOL mark 2710, an end-of-line (EOL) reference mark can be implemented on the opposite side of the screen 101, e.g., in the peripheral reference mark region 2620 in FIG. 11. The SOL mark is used to ensure the proper alignment of the laser beam with the beginning of the image area. This does not ensure the proper alignment during the entire horizontal scan because the position errors can be present across the screen. Implementing the EOL reference mark and an end-of-line optical detector in the region 2620 can be used to provide a linear, two point correction of laser beam position across the image area.

When both SOL and EOL marks are implemented, the laser is turned on continuously in a continuous wave (CW) mode prior to reaching the EOL sensor area. Once the EOL signal is detected, the laser can be returned to image mode and timing (or scan speed) correction calculations are made based on the time difference between the SOL and EOL pulses. These corrections are applied to the next one or more lines. Multiple lines of SOL to EOL time measurements can be averaged to reduce noise.

In addition to control of the horizontal beam position along the scan direction perpendicular to the fluorescent stripes, the beam position along the vertical position parallel to the fluorescent stripes can also be monitored and controlled to ensure the image quality. Referring to FIG. 2B, each fluorescent stripe may not have any physical boundaries between two pixels along the vertical direction. This is different from the pixilation along the horizontal scan direction perpendicular to the fluorescent stripes. The pixel positions along the fluorescent stripes are controlled by the vertical beam position on the screen to ensure a constant and uniform vertical pixel positions without overlapping and gap between two different horizontal scan lines. Referring to the multi-beam scanning configuration in FIG. 7, when multiple excitation beams are used to simultaneously scan consecutive horizontal scan within one screen segment on the screen, the proper vertical alignment of the lasers to one another are important to ensure a uniform vertical spacing between two adjacent laser beams on the screen and to ensure a proper vertical alignment between two adjacent screen segments along the vertical direction. In addition, the vertical positioning information on the screen can be used to provide feedback to control the vertical scanner amplitude and measure the linearity of the vertical scanner.

Vertical position of each laser can be adjusted by using an actuator, a vertical scanner such as the galvo mirror 540 in FIG. 5, an adjustable lens in the optical path of each laser beam or a combination of these and other mechanisms. Vertical reference marks can be provided on the screen to allow for a vertical servo feedback from the screen to the laser module. One or more reflective, fluorescent or transmissive vertical reference marks can be provided adjacent to the image area of the screen 101 to measure the vertical position of each excitation beam 120. Referring to FIG. 11, such vertical reference marks can be placed in a peripheral reference mark region. One or more vertical mark optical detectors can be used to measure the reflected, fluorescent or transmitted light from a vertical reference mark when illuminated by the excitation beam 120. The output of each vertical mark optical detector is processed and the information on the beam vertical position is used to control an actuator to adjust the vertical beam position on the screen 101.

Figure 13:
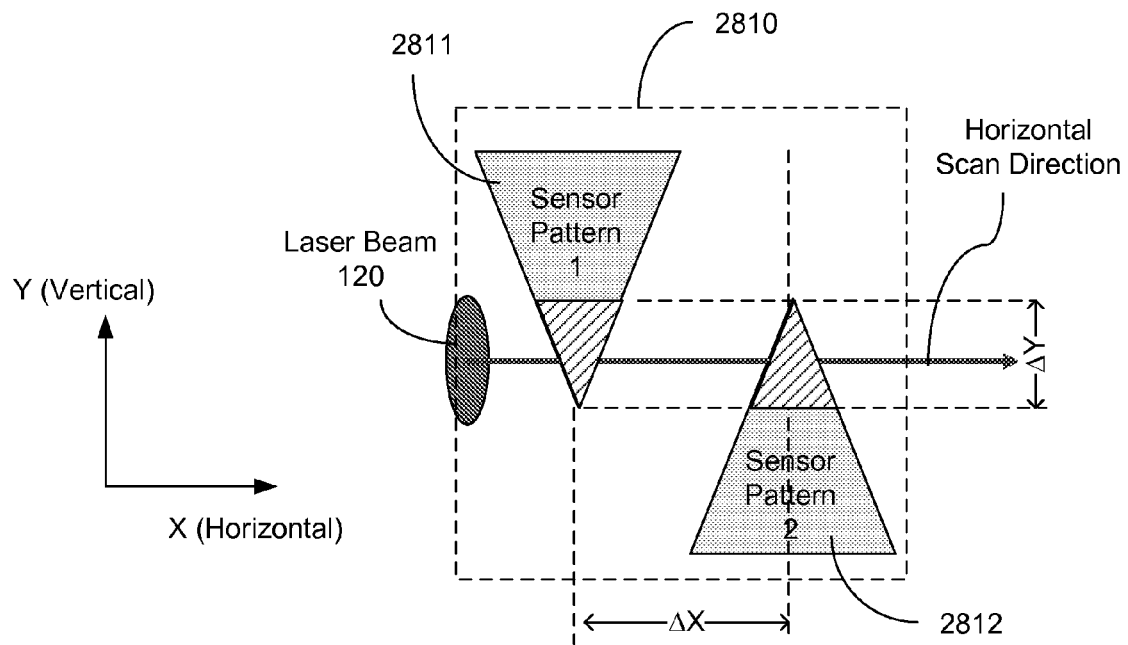
FIG. 13 shows an example of a vertical beam position reference mark for the screen in FIG. 11.

FIG. 13 shows an example of a vertical reference mark 2810. The mark 2810 includes is a pair of identical triangle reference marks 2811 and 2812 that are separated and spaced from each other in both vertical and horizontal directions to maintain an overlap along the horizontal direction. Each triangle reference mark 2811 or 2812 is oriented to create a variation in the area along the vertical direction so that the beam 120 partially overlaps with each mark when scanning through the mark along the horizontal direction. As the vertical position of the beam 120 changes, the overlapping area on the mark with the beam 120 changes in size. The relative positions of the two marks 2811 and 2812 defines a predetermined vertical beam position and the scanning beam along a horizontal line across this predetermined vertical position scans through the equal areas as indicated by the shadowed areas in the two marks 2811 and 2812. When the beam position is above this predetermined vertical beam position, the beam sees a bigger mark area in the first mark 2811 than the mark area in the second mark 2812 and this difference in the mark areas seen by the beam increases as the beam position moves further up along the vertical direction. Conversely, when the beam position is below this predetermined vertical beam position, the beam sees a bigger mark area in the second mark 2812 than the mark area in the first mark 2811 and this difference in the mark areas seen by the beam increases as the beam position moves further down along the vertical direction.

The feedback light from each triangle mark is integrated over the mark and the integrated signals of the two marks are compared to produce a differential signal. The sign of the differential signal indicated the direction of the offset from the predetermined vertical beam position and the magnitude of the differential signal indicates the amount of the offset. The excitation beam is at the proper vertical position when the integrated light from each triangle is equal, i.e., the differential signal is zero.

Figure 14A:
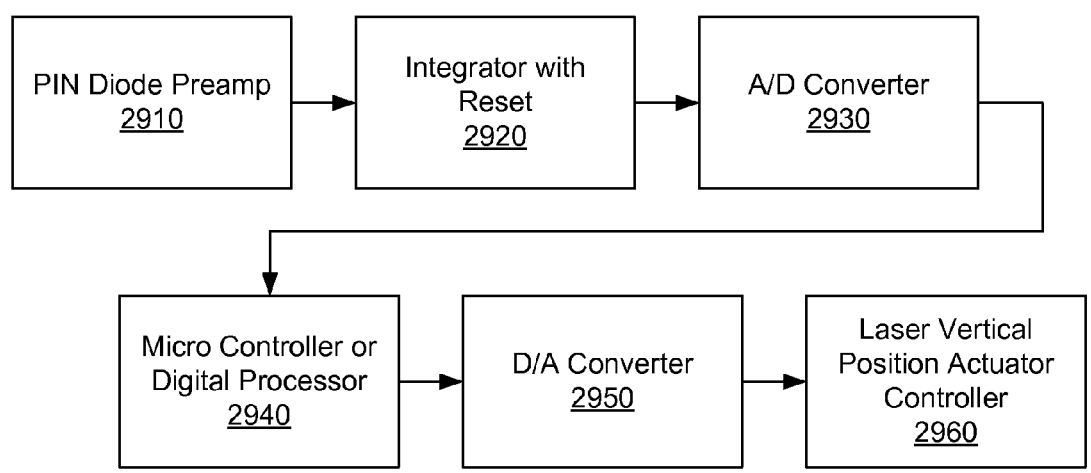
FIGS. 14A and 14B show a servo feedback control circuit and its operation in using the vertical beam position reference mark in FIG. 13 to control the vertical beam position on the screen.
Figure 14B:
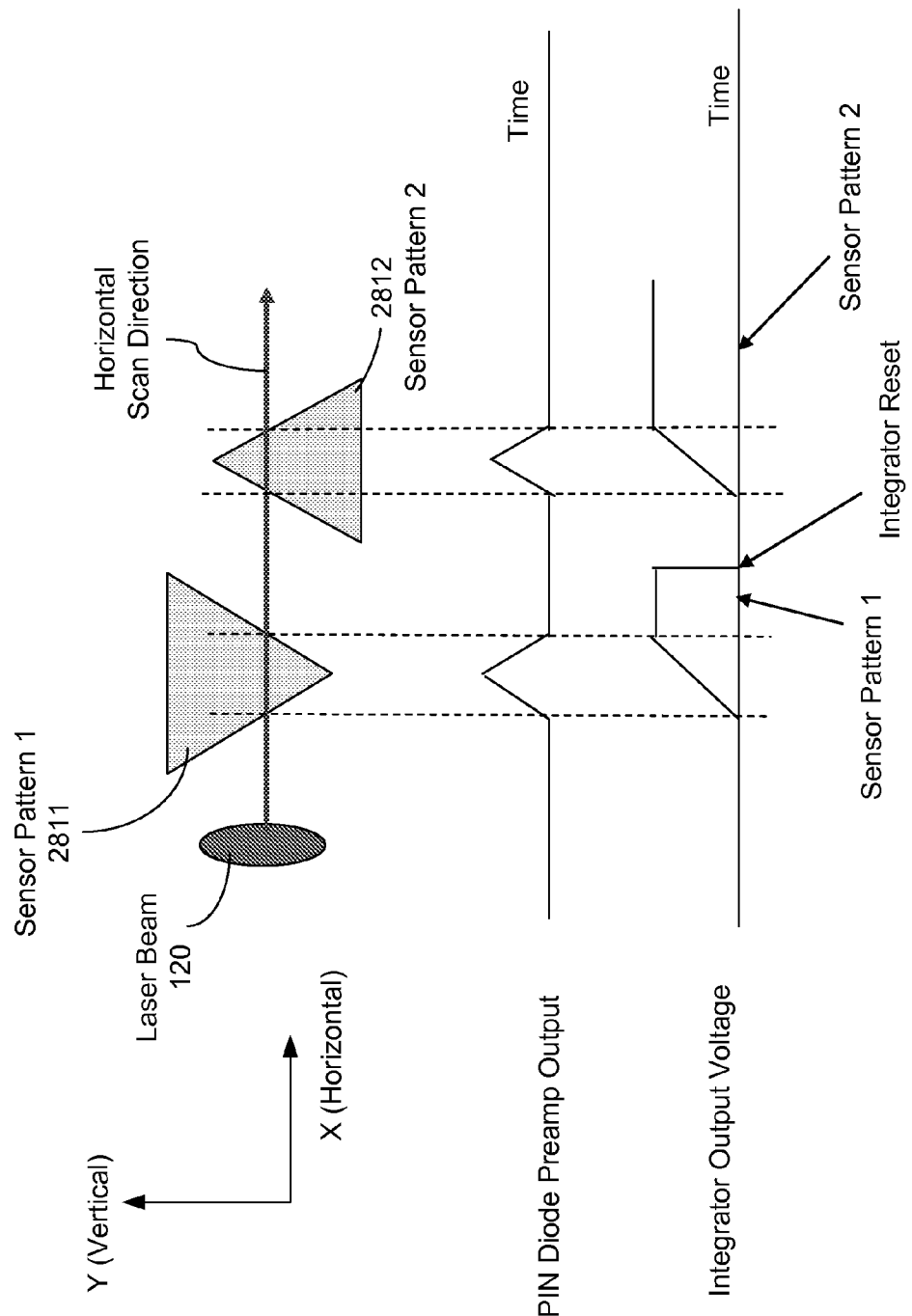

FIG. 14A shows a portion of the signal processing circuit as part of the vertical beam position servo feedback control in the laser module 110 for the vertical reference mark in FIG. 13. A PIN diode preamplifier 2910 receives and amplifies the differential signal for the two reflected signals from the two marks 2811 and 2812 and directs the amplified differential signal to an integrator 2920. An analog-to-digital converter 2930 is provided to convert the differential signal into a digital signal. A digital processor 2940 processes the differential signal to determine the amount and direction of the adjustment in the vertical beam position and accordingly produces a vertical actuator control signal. This control signal is converted into an analog control signal by a digital to analog converter 2950 and is applied to a vertical actuator controller 2960 which adjusts the actuator. FIG. 14B further shows generation of the differential signal by using a single optical detector.

Figure 16:
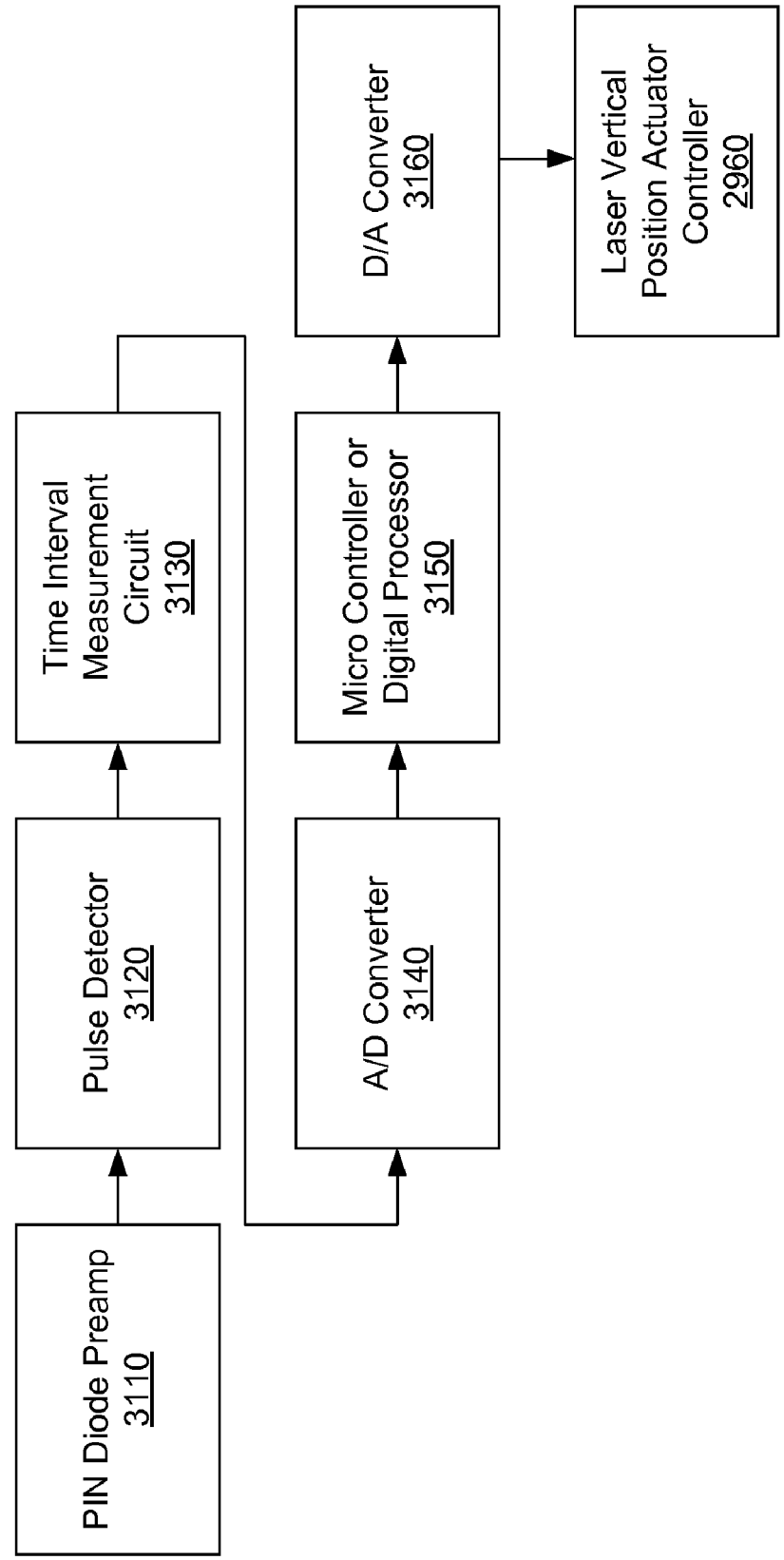

FIG. 15 shows another example of a vertical reference mark 3010 and a portion of the signal processing in a servo control circuit in FIG. 16. The mark 3010 includes a pair of reference marks 3011 and 3012 that are separated and spaced from each other in the horizontal scan direction and the horizontal distance DX(Y) between the two marks 3011 and 3012 is a monotonic function of the vertical beam position Y. The first mark 3011 can be a vertical stripe and the second mark 3012 can be a stripe at a slanted angle from the vertical direction. For a given horizontal scanning speed on the screen, the time for the beam to scan from the first mark 3011 to the second mark 3022 is a function of the vertical beam position. For a predetermined vertical beam position, the corresponding scan time for the beam to scan through the two marks 3011 and 3012 is a fixed scan time. One or two optical detectors can be used to detect the reflected light from the two marks 3011 and 3012 and the two optical pulses or peaks reflected by the two marks for the excitation beam 120 in the CW mode can be measured to determine the time interval between the two optical pulses. The difference between the measured scan time and the fixed scan time for the predetermined vertical beam position can be used to determine the offset and the direction of the offset in the vertical beam position. A feedback control signal is then applied to the vertical, actuator to reduce the vertical offset.

FIG. 16 shows a portion of the signal processing circuit as part of the vertical beam position servo feedback control in the laser module 110 for the vertical reference mark in FIG. 15. A PIN diode preamplifier 3110 receives and amplifies the detector output signal from an optical detector that detects the reflected light from the two marks 3011 and 3012 during a horizontal scan. The amplified signal is processed by a pulse detector 3120 to produce corresponding pulses corresponding to the two optical pulses at different times in the reflected light. A time interval measurement circuit 3130 is used to measure the time between the two pulses and this time measurement is converted into a digital signal in a analog to digital converter 3140 for processing by a digital processor 3150. The digital processor 3150 determines the amount and direction of the an adjustment in the vertical beam position based on the measured time and accordingly produces a vertical actuator control signal. This control signal is converted into an analog control signal by a digital to analog converter 3160 and is applied to a vertical actuator controller 2960 which adjusts the actuator.

A vertical reference mark may also be implemented by using a single triangular reference mark shown in FIG. 13 where the single triangle reference mark 2811 or 2812 is oriented to create a variation in the horizontal dimension of the mark along the vertical direction so that the beam 120 partially overlaps with the mark when scanning through the mark along the horizontal direction. When the vertical position of the beam 120 changes, the horizontal width of the mark scanned by the beam 120 changes. Hence, when the beam 120 scans over the mark, an optical pulse is generated in the reflected or fluorescent light generated by the mark and the width of the generated optical pulse is proportional to the horizontal width of the mark which is a function of the vertical beam position. At a predetermined vertical beam position, the optical pulse width is a fixed value. Therefore, this fixed optical pulse width can be used as a reference to determine the vertical position of the beam 120 relative to the predetermined vertical beam position based on the difference between the optical pulse width associated with the scanning of the beam 120 across the mark. An optical detector can be placed near the mark to detector the reflected or fluorescent light from the mark and the difference in the width of the pulse from the fixed value can be used to as a feedback control to adjust the vertical actuator for the beam 120 to reduce the offset of the vertical beam position.

In implementing multiple lasers for simultaneously scanning consecutive lines within one of multiple screen segments as shown in FIG. 7, two separate vertical positioning servo control mechanisms can be implemented. The first vertical positioning servo control is to control the line to line spacing of different horizontal lines scanned by different lasers at the same time within each screen segment. Accordingly, at each line, a vertical reference mark and an associated optical detector are needed to provide servo feedback to control the vertical beam position of each laser beam. Hence, this first vertical servo control mechanism includes N vertical servo feedback controls for the N lasers, respectively.

The second vertical positioning servo control is to control the vertical alignment between two adjacent screen segments by using the galvo mirror 540 in FIG. 5 to vertically move all N laser beams, after completion of scanning one screen segment, to an adjacent screen segment. This can be achieved by controlling the galvo mirror 540 to make a common adjustment in the vertical direction for all N laser beams. The vertical reference mark in the peripheral reference mark region 2610 in FIG. 11 and the associated optical detector for the top line in each screen segment can be used to measure the vertical position of the first of the N laser beams when the beams are still scanning through the peripheral reference mark region 2610 in FIG. 11. This vertical information obtained in this measurement is used as a feedback signal to control the vertical angle of the galvo mirror 540 to correct any vertical error indicated in the measurement. In implementations, this correction can lead to a small amplitude (microjog) correction signal to the vertical galvo 540 for that scan line.

The vertical alignment between two adjacent screen segments is determined by a number of factors, including the galvo linearity at different galvo angles of the galvo mirror 540, the polygon pyramidal errors of the polygon scanner 550, and optical system distortions caused by various reflective and refractive optical elements such as mirrors and lenses. The polygon pyramidal errors are errors in the vertical beam positions caused by different tilting angles in the vertical direction at different polygon facets of the polygon 550 due to the manufacturing tolerance. One manufacturing tolerance on the polygon mirror is the pyramidal error of the facets. The implementation of the second vertical positioning servo control can compensate for the polygon pyramidal errors and thus a relatively inexpensive polygon scanner can be used in the present scanning display systems without significantly compromising the display quality.

The second vertical servo control based on the galvo micro-jog correction signal can also use a look-up table of pyramidal error values of the polygon 550. The pyramidal errors in this look-up table can be obtained from prior measurements. When a pyramidal error does not change significantly with temperature, humidity and others, this look-up table method may be sufficient without using the servo feedback based on a measured vertical beam position using the vertical reference mark described above. In implementation, the feedback control needs the identification of the polygon facet that is currently scanning a line and thus can retrieve the corresponding pyramidal error value for that polygon facet from the look-up table. The identification of the current polygon facet can be determined from a facet number sensor on the polygon 550.

Figure 17:
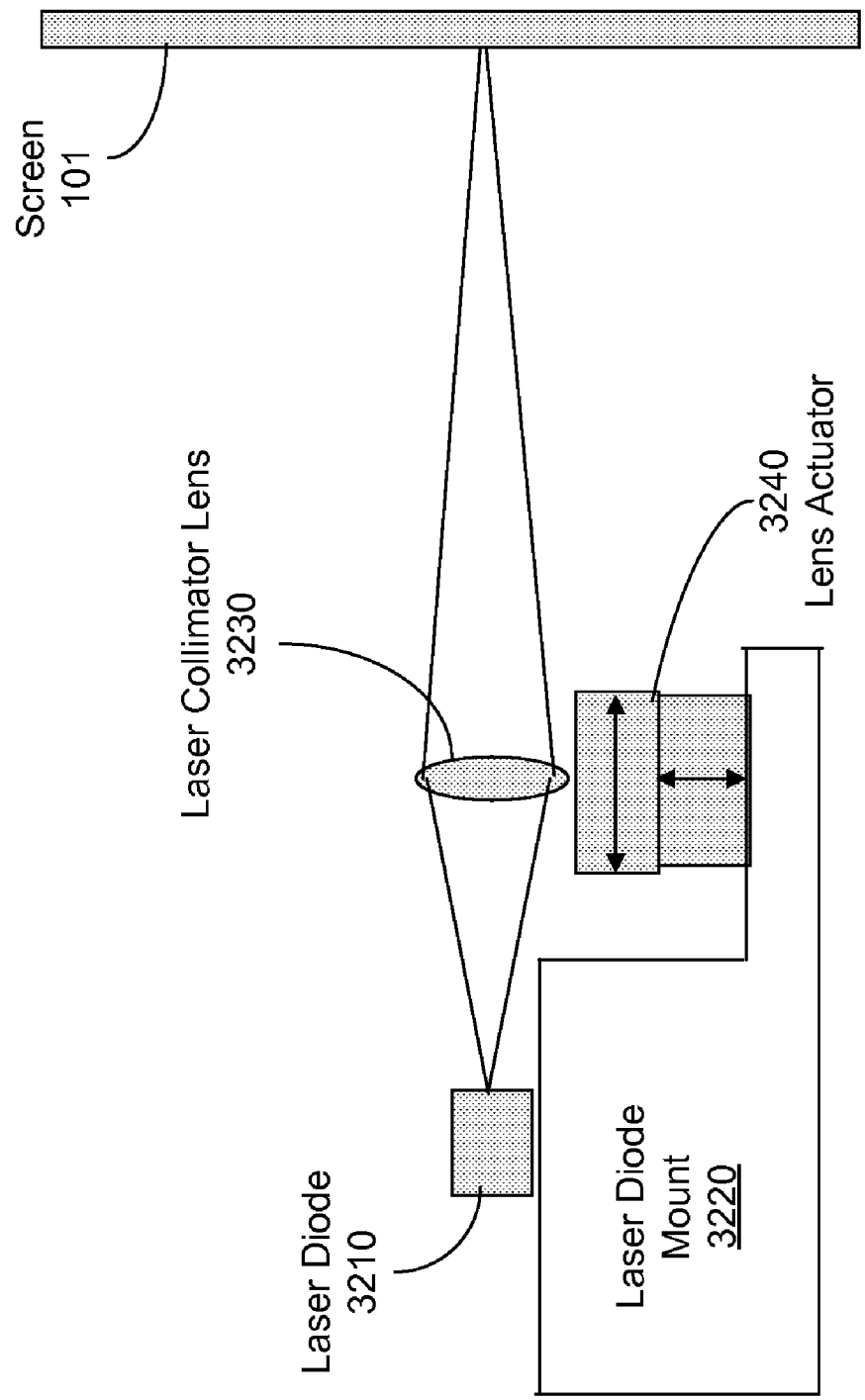
FIG. 17 shows an example of a laser actuator that controls the vertical direction of the laser beam for the servo control of the vertical beam position on the screen.

In the above vertical servo feedback control for each individual laser, a laser actuator is used to adjust the vertical direction of the laser beam in response to the servo feedback and to place the beam at a desired vertical beam position along a fluorescent stripe on the screen. FIG. 17 shows one example of a laser actuator 3240 engaged to a collimator lens 3230 which is placed in front of a laser diode 3210 to collimate the laser beam produced by the laser 3210. The collimated beam out of the collimator lens 3230 is scanned by the galvo mirror 540 and the polygon scanner 550 and is projected on the screen 101 by the scan lens 560. The laser diode 3210, the collimator lens 3230 and the lens actuator 3240 are mounted on a laser mount 3220. The lens actuator 3240 can adjust the vertical position of the collimator lens 3230 along the vertical direction that is substantially perpendicular to the laser beam. This adjustment of the collimator lens 3230 changes the vertical direction of the laser beam and thus the vertical beam position on the screen 101. The lens actuator 3240 may also move the position of the collimator lens 3230 along the propagation direction of the laser beam and thus the focusing of the collimator lens 3230 on the laser beam. This adjustment can change the beam spot size on the screen 101.

The beam spot size for each excitation beam 120 on the screen 101 needs to be controlled to be less than each subpixel size to achieve the desired display resolution and color purity. If the beam spot size is larger than each subpixel, a portion of the beam can spill over into an adjacent fluorescent stripe to excite one or two wrong colors and reduce the amount of fluorescent light emitted in that subpixel. These effects can degrade the image quality such as the image resolution and color saturation. The focusing of a scanning excitation beam in a scanning display system can set an optimal focusing condition at the factory. This factory focusing setting, however, can change due to variations in temperature and other factors. Therefore, a beam focusing servo control can be implemented to maintain the proper beam focusing.

FIG. 18 illustrate a focus sensing mark 3310 located in a peripheral reference mark region 2610 or 2620 on the screen 101. The focus sensing mark 3310 can be optically reflective, fluorescent or transmissive to measure the beam spot size. An optical detector can be placed near the focus sensing mark 3310 to produce a detector signal that carries the beam spot size information. A servo feedback control can be used to adjust the focusing of the laser beam on the screen 101. For example, the collimator lens 3230 can be adjusted by using the lens actuator 3240 in FIG. 17 along the beam propagation direction to alter the focusing of the beam on the screen 101.

In the example in FIG. 18, the focus sensing mark 3310 includes multiple vertical stripe marks 3311 parallel to the fluorescent stripes and arranged in a periodic array along the horizontal scan direction. The stripe width and the spacing between two adjacent stripes are equal to the desired spot width. In operation, the laser beam is turned on continuously in a continuous wave (CW) mode while passing over the focus sensing mark 3310. A detector monitors the reflected (or transmitted) light from the focus sensing mark 3310 as the laser beam scans across the focus sensing mark 3310. If the beam spot size is of the desired size, the intensity of the feedback light generated by the focus sensing mark 3310 is a sine wave with 100% modulation as shown by the trace 3302. When the beam spot size is greater than the desired in size, the modulation depth decreases. Hence, measuring the modulation of the signal can be used to infer the spot size and to control the focusing of the laser beam. In some implementations, a second focus sensing mark can be placed on the screen 101 at a different depth (optical path length from laser to screen). The signal modulations measured from the two focus sensing mark can be compared to determine which way the focusing should be adjusted to reduce beam size.

A power sensing mark may also be provided in the peripheral reference mark region on the screen 101 to direct a portion of the scanning excitation beam 120 into a detector to monitor the laser power. This feature can be used to monitor the laser power dynamically during operation. FIG. 19 shows a wide vertical stripe parallel to the fluorescent stripes as the power sensing mark 3410. FIG. 19 further shows other marks in the peripheral reference mark region 2610. Other reference marks are also shown in the region 2610. In operation, the laser is turned on in a CW mode with a predetermined drive current prior to passing over the power sensing mark 3410. The driving currents of the laser can varied when measuring the laser power in different scan lines to allow real time mapping of the power-current curve of the laser. The power measurements obtained from multiple scan lines can be averaged to reduce noise in the detection.

One way to correct the horizontal misalignment in the above display systems in FIGS. 8 and 10 is to program the display processor in the laser module 110 to delay the modulated image signal carried by the modulated laser beam 120 by one sub color pixel time slot if the green detector has an output and red and blue detectors have no output or by two sub color pixel time slots if the blue detector has an output and red and green detectors have no output. This correction of a spatial alignment error by a time delay may be achieved digitally within the display processor. No physical adjustment in the optical scanning and imaging units in the laser module 110 is needed. Alternatively, the optical imaging units and the scanning units in the laser module 110 may be adjusted to physically shift the position of the excitation beam 120 on the screen 101 so that the laser position on the screen 101 is adjusted horizontally to the left or right by one sub pixel in response to the error detected by the on-screen optical sensing unit 810. The optical alignment by physically adjusting the scanning laser beam 120 and the electronic or digital alignment by controlling the timing of optical pulses can be combined to control the proper horizontal alignment.

Figure 20A:
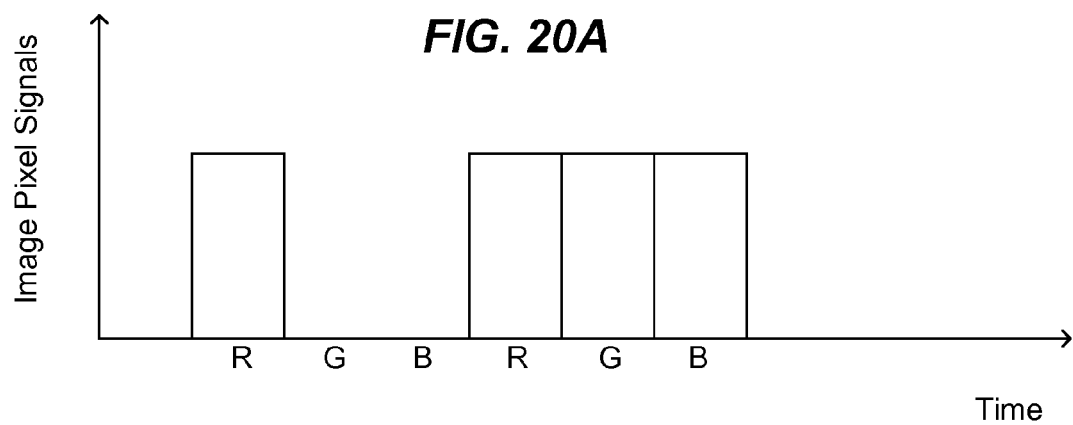
FIGS. 20A, 20B, 20C and 20D illustrate an operation of the servo feedback control in scanning display system in FIG. 8 based on detecting a test pattern for red, green and blue colors.
Figure 20B:
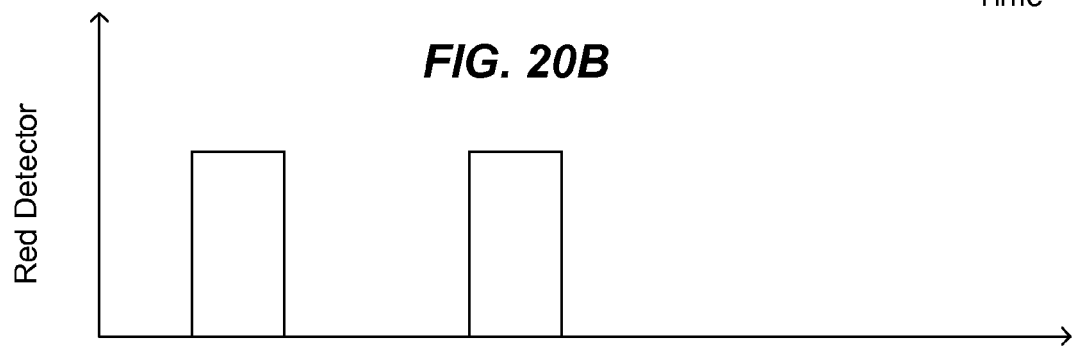
Figure 20C:
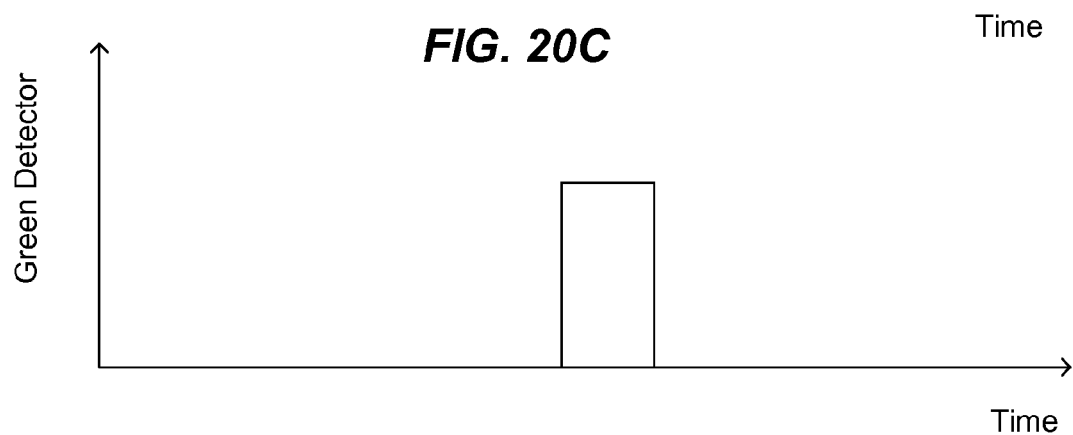
Figure 20D:
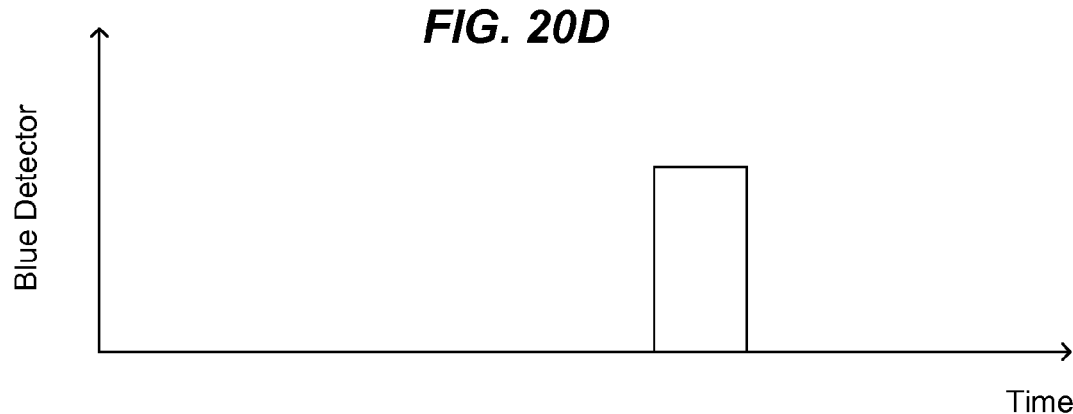

A test pattern can be used to check the horizontal alignment in the display systems in FIGS. 8 and 10. For example, a frame of one of the red, green and blue colors may be used as a test pattern to test the alignment. FIG. 20A shows a test pattern for the color pixel embedded with the detectors in FIGS. 8 and 9 and the corresponding outputs of the three detectors PD1, PD2 and PD3 when the horizontal alignment is proper without an error. This test pattern can also be used in the system in FIG. 10. FIGS. 20B, 20C and 20D show three different responses generated by the three detectors PD1, PD2 and PD3 when there is a misalignment in the horizontal direction. The detector responses are fed to the laser module 110 and are used to either use the time-delay technique or the adjustment of the beam imaging optics to correct the horizontal misalignment.

In the above servo control examples in FIGS. 8, 9 and 10, the on-screen or off-screen optical sensing unit detects the individual colored signals. In various implementations, it may be convenient to use scattered or reflected light of the scanning excitation beam 120 incident to the screen 101 to detect the alignment between the excitation beam and the fluorescent stripes of the screen 101. The above described servo reference marks are peripheral servo reference marks located outside the fluorescent area of the screen. The following sections further describe pixel-level servo reference marks in the fluorescent area of the screen that are used to determine the location of a beam relative to the center of an individual subpixel on the screen.

The periodic structure of the fluorescent stripes or periodic features formed on the periodic structures of the fluorescent stripes can be used as servo reference marks which scatter or reflect a portion of the scanning excitation beam 120 and the scattered or reflected light from such servo reference marks is detected to measure the presence of the misalignment and the direction of the misalignment. A temporal variation in timing of optical pulses is superimposed onto the scanning excitation optical beam 120 and the optical detection of the position of the beam on the screen is achieved by measuring the scattered or reflected light of the scanning excitation beam 120 by the servo reference marks. The information of the beam position on the screen 101 with respect to the periodic servo reference marks is used to control the alignment of the beam on the screen 101.

For example, a servo feedback control of a scanning beam display system can be implemented as follows. A beam of excitation light modulated with optical pulses is projected onto on a screen with parallel fluorescent stripes and is scanned in a beam scanning direction perpendicular to the fluorescent stripes to excite each fluorescent stripe to emit visible light which forms images. A temporal variation, e.g., the periodic temporal variation, is applied to the timing of the optical pulses in the beam of excitation light to advance or delay a spatial position of each optical pulse along the beam scanning direction on the screen. The reflection of the beam of excitation light from the screen is detected to produce a monitor signal which varies with a position of the beam relative to each fluorescent stripe. The information in the monitor signal is used to indicate a spatial offset of an optical pulse relative to a center of an intended or targeted fluorescent stripe along the beam scanning direction perpendicular to the fluorescent stripes. Based on the spatial offset, the timing of the optical pulses in the beam of excitation light is adjusted to reduce the spatial offset.

This servo feedback control may be implemented in various ways. A scanning beam display system with this servo feedback control can include an optical module operable to produce a scanning beam of excitation light which carries optical pulses that are sequential in time and carry image information; a screen comprising parallel fluorescent stripes which absorb the excitation light and emit visible light to produce images carried by the scanning beam; an optical sensor positioned to receive scattered or reflected excitation light by the screen and to produce a monitor signal indicating a spatial alignment of the beam relative to the screen; and a feedback control unit in communication with the optical sensor and operable to control the optical module so as to adjust timing of the optical pulses carried by the beam of excitation light in response to the monitor signal. In this system, the optical module can be used to create a temporal variation in timing of the optical pulses in the beam. The screen can include periodic spatial features that modify the portion of the scattered or reflected light of the excitation light received by the optical sensor in relation with the temporal variation in timing of the optical pulses in the beam. The feedback control unit can adjust the timing of the optical pulses in response to information in the monitor signal that is caused by the modification by the screen in the received portion of light by the optical sensor and temporal variation.

FIG. 21 shows one example of such a scanning display system with servo feedback control based on the scanning display system in FIG. 3. The scanning display system in FIG. 4 can also be implemented with this servo feedback control. In FIG. 21, the signal modulation controller 320 superimposes a temporal variation on the timing of the optical pulses in the excitation beam 120 in control the modulation of the excitation beam 120. Periodic servo reference marks are provided on the screen 101 to produce feedback light 1201 that is either the scattered or reflected light of the scanning excitation beam 120 caused by the servo reference marks or fluorescent light emitted by the servo reference marks under the optical excitation of the scanning excitation beam 120. An optical servo sensor 1210 is provided, e.g., an off-screen optical detector, to collect the feedback light 1201 from the screen 101. More than one optical servo sensor 1210 can be used. An optical servo sensor 1210 can be located at a suitable location off the screen 101 to maximize the collection of the feedback light from the screen 101, for example, a location near the scan lens 560 in the system in FIG. 5. A collection lens 1220 may be placed in front of the optical servo sensor 1210 to facilitate collection of light. The output of the optical servo sensor 1210 is used as servo feedback signal and is fed to the signal modulation controller 320. The signal modulation controller 320 processes the servo feedback signal to determine the position offset of an optical pulse from a center of a fluorescent stripe and then adjust the timing of optical pulses in the scanning excitation beam 120 to reduce the position offset.

The periodic servo reference marks on the screen 101 can be in various configurations. Referring to FIGS. 2A, 2B and 2C, the stripe dividers between the fluorescent stripes can be used as the servo reference marks. Each stripe divider may include an additional structure as a servo reference mark. FIGS. 22 and 23 illustrate two examples.

In FIG. 22, each stripe divider 1310 can include a reflective or fluorescent layer 1312 as the servo reference mark located on the side of the fluorescent layer of the screen 101 that receives the scanning excitation beam 120. The reflective servo reference mark 1312 reflects the excitation beam 120 more than the fluorescent stripe which absorbs the excitation light. Hence, the reflected excitation light varies in power as the scanning excitation beam 120 scans across a fluorescent stripe. A thin reflective stripe can be coated on the end facet of each stripe divider 1310 as the servo reference mark 1312. An optically absorbent layer 1314 may be formed on the facet of the each stripe divider 1310 that faces the viewer to improve the contrast of the image. The detection sensitivity of the optical servo sensor 1210 enhances when there is a large difference in the reflection of the excitation light between the servo reference mark 1312 and the fluorescent stripes. A higher detection sensitivity can be achieved in the optical servo sensor 1210 when the servo reference mark 1312 is made of a fluorescent layer that emits fluorescent light under illumination by the scanning excitation beam 120. The fluorescent material for the mark 1312 can be different from the fluorescent stripes so that the fluorescent light emitted by the mark 1312 is at a different wavelength from the emission wavelengths of the fluorescent stripes. As an example, the mark 1312 can be an IR fluorescent material where the emitted IR light is invisible to the human eye and thus does not affect the image quality to the viewer. An optical bandpass filter can be placed in front of the optical servo senor 1210 to allow only the emitted fluorescent light by the marks 1312 to enter the optical servo sensor 1210.

FIG. 23 shows another screen design where stripe dividers 1410 between fluorescent stripes are made of an optically reflective or fluorescent material. As an option, the divider facet that faces the viewer side of the screen can be coated with a blackened absorptive layer 1420 to reduce any reflection towards the viewer side, e.g., less than 10% in reflection and greater than 80% in absorption from 400 nm to 650 nm. This feature can enhance the resolution and contrast of the screen.

Figure 24:
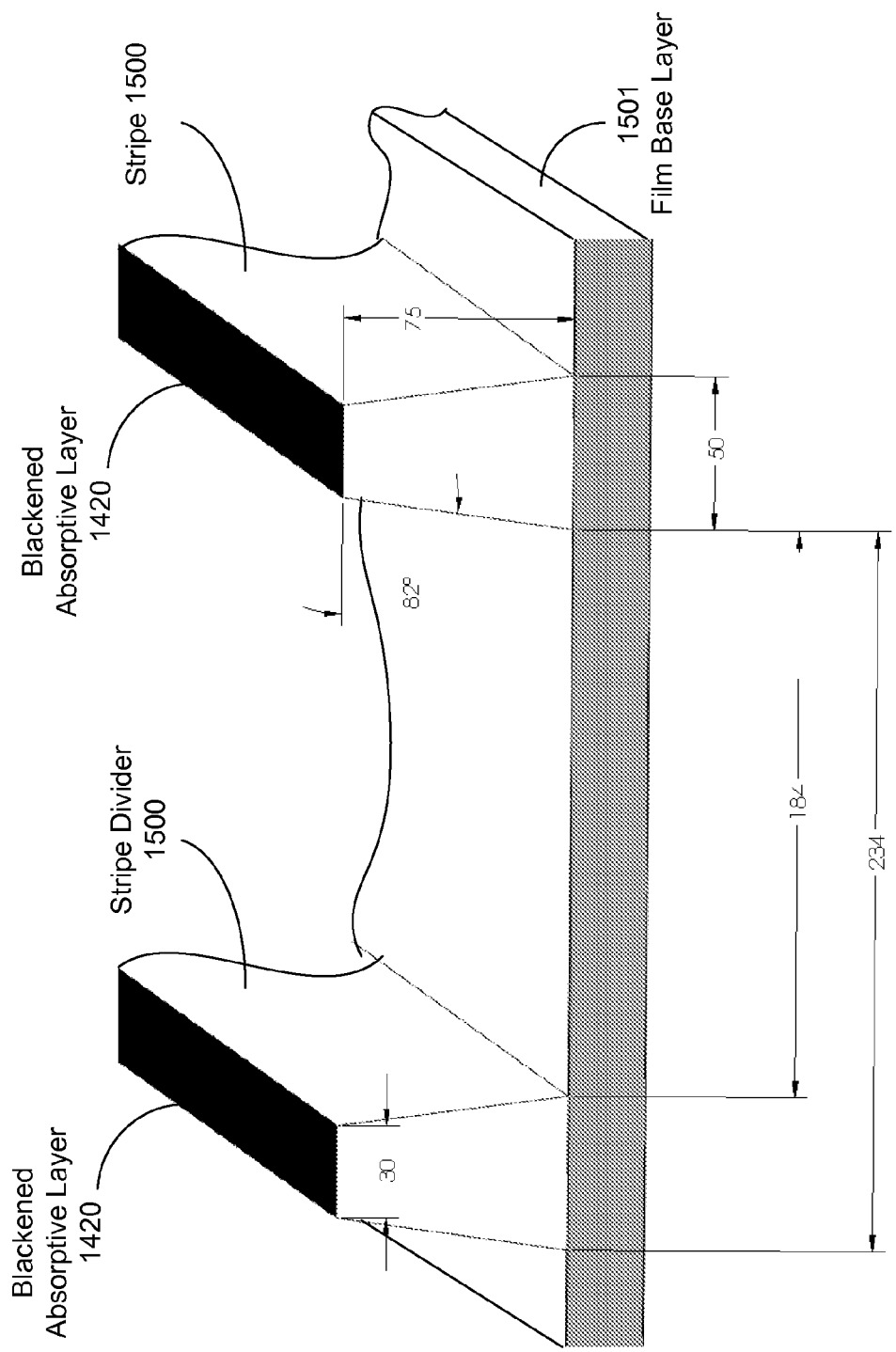

FIG. 24 further shows an implementation of the screen design in FIG. 23. All dimensions are in microns and are exemplary. Stripe dividers 1500 are formed over a dielectric layer 1501. Fluorescent materials for emitting red, green and blue colors are filled in between the stripe dividers 1500 to form the fluorescent stripes. Various optically reflective materials can be used to form the stripe dividers 1500. Metal materials such as aluminum can be used to construct the dividers 1500 or as coating materials to form a coating on a surface or facet of each divider 1500 that needs to be reflective. In addition, a white paint material can also be used to form the dividers 1500 to achieve a high reflectivity. For example, a white paint made of a TiO2-filled resin or a barium sulfate-filled resin can be formulated to achieve superior reflective properties to metal coatings, especially when reflecting back into a clear polymer. For example, the reflectivity of the white paint material can be grater than 90% from 400 nm to 650 nm. The stripe dividers 1500 can also be made to include a fluorescent material emitting light at a wavelength different from the excitation light 120 and the visible light emitted by the fluorescent stripes under the illumination of the same excitation light 120 to improve the signal to noise ratio at the optical servo sensor 1210.

Figure 25:
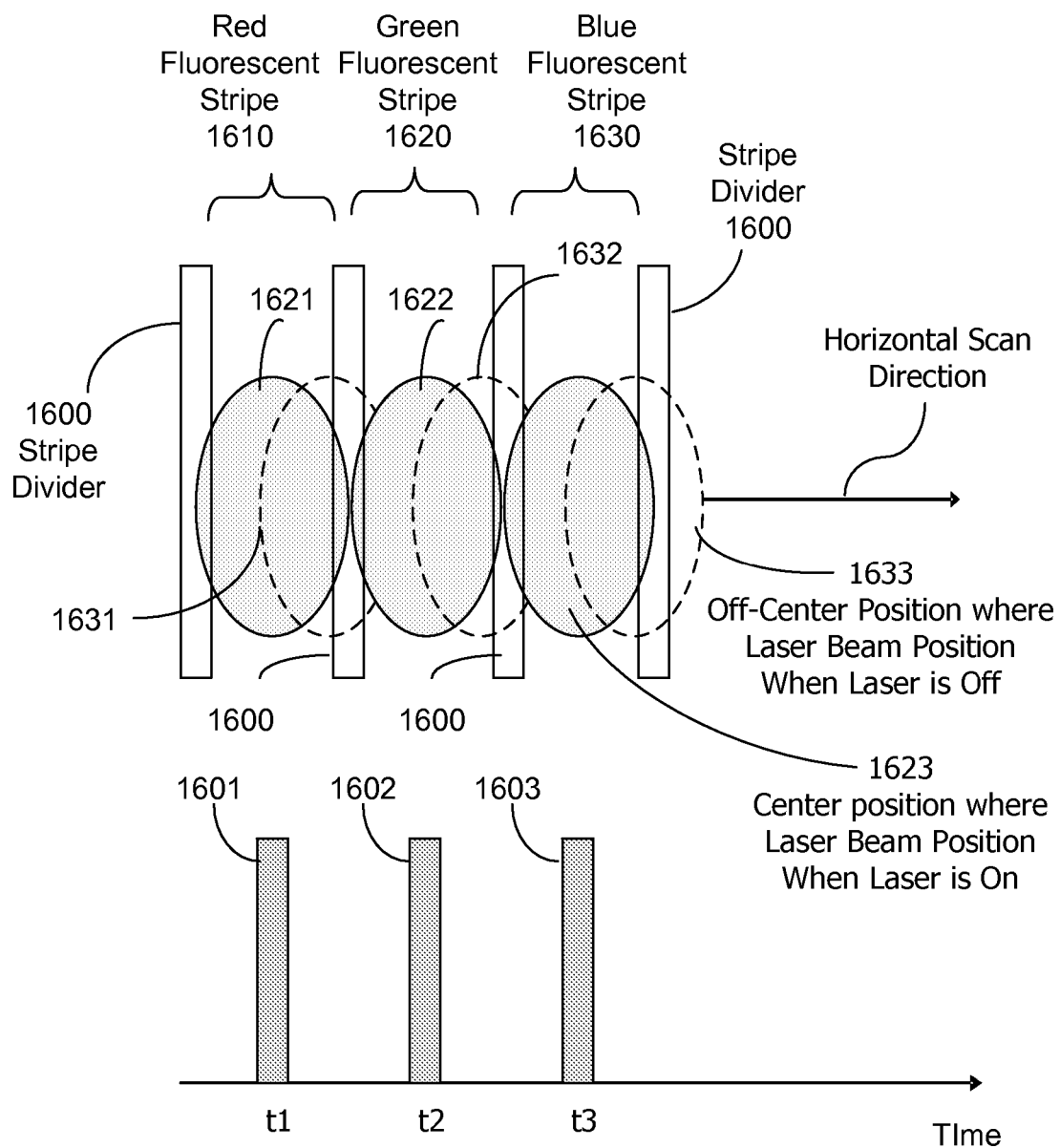
FIG. 25 shows timing of optical pulses and beam positions on a fluorescent screen with fluorescent stripes.

FIG. 25 shows timing of optical pulses and beam positions on the screen 101 when the excitation beam 120 scans across the fluorescent stripes along the horizontal direction. The excitation beam 120 is modulated as a train of optical pulses in the time domain. As an example, three consecutive laser pulses 1601, 1602 and 1603 in the excitation beam 120 for illuminating three consecutive fluorescent stripes 1610, 1620 and 1630 on the screen 101 are shown to be at times t1, t2 and t3 during a scan. Each fluorescent stripe in FIG. 25 can be a stripe of a particular fluorescent material with a designated color or a stripe of a uniform white phosphor layer in combination of a stripe color filter for the designated color. The excitation beam 120 is scanned in a raster format to produce a raster image made up by small dots, known as pixels with different colors. Each pixel is usually made up of three sub-pixels in three different primary colors red (R), green (G), and blue (B). The sub-pixels are patterned on the screen in the form of the fluorescent stripes. The laser beam 120 is scanned from left to right along the horizontal scan direction, one line at a time, to form the image. As the beam 120 travels from left to right in each scan, it should be accurately modulated in the time domain in order to properly address the sub-pixels. Hence, a pulse of the scanning excitation laser beam 120 is turned on at the same time when the beam 120 reaches the corresponding sub-pixel and is turned off when the beam 120 departs from the corresponding sub-pixel. As illustrated, when the excitation beam 120 is properly aligned with respect to the screen 101 along the horizontal scan direction, the pulse 1601 is on when the beam 120 is scanned to the center of the fluorescent stripe 1610, the pulse 1602 is on when the beam 120 is scanned to the center of the fluorescent stripe 1620 and the pulse 1603 is on when the beam 120 is scanned to the center of the fluorescent stripe 1630. Beam footprints 1621, 1622 and 1623 illustrate such aligned beam positions in the fluorescent stripes 1610, 1620 and 1630, respectively.

When there is misaligned along the horizontal scan direction, each pulse is on when the beam 120 is scanned to an off-center position in a fluorescent stripe. Beam footprints 1631, 1632 and 1633 illustrate such misaligned beam positions in the fluorescent stripes 1610, 1620 and 1630, respectively. Consider the fluorescent stripe 1610 where the pulse should be on when the beam 120 is at the position 1621 and off when the beam 120 is at the position 1631. If the pulse is on when the beam 120 at the position 1631 rather then the intended position 1621, the fluorescent strip 1610 is under illuminated by the beam 120 and a portion of the adjacent fluorescent strip at a different color is illuminated by the beam 120, i.e., the laser is turned on during the transition time when the beam 120 is crossing from one color sub-pixel to the next one. In other words, this misalignment occurs when the pulse modulation in time in the beam 120 is not synchronized with the sub-pixels in space. Under this condition, the color control can be adversely affected because the pulse that is supposed to turn on one particular color sub-pixel now "spills" over to the next different color pixel, either within the same color pixel or between two adjacent color pixels, to cause misregistration of the image and to degrade the color purity of the image.

Therefore, it is desirable to accurately control the timing of the pulses of the scanning laser beam 120, i.e., the times to turn on and off optical pulses with respect to the laser position on the screen. In order to control the timing of the laser pulses in the scanning beam 120, a servo method is used to measure the beam offset based on the reflected light from the back of the sub-pixel when the laser is turned on. The signal strength of the reflected light varies with the relative position of the laser light at each sub-pixel when the laser is turned on at the center or is turned on off-center of the sub-pixel. Reflectors or reflective features at the edge of each sub-pixel are used as the servo reference marks to generate reflected light from each sub-pixel to monitor the position of the scanning laser beam 120 at each sub-pixel. As illustrated in FIG. 25, the beam 120 is least reflected by the stripe dividers 1600 when the pulse is turned on at the beam position 1621 in the center of the fluorescent stripe 1610 and the reflection by the dividers 1600 increases when the pulse is tuned on at the beam position 1631 off the center of the fluorescent stripe 1610. This difference in the power level of the reflected excitation light when the beam 120 is turned on at different positions relative to the center of fluorescent stripe and the temporal variation in the timing of the optical pulses in the beam 120 are used to measure misalignment along the scan direction.

Figure 26:
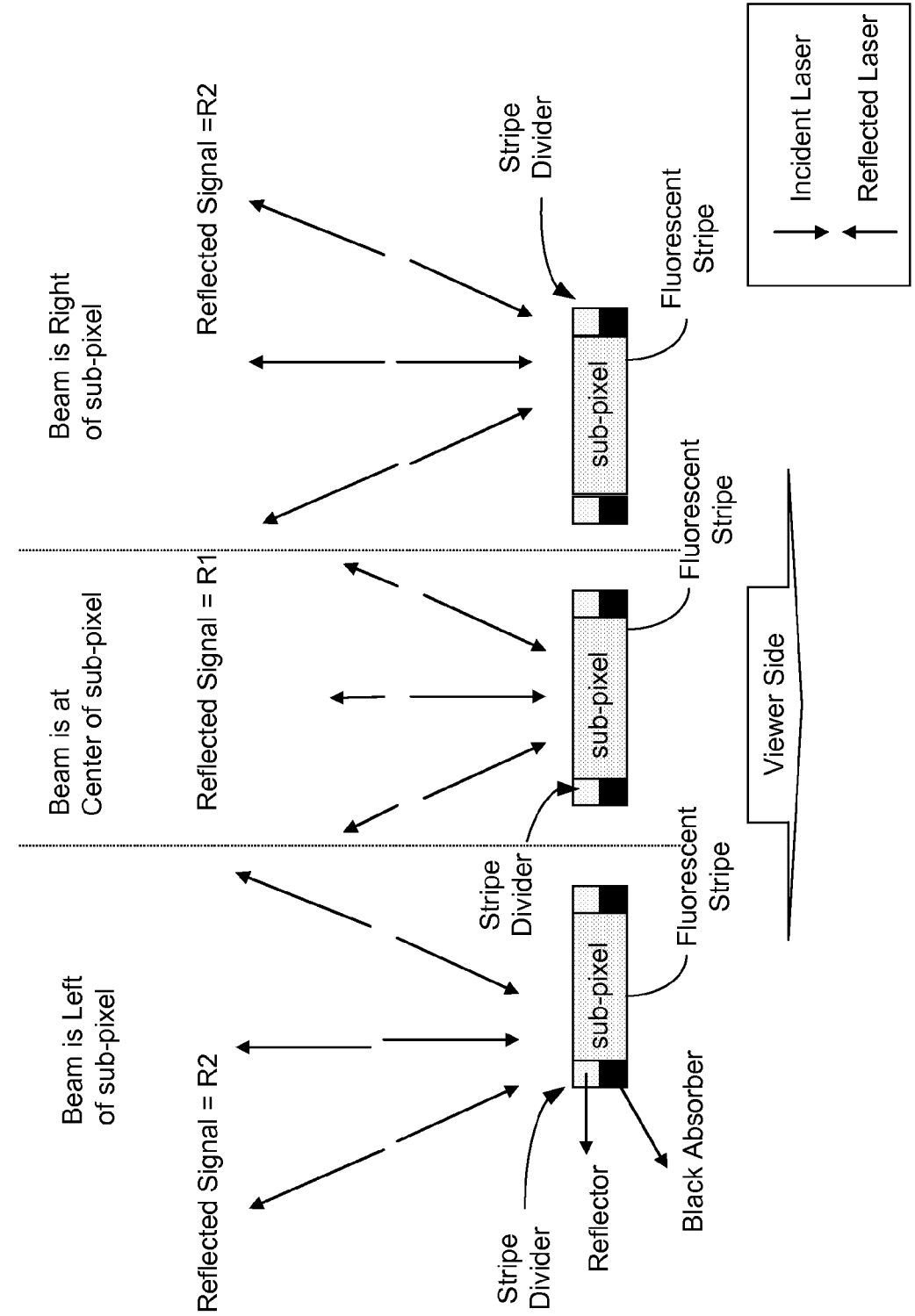
FIGS. 26A, 26B and 26C illustrate operations of servo reference marks on stripe dividers in a fluorescent screen when the pulse is turned on at different beam positions along the horizontal scan direction perpendicular to the fluorescent stripes.

FIGS. 26A, 26B and 26C illustrates the variation of the signal strength of the reflected excitation light when the excitation beam 120 at different positions in a subpixel. In FIG. 26A, the pulse is tuned on when the beam 120 is at the left side of the subpixel. A strong reflection R1 is detected at the optical servo sensor 1210 the system in FIG. 21. When the pulse is turned on when the beam 120 is at the center of the subpixel shown in FIG. 26B, a relatively weak reflection R2 is detected at the optical servo sensor 1210. When the pulse is turned on when the beam is at the right hand side of the center of the subpixel, a higher reflection of the excitation light is detected again at the optical servo sensor 1210.

Figure 27:
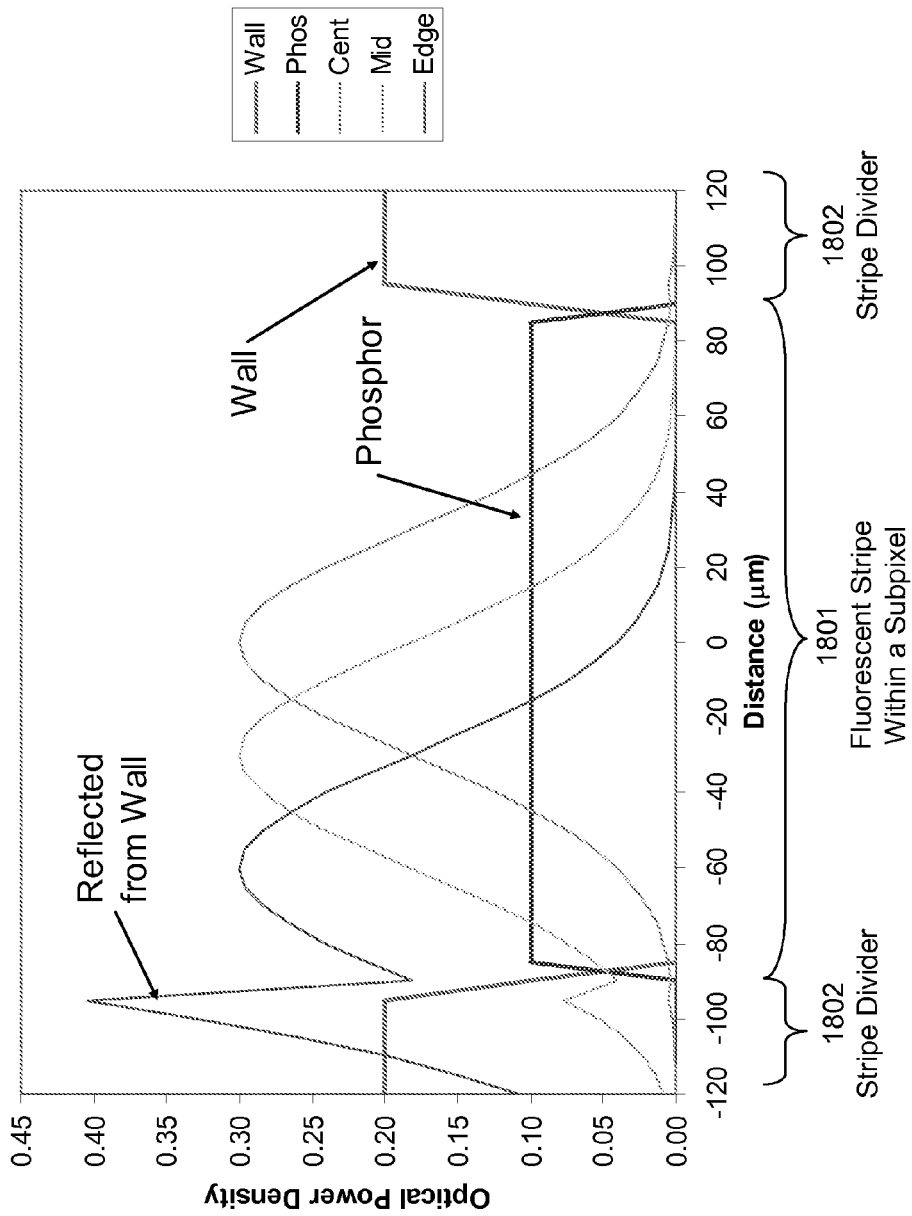
FIG. 27 shows spatial dependency of reflected excitation signals by servo reference marks on stripe dividers in a fluorescent screen.

In general, the power level of the reflected excitation light varies with the position of the beam 120 in a subpixel when the pulse is on. FIG. 27 illustrates an example of the sub-pixel design and the optical power density of the reflected excitation light from the subpixel at various laser beam positions. In this example, the sub-pixel includes a central fluorescent stripe 1801 filled with an appropriate fluorescent material that emits light of a designated color for that sub-pixel under excitation of the scanning laser beam 120. Two stripe dividers 1802 are located at two opposite sides of the fluorescent stripe 1801 as two peripheral reflectors are to generate the reflected light. The peripheral reflectors may be designed as diffractive structures, reflective structures which can either specularly reflect light or diffuse light, a wavelength conversion material such as a phosphor that emits light under the excitation of the beam 120, or a mixture of both diffractive and reflective structures.

Figure 28:
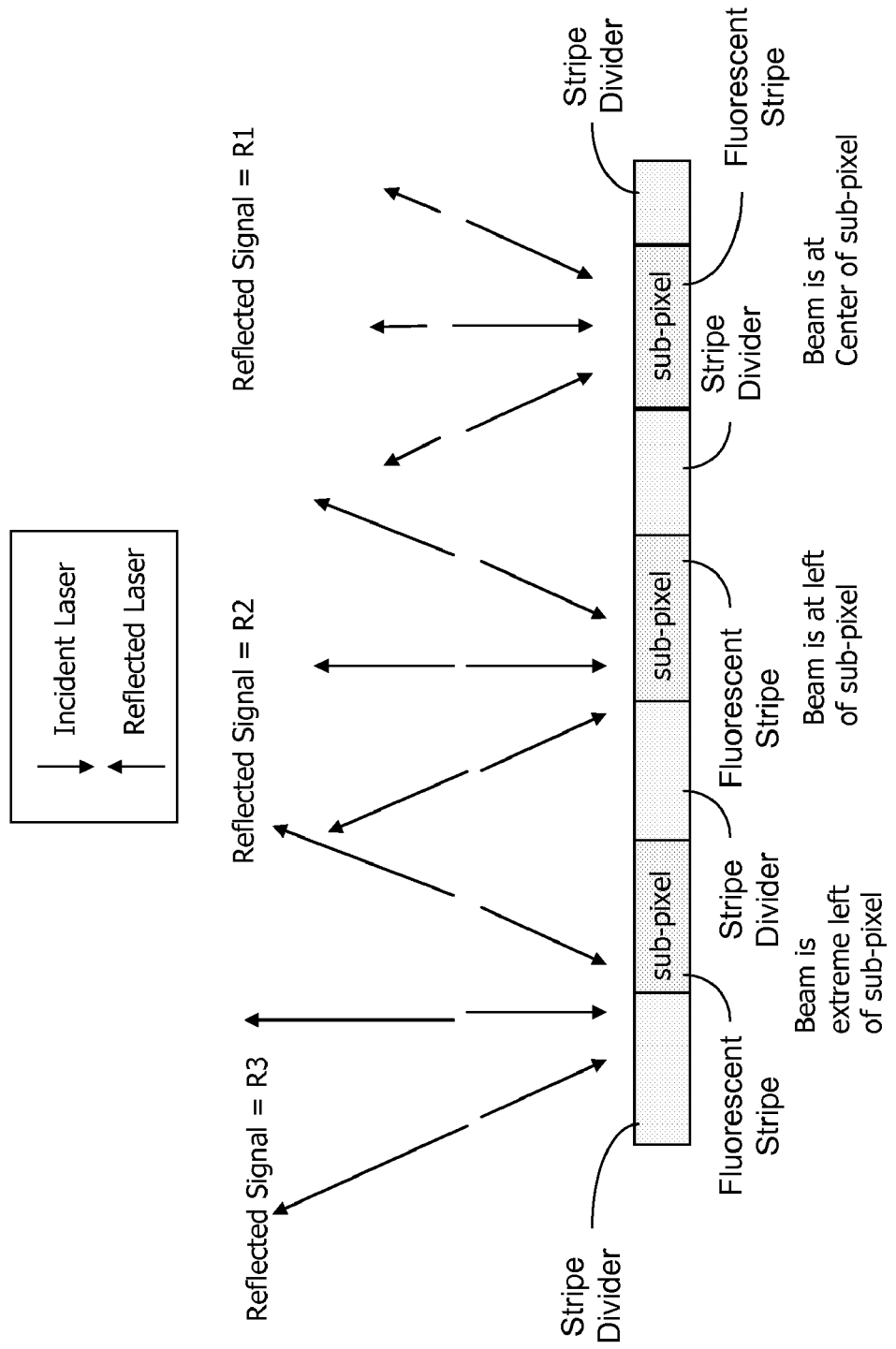
FIG. 28 illustrates three regions within a subpixel that have three different power levels for the reflected excitation signals, where servo reference marks are formed on stripe dividers.

FIG. 28 illustrates an example of the relation of the reflected power level and the beam position offset the center of a sub-pixel. The subpixel can be designed to produce a highest reflectivity R3 at the outmost edge position from a center of the subpixel, a lowest reflectivity R1 at the center position of the subpixel and an intermediate reflectivity R2 for beam positions in between. As an example, the highest reflectivity R3 can be generated when the beam 120 is turned on at the center of a stripe divider. Hence, the level of the reflected light can be used to indicate the relative offset of the beam position from the center of each subpixel.

The servo reference marks associated with the fluorescent stripes described above allows the feedback light, either reflected light or fluorescent light, to vary in power with the position of the laser beam position in each subpixel. This power variation in the feedback light can be used to determine whether the beam 120 is turned on at the center of a subpixel or off the center of the subpixel. However, this power variation does not provide information on the direction of the offset in the position of the beam 120 in a subpixel. In order to produce a sign of a servo signal to indicate the direction of the offset of the position of the beam 120 in the subpixel, the scanning laser beam 120 is further modulated with a small delay signal superimposed on top of the scanning time of the laser beam 120 to control the timing of the optical pulses in the beam 120. This delay signal produces a signal pattern in the reflected light from the sub-pixels to indicate whether the position of the laser pulse on the screen should be moved to the right or to the left relative to the center of a sub-pixel or, in the time domain, the timing of a laser pulse should be delayed or advanced. This delay signal is a periodic signal and, as the laser beam 120 scans the screen 101, is positively and negatively delayed in a periodic fashion in the time domain. This periodic variation in timing of the pulses can be, for example, a sinusoidal wave or square wave.

Figure 29:
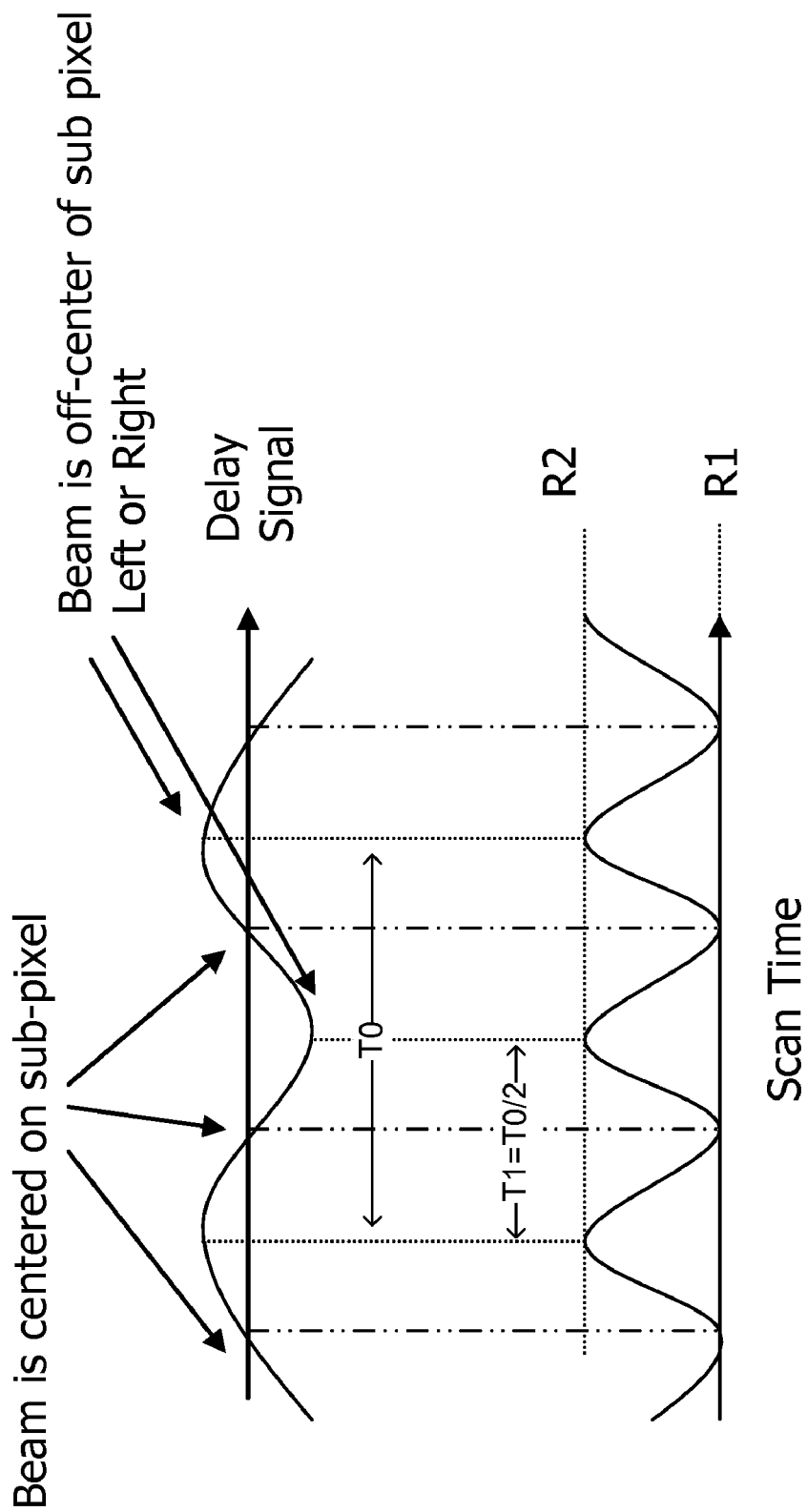
FIGS. 29, 30, 31 and 32 illustrate operations of the servo reference marks formed on stripe dividers in response to a periodic temporal delay signal on the timing of the optical pulses in the excitation beam.

FIG. 29 shows one example of this periodic delay signal in a sinusoidal form. In each period in time of the delay signal, the scanning beam 120 sans over multiple subpixels along the horizontal scanning direction perpendicular to the fluorescent stripes. In the illustrated example, a total of three subpixels are scanned by the scanning beam 120 in one period of the delay signal. As the timing of the pulse is periodically modulated during the scan, the reflected signal detected by the optical servo sensor 1210 in FIG. 21 varies, also in a periodic form.

Figure 30:
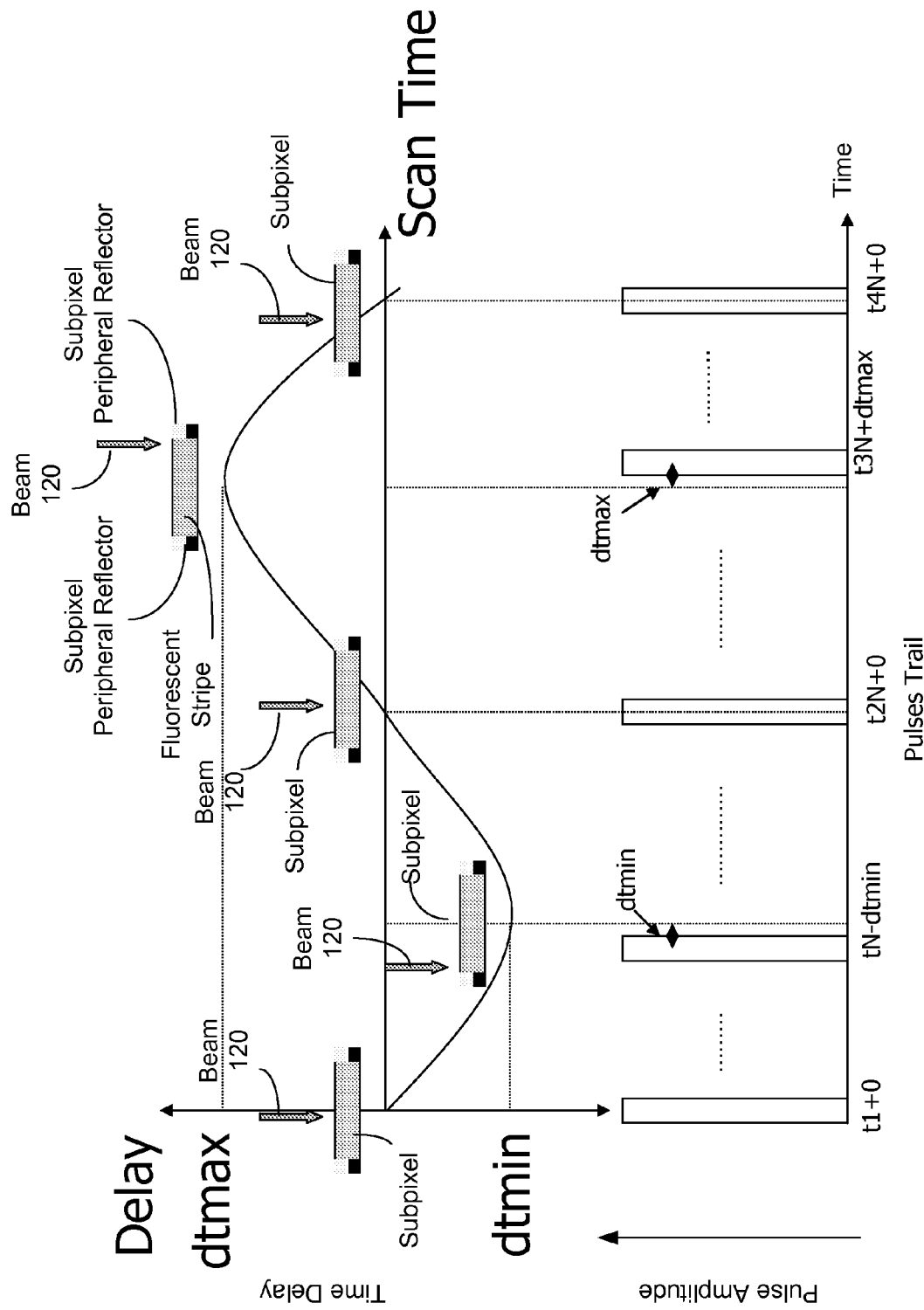

FIG. 30 further illustrates, in time domain, how the pulse timing in the beam 120 is modulated by the delay signal. Notably, the temporal variation in timing of the optical pulses is set to correspond to a spatial shift in the beam position less than the width of the fluorescent stripes along the horizontal scanning direction. Hence, the superimposed delay signal provides a perturbation of the beam position around the current beam position within a fluorescent stripe or subpixel along the horizontal beam scanning direction to cause a change in the servo signal. Because of the presence of the servo reference marks on the stripe dividers, this change in the servo signal indicates the direction and amount of the offset in the beam position from the center of a fluorescent stripe or subpixel along the horizontal beam scanning direction.

When the pulse is on as the beam 120 is at the center of a subpixel, the reflected light is at the minimum power level R1. When the pulse is on at other off-center positions, the reflected light has a higher power level that varies with the amount of the offset from the center. In a perfectly aligned system, when the delay is equal to zero, the laser beam "on time" is at the center of the sub-pixel. Under this condition, a reflected signal R1 is produced when the delay is positive or negative. When the laser beam 120 is offset with respect to the center of the sub-pixel due to the delay signal, the pulse of the beam 120 is turned on at offset positions near the center of the subpixel and thus the reflected signal R2 is produced. Notably, under this condition, the period T1 of the oscillation in the reflected signal is one half of the period T0 of the delay signal.

Figure 31:
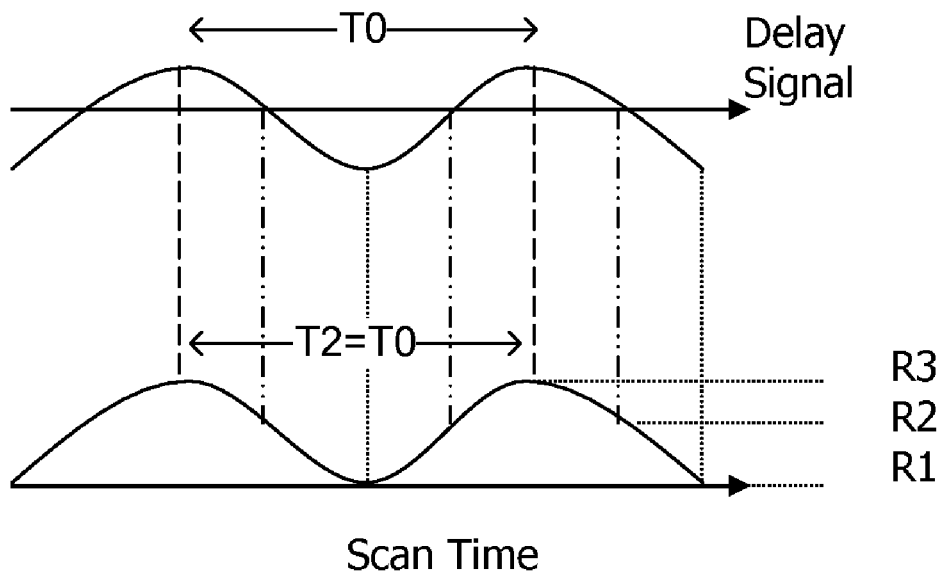

FIG. 31 illustrates the beam position offset to the left of the center of a sub-pixel that produces a highest reflectivity R3 at the outmost edge position from a center of the subpixel, a lowest reflectivity R1 at the center position of the subpixel and an intermediate reflectivity R2 for beam positions in between. Hence, when the laser beam 120 is turned on at a position offset from the center of the sub-pixel to the left, the delay signal superimposed on top of the scanning laser beam varies the positions of the laser beam 120 mostly to the left of the center of each sub-pixel. Hence, the reflected signal various in amplitude between the levels R1 and R3 and is synchronized in phase with the delay signal. As such, the period T2 of the reflected signal is equal to the period T0 of the delay signal. This state of the reflected signal indicates that the pulse is turned too early in time.

Figure 32:
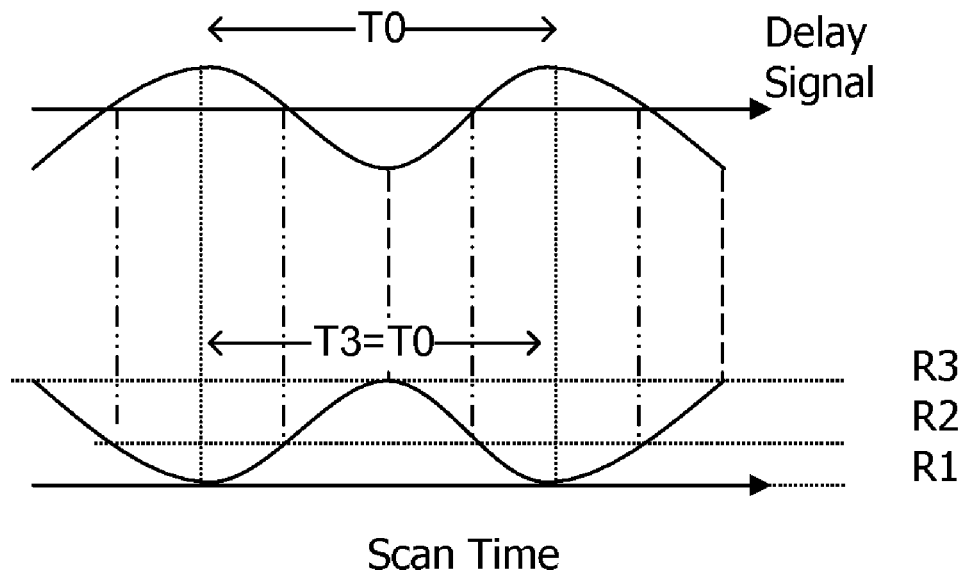

FIG. 32 illustrates an example for the beam position offset to the right of the center of a sub-pixel. Under this condition, the delay signal superimposed on top of the scanning laser beam is such that the laser beam is mostly to the right of the sub-pixels and the reflected signal is not synchronized with the delay signal is out of phase with the same period as the delay signal (T3=T0). The amplitude of the reflected signal varies between the signal levels R1 and R3. This state of the reflected signal indicates the pulse in the laser beam 120 is turned on too late in time. Notably, the phase of the reflected signals relative to the delay signals in FIGS. 31 and 32 are opposite and this difference can be measured to determine the direction of the offset for the servo control.

Figure 33:
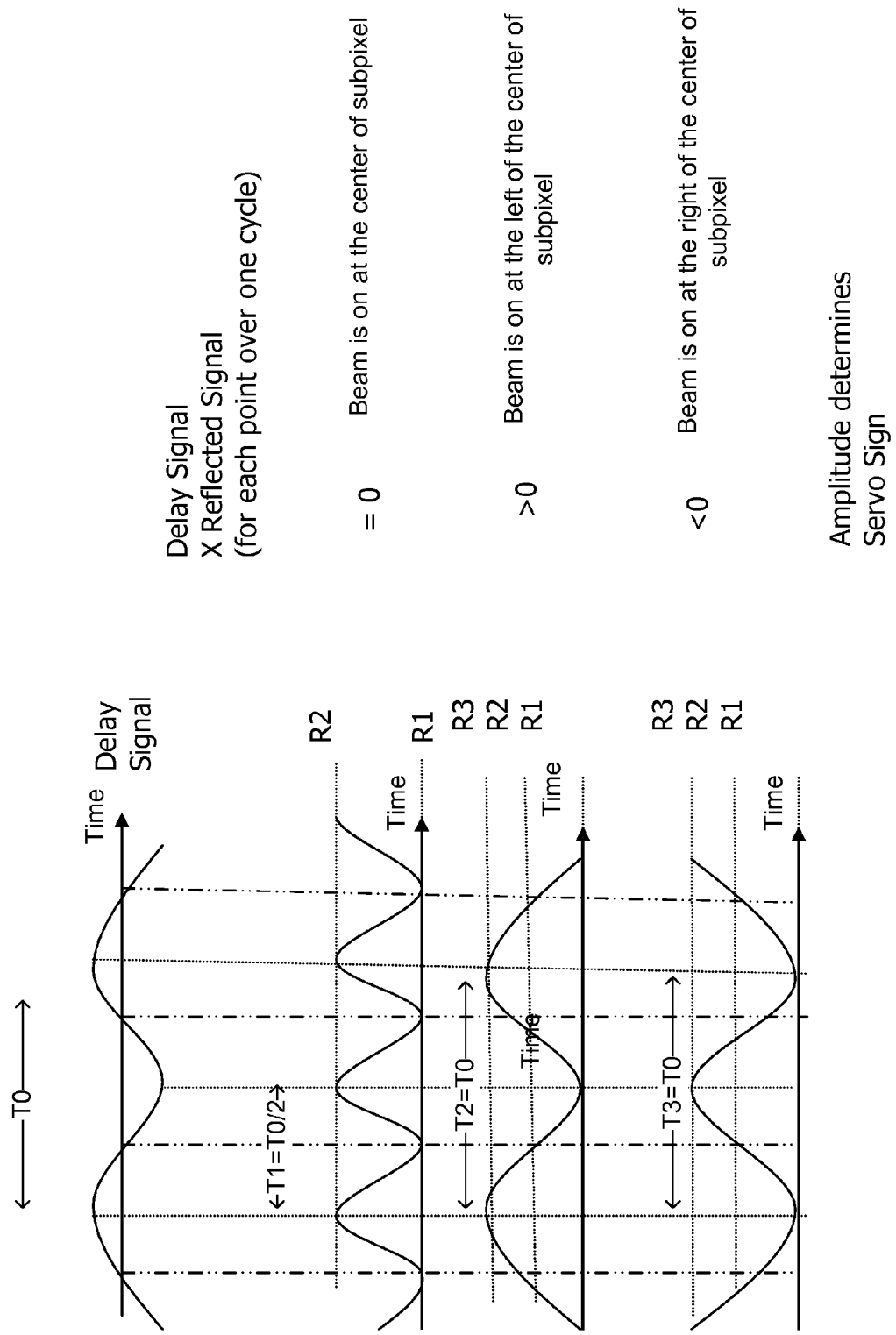
FIG. 33 illustrates generation of error signals from the reflected signals from the servo reference marks on stripe dividers based on the periodic temporal delay signal on the timing of the optical pulses in the excitation beam shown in FIGS. 20, 30, 31 and 32.

FIG. 33 illustrates a method of using the detected reflected signal to determine the direction of the beam offset from the center of the subpixel. An offset indicator signal is defined as the integration of the products of the delay signal and the reflected signal at all time locations over one delay period in the delay signal. The right hand side of FIG. 33 shows an example of the offset indicator signal. A positive value of this signal indicates that the beam is turned on too early in time and is located to the left of the center of the subpixel. A negative value of this signal indicates the beam is turned on too late in time and is located to the right of the center of the subpixel In the centered case, the reflectivity signal has twice the oscillation frequency of the delay signal. Hence an integration of the reflectivity signal over one delay cycle results in a negligible servo error signal. The servo response circuit can be configured to maintain the current timing of the pulses without altering the position of the laser on time. When the laser is mostly off the center of the sub-pixel to the right or left side, the reflected signal is out of phase with each other respect to the delay signal and each reflected signal has the same oscillation frequency of the delay signal. The integration of an entire reflectivity cycle multiplied by the delay signal yields a positive or negative servo error signal. In these two cases, the servo control mechanism can adjust the timing of the pulses in the laser beam 120 to reduce the beam offset and to achieve proper sub-pixel registration.

The change in the reflected signal is captured using an optical servo sensor 1210 as shown in FIG. 21. One detection scheme is to use a wide area detector as the sensor 1210 to capture a portion of the back-scattered light. Improved SNR can be obtained with a lens (or other flux collecting element such as a non-imaging concentrator). The lens represents a larger collecting area which brings more scattered light to the detector. If the scattered light is of a different wavelength as compared to the incident beam, e.g., when fluorescent servo reference marks are used, then a spectral filter may be used to reject other sources of radiation (including any unwanted backscatter of the incident beam). In addition, multiple detectors may be placed in several locations to improve detectability of the backscattered radiation. Because the signal may be weak compared to other sources of light, the servo signals may be averaged over many lines and frames to improve the signal to noise ratio.

The delay signal can be either periodic or non-periodic with various amounts of delay and periodicity. The concept of introducing a variable delay signal is needed to figure out the directionality of the correction needed. Note that the delay signal is small enough so that it does not add color distortion to the screen. We assume that less than 10% color bleed may result due to the delay signal. In some implementations, the phase of the period delay on the laser beam can be shifted by 90 degrees from one scanning line to the next to reduce a fixed pattern effect caused by the delay signal to a viewer.

In implementations, the servo signals from higher brightness areas of the screen can be measured and the amplitudes of the measured signals are normalized by the amplitude of the outgoing video signal in controlling the beam alignment along the horizontal scan direction. This technique can improve the signal to noise ratio in the detection because the servo delay signal is superimposed on a variable amplitude video signal.

The above time-delayed servo technique provides one approach to mitigation of the timing issue in systems where one beam is used to deliver the different colors on a display in order to accurately target the color elements. For screens where phosphors are arranged as parallel vertical stripes, the excitation laser beam is used to activate phosphors of the three primary colors, and as the beam scans across the phosphors, the beam activates each color sequentially in time. The targeting issue in space thus becomes a timing issue in controlling timing of the laser pulses. The variations of the system components due to temperature, aging and other factors and the component and device tolerances during the manufacturing thereof need to be accounted for the timing control of the laser beam on the screen. For example, thermal expansion effects, and distortions in the optical imaging will need corresponding adjustments in the precise timing to activate each color in a pixel. If the laser actuation does not properly correspond to the timing where the beam is directed with the central portion of a sub-pixel and is crossing the intended phosphor, the beam will either partially or completely activate the wrong color phosphor.

In addition to the servo control, a calibration "map" of timing adjustments can be provided to assist the servo control for correcting the timing over different portions of the screen. This calibration map includes beam alignment data for all sub-pixels on the screen and can be obtained using the servo control to measure alignment of the entire screen after the assembly of the display system is completed at the factory. This map of adjustments can be stored in the memory of the laser module 110 and reused for an interval of time if the effects that are being compensated for do not change rapidly. In operation, when the display system is turned on, the display system can be configured to, as a default, set the timing of the laser pulses of the scanning laser beam based on the alignment data in the calibration map and the servo control can operate to provide the real-time monitoring and control of the pulse timing during the operation. Additional calibration measurements may be made to update the stored calibration map in the memory. For example, a single or multiple consecutive versions of this map could be placed in the same memory that is used for buffering pixel color data. These calibration maps may be encoded to reduce both the amount of memory they occupy and the bandwidth of memory needed to access them. For the case of smoothly changing timing adjustments, a simple scheme such as delta modulation can be used effectively to compress these maps.

The calibration "map" can be obtained by operating each scanning laser beam 120 in a continuous wave (CW) mode for one frame during which the scanning laser beams simultaneously scan through the entire screen, one segment at a time, when multiple lasers are used as shown in FIG. 5. If a single laser is used, the single scanning beam is set in the CW mode to scan the entire screen, one line at a time. The feedback light from the servo reference marks on the stripe dividers is used to measure the laser position on the screen. The monitor signal from the photo detector can be sent through an electronic "peak" detector that creates a pulse whenever the monitor signal is at its highest relative amplitude. The time between these pulses can be measured by a sampling clock. Because the scan speed of the scanning beam on the screen is known, the time between two adjacent pulses can be used to determine the spacing of the two locations that produce the two adjacent pulses. This spacing can be used to determine the subpixel width and subpixel position. Depending on the beam scan rate and the frequency of the sampling clock, there are some nominal number of clocks for each sub-pixel. Due to optical distortions, screen defects or combination of these the distortions and defects, the number of clocks between two adjacent pulses for any given sub-pixel may vary from the nominal number of clocks. This delta can be encoded and stored in memory for each sub-pixel.

Figure 34:
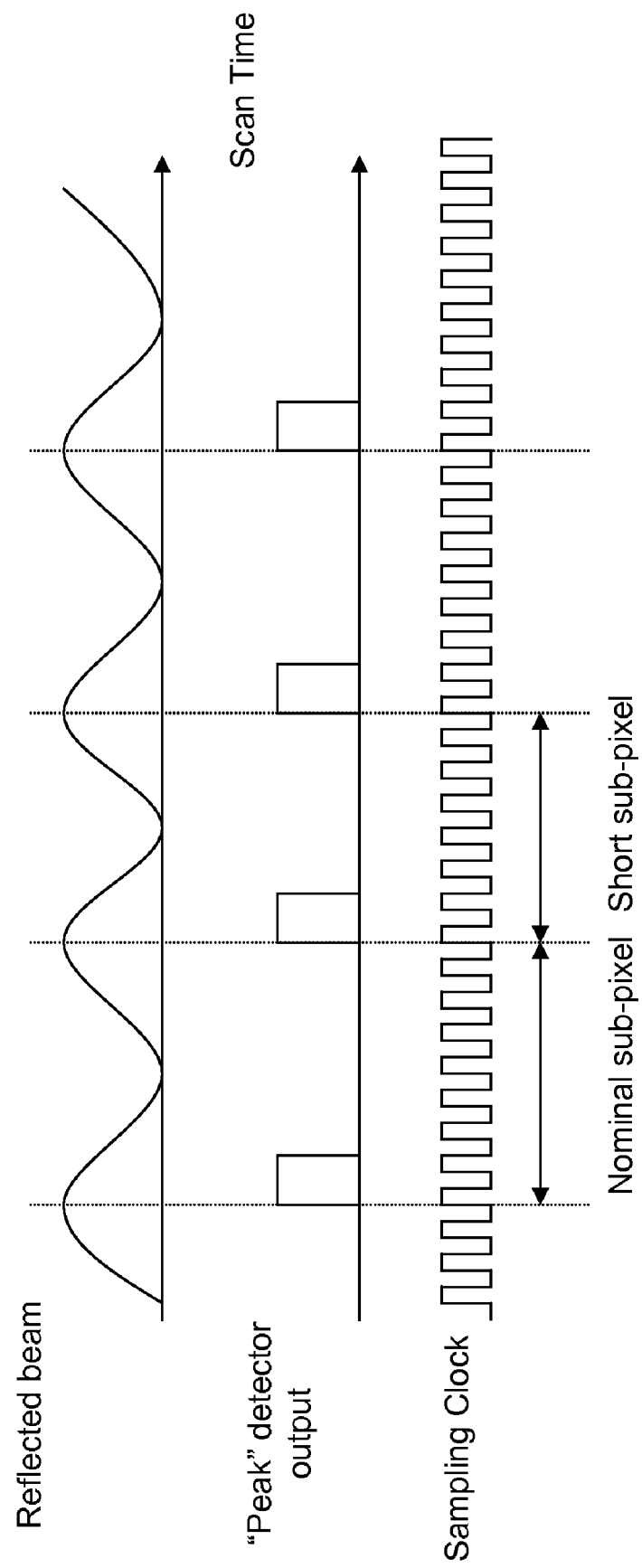
FIGS. 34, 35 and 36 illustrate examples of calibrating a fluorescent screen by scanning the screen in a CW mode to obtain measurements of a detected reflected feedback light as a function of the scan time for a portion of one horizontal scan, the respective output of the peak detector and the sampling clock signal.
Figure 35:
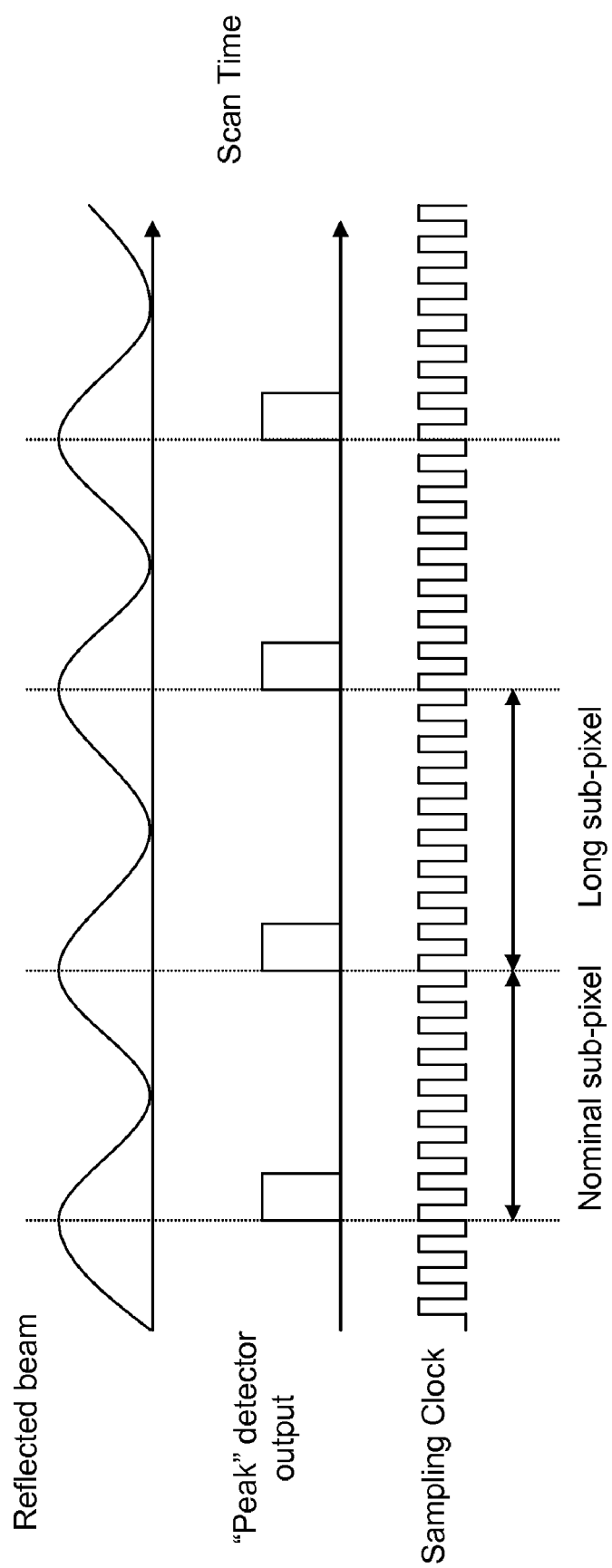

FIG. 34 shows one example of the detected reflected feedback light as a function of the scan time for a portion of one horizontal scan, the respective output of the peak detector and the sampling clock signal. A nominal subpixel and an adjacent short subpixel are illustrated. FIG. 35 shows one example of the detected reflected feedback light as a function of the scan time for a portion of one horizontal scan, the respective output of the peak detector and the sampling clock signal where a nominal subpixel and an adjacent long sub-pixel are illustrated.

Figure 36:
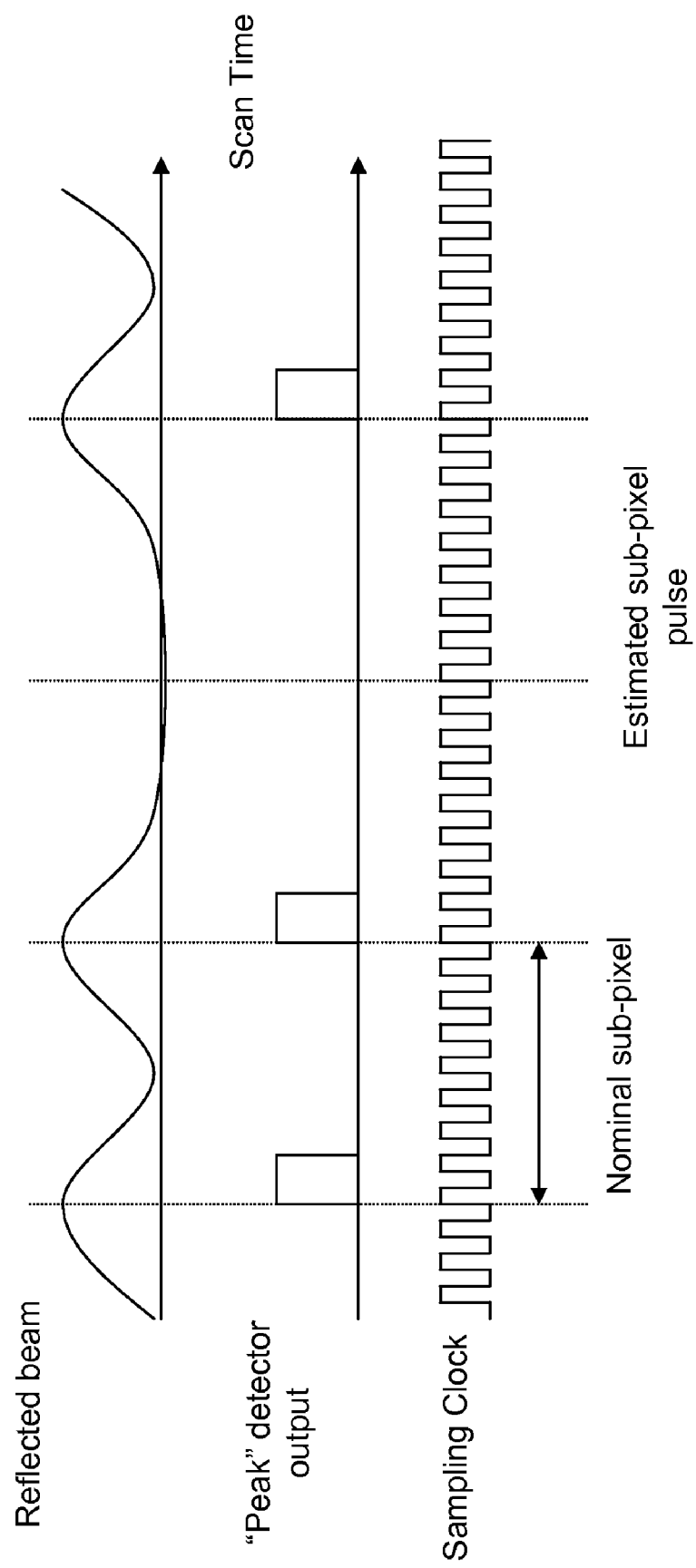

During calibration, contaminants such as dust on the screen, screen defects, or some other factors may cause missing of an optical pulse in the reflected feedback light that would have been generated by a servo reference mark between two adjacent subpixels on the screen. FIG. 36 illustrates an example where a pulse is missing. A missing pulse can be determined if a pulse is not sampled within the nominal plus the maximum expected deviation from nominal number of clocks. If a pulse is missed, the nominal value of clocks can be assumed for that sub-pixel and the next sub-pixel will contain the timing correction for both sub-pixels. The timing correction can be averaged over both sub-pixels to improve the detection accuracy. This method may be extended for any number of consecutive missed pulses.

A scanning beam display system can be implemented using various features described above. For example, such a system can include an optical module operable to produce a scanning beam of excitation light having optical pulses that are sequential in time and carry image information, and a fluorescent screen that includes a fluorescent area and a peripheral servo reference mark area outside the fluorescent area. The fluorescent area absorbs the excitation light and emits visible fluorescent light to produce images carried by the scanning beam. The fluorescent area includes first servo reference marks producing a first feedback optical signal under illumination of the scanning beam. The peripheral servo reference mark area includes at least one second servo reference mark producing a second feedback optical signal under illumination of the scanning beam. This example system includes two separate sensors for the servo control: (1) a first optical sensor positioned to receive the first feedback optical signal and to produce a first monitor signal indicating a spatial alignment of the optical pulses on the fluorescent screen; and (2) a second optical sensor positioned to receive the second feedback optical signal and to produce a second monitor signal indicating an optical property of the scanning beam on the fluorescent screen. A feedback control unit is included in the optical module to adjust the scanning beam in response to the first and second monitor signals to control at least the spatial alignment of spatial positions of the optical pulses on the fluorescent screen.

The above second optical sensor for detecting the second feedback optical signal from the peripheral servo reference mark area on the screen can be an optical detector that is connected to a light pipe that is connected to the peripheral servo reference mark area on the screen. In one implementation, the second servo reference mark in the peripheral servo reference mark area can be transmissive so that the transmitted light through the mark when illuminated by the excitation beam 120 is coupled into one end of the light pipe that is connected to the other side of the mark, e.g., on the viewer side of the screen. The light pipe can be a channel with reflective surfaces formed by dielectric interfaces under the total internal reflection (TIR) condition or metallic reflective side wall surfaces. The second optical sensor can be located at the other end of the light pipe to receive the light signal guided by the light pipe. When different types of servo reference marks are provided in the peripheral servo reference mark area for monitoring different parameters, e.g., beam focusing and beam SOL position, different light pipes can be implemented in the peripheral servo reference mark area for different reference marks. Each light pipe directs the signal to its respective optical detector.

As described above, different facets of a polygon scanner tend to have different facet orientations with respect to the scanner rotation axis due to the inaccuracy in manufacturing and other factors and such pyramidal errors can degrade the performance of the displayed images. FIG. 5 shows a scanning display system with a fluorescent screen where one or more excitation laser beams 532 are scanned by a galvo mirror 540 and a polygon scanner 550 onto a fluorescent screen 101. A display system using a passive screen can also be constructed based on the design in FIG. 5 where three modulated beams in different colors (e.g., red, green and blue) carrying image data can be overlapped as a single beam that is scanned by the galvo mirror 540 and the polygon scanner 550 on a passive screen to form colored images.

Figure 37:
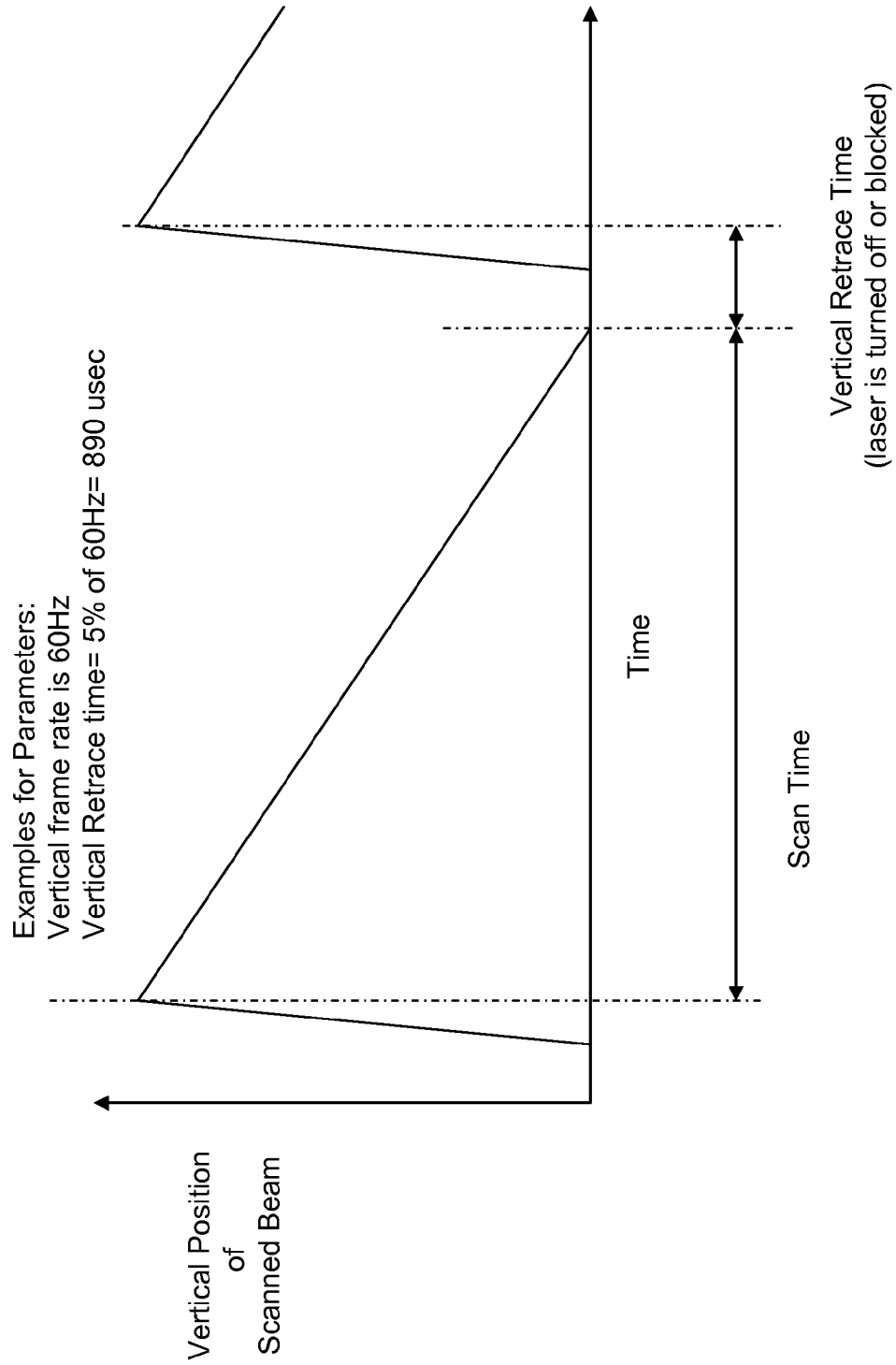
FIG. 37 illustrates scanning of the vertical scanner (e.g., the galvo mirror) in the scanning display shown in FIG. 5.

FIG. 37 illustrates the operation of the galvo mirror 540. Each cycle of motion of the galvo mirror 540 is divided into a regular scanning phase and a vertical retrace phase. In the regular scanning phase, the galvo mirror 540 scans over a scan time during which the light is directed to the galvo mirror 540 and the galvo mirror 540 scans the light to produce multiple horizontal scan lines at different vertical positions. During this scan time, multiple facets of the polygon 540 scan the beam. In the vertical retrace phase, the light is turned off or blocked and the galvo mirror 540 resets its position back to the initial scanning position from which another vertical scan begins. Depending on the design of the galvo mirror 540, the vertical retrace time usually takes a small fraction of the total scan, e.g., 5%. As an example, if the vertical scanning rate is 60 Hz which corresponds to a vertical scan time of about 16.7 ms, the vertical retrace time is 5% (1/60)=890 micro seconds.

Figure 38:
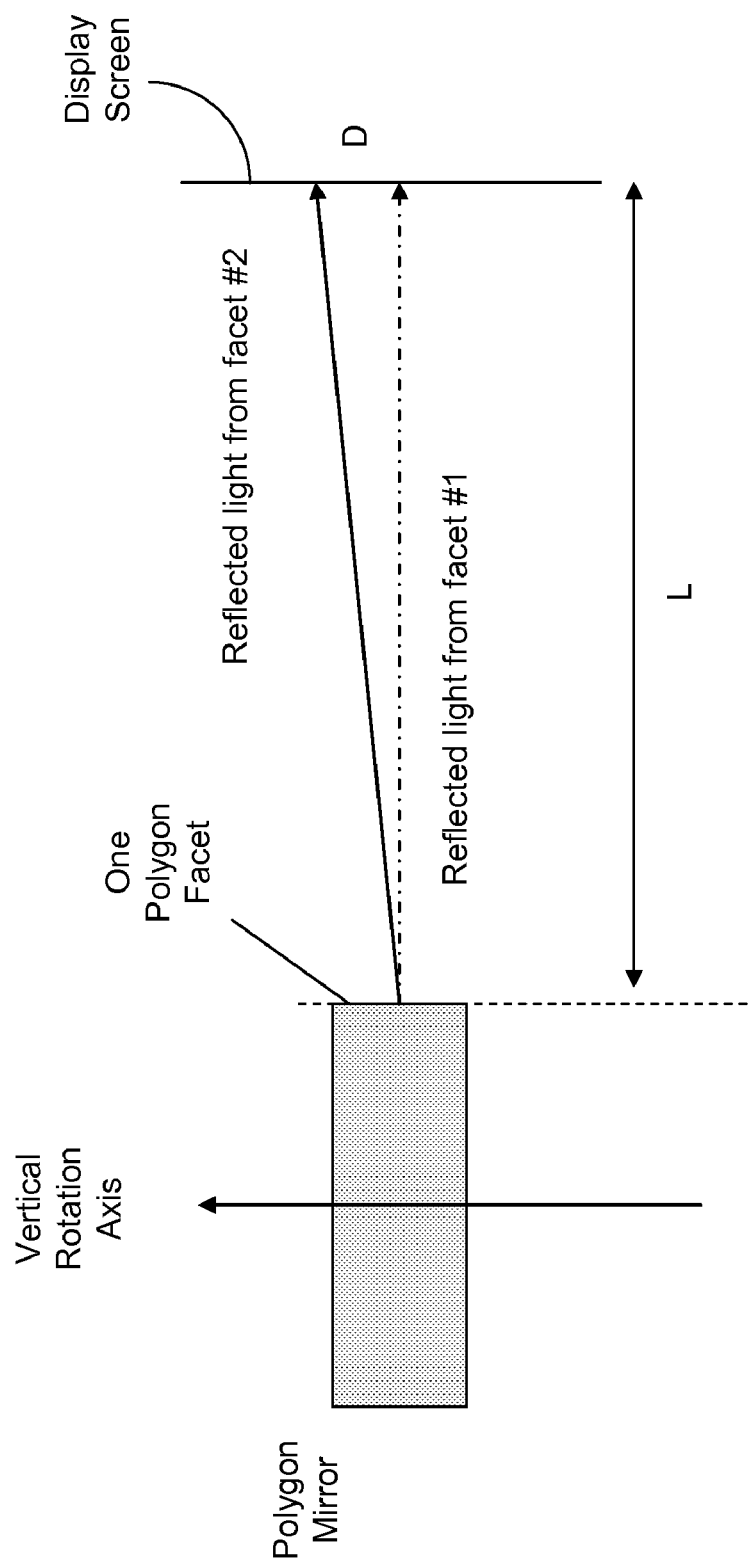
FIGS. 38, 39A and 39B illustrates an effect of a pyramidal error of the polygon scanner on the beam position on the screen.

FIG. 38 illustrates the effect of the pyramidal error of the horizontal polygon scanner 550 in FIG. 5. Two adjacent facets, facet No. 1 and facet No. 2, have different facet orientations with respect to the vertical rotation axis of the scanner. Hence, for the same incident beam to be scanned, the facets No. 1 and No. 2 project the beam at two different vertical locations on the screen separated by a distance D on the screen. If the polygon 550 is away from the screen by a distance L, the pyramidal error is ½ tan (D/L).

Figure 39A:
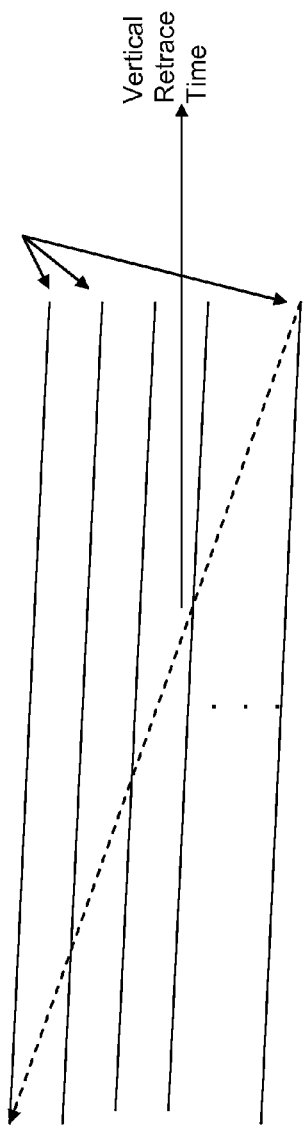
Figure 39B:
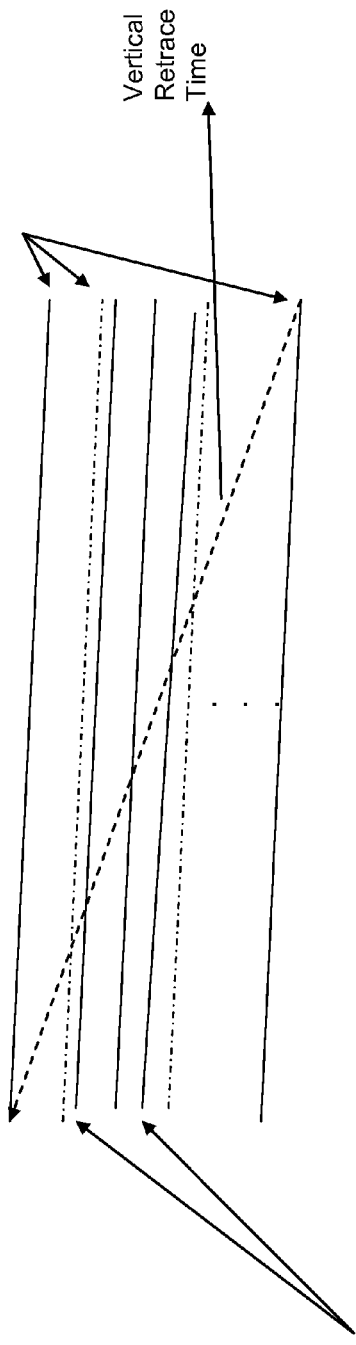

FIGS. 39A and 39B further illustrate the effect of the pyramidal errors in the polygon scanner 550 in FIG. 2 when multiple scanning beams are scanned at the same time as shown in FIG. 7. If the polygon 550 is free of pyramidal errors, different beams are simultaneously scanned at their designated vertical locations to produce parallel horizontal scan lines with an even vertical spacing. Due to the vertical scanning, each horizontal line is not perfectly horizontal and is skewed (FIG. 39A). If, however, the polygon 550 has pyramidal errors, different beams are simultaneously scanned to produce parallel horizontal scan lines with uneven vertical spacing and some of the horizontal lines depart from their ideal vertical position (FIG. 39B).

One exemplary technique to mitigate the effect of the pyramidal error is to design the scanning system so that each horizontal scanning line in successive frames is scanned by different facets on the polygon. Hence, each line perceived by the viewer appears to be thicker with a line width along the vertical direction about the position spread on the same horizontal line caused by the pyramidal errors. This technique essentially averages out the pyramidal errors and at the same time slightly degrades the vertical resolution on the screen.

In operation, this technique scans each horizontal line by using a different polygon facet in successive frames to cause the same line at successive frames to be at different vertical positions to cause a "blurred" line due to different pyramidal errors on different polygon facets. As one specific example, the retrace time on the galvo mirror 540 can be set to be less than 1 facet time. The assignment of the facets for scanning different lines can be made in various configurations. For example, the facets designated for retracing line 1 can be 5, 6, 7, 8, or 9 facets in the following arrangement:

| # of FACETS | FACET ASSIGNMENT FOR SCANNING LINE 1 | | | | | | | |
|---|---|---|---|---|---|---|---|---|
| 5 | 1 | 2 | 3 | 4 | 5 | 1 | | |
| 6 | 1 | 2 | 3 | 4 | 5 | 6 | 1 | |
| 7 | 1 | 4 | 7 | 3 | 6 | 2 | 5 | 1 |
| 8 | 1 | 8 | 7 | 6 | 5 | 4 | 3 | 2 | 1 |
| 9 | 1 | 5 | 9 | 4 | 8 | 3 | 7 | 2 | 6 |

This facet assignment for scanning can be achieved by controlling the polygon scanner.

Figure 40:
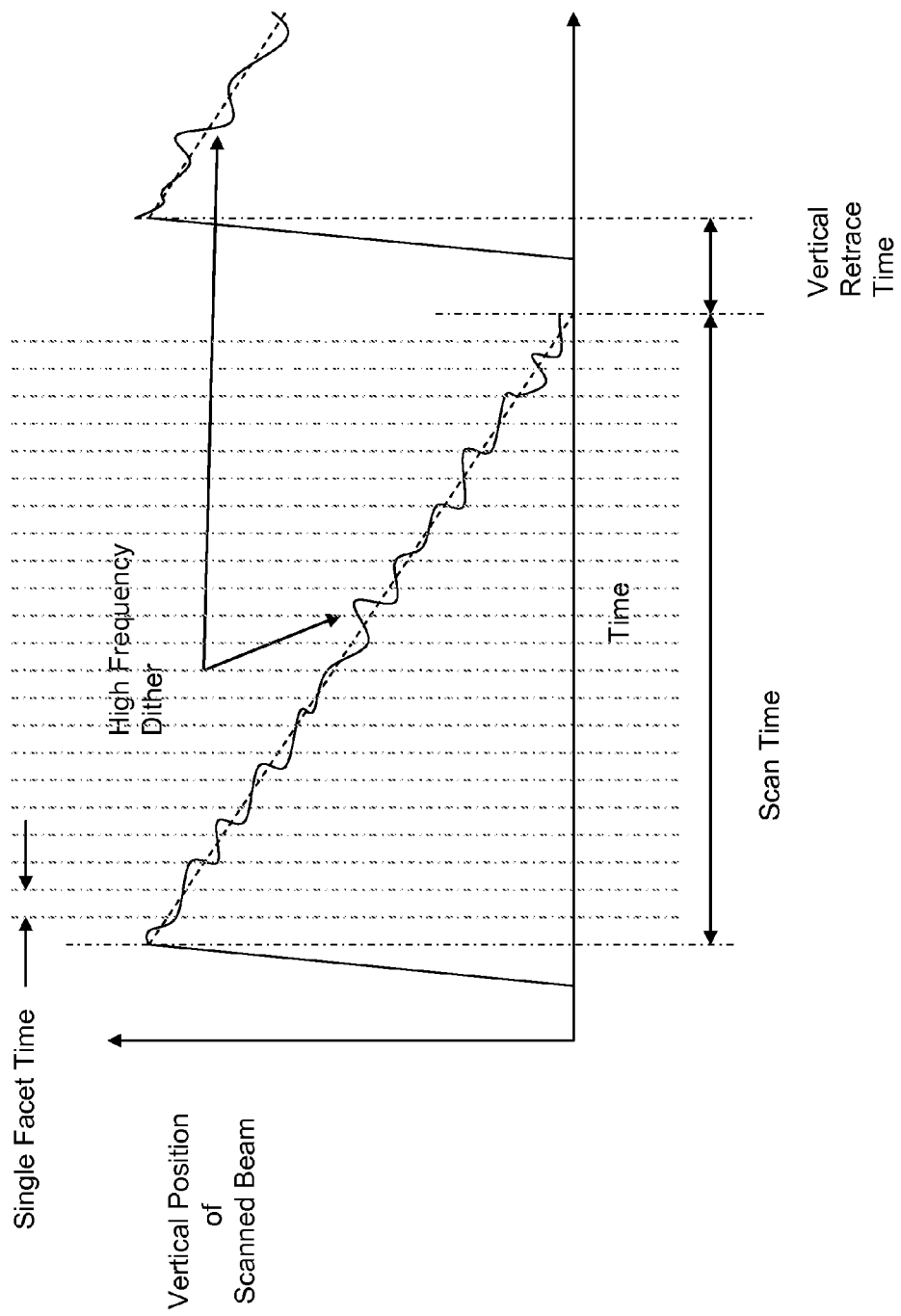
FIG. 40 illustrates a dithering operation of the vertical scanner in the scanning display in FIG. 5.

The above technique is an averaging technique and the averaging can also be implemented by dithering the vertical scanning mirror with a small amplitude at a dither frequency higher than the frame rate. This dithering is controlled so that the vertical spread of the scanning beam on the screen caused by the dithering is the beam position spread on the same horizontal line caused by the pyramidal errors. FIG. 40 shows the effect of the high-frequency dithering of the galvo mirror 540. Several dithering options may be implemented: a constant dither amplitude, a varying dither amplitude, a constant dither frequency, a varying dither frequency, or a combination of any of the above. The distribution of the dither (amplitudes, and or, frequencies) can be random, Gaussian or other profiles such as white noise, pink noise where the amplitude of a random signal decreases as the signal frequency increases while maintaining constant signal power per frequency increment.

In addition, the light intensity of the scanning beam may be adjusted by reducing the intensity at a position where the pyramidal error causes the horizontal lines to be denser and increasing the intensity at a position where the pyramidal error causes the horizontal lines to be sparser. This adjustment of light intensity can reduce the effect of the pyramidal error on the image quality.

Hence, based on the above, a scanning beam display system can be configured to include a polygon scanner having reflector facets and operable to rotate to scan an optical beam along a first direction (e.g., the horizontal direction) and a second scanner having a reflector to cause the optical beam to scan in a second direction (e.g., the vertical direction) perpendicular to the first direction. This system can include a control unit in communication with the second scanner to control scanning of the second scanner. The control unit can be operable to dither the second scanner to cause the optical beam to change its direction back and forth along the second direction during each scan at a dither frequency higher than a frame rate of an image carried by the optical beam. In one implementation, this system can include a mechanism to control a light intensity of the optical beam in a relation with pyramidal errors of different facets in the polygon scanner.

Also, based on the above, a method for display can be provided to operate a scanning beam display. In this method, a polygon scanner having reflector facets is used to scan an optical beam along a first direction and a second scanner having a reflector is used to scan the optical beam in a second direction perpendicular to the first direction. The scanning of the optical beam is controlled to scan the optical beam with different facets of the polygon scanner at each horizontal scanning line in successive frames. In one implementation of this method, the second scanner can be dither to cause the optical beam to change its direction back and forth along the second direction during each scanning at a dither frequency higher than a frame rate of an image carried by the optical beam. In addition, the light intensity of the optical beam can be controlled in a relation with pyramidal errors of different facets in the polygon scanner to reduce the any visual effect of the pyramidal errors on the screen.

Referring to FIGS. 13-16, a fluorescent screen can have one or more peripheral reference mark regions outside the display region to provide vertical reference marks that measure the vertical position of a scanning beam. The screen design with one or more peripheral reference mark regions and vertical reference marks or other marks can be extended to passive screens without fluorescent materials. A detection circuit can be used to extract the vertical position information of the beam from the optical signals obtained from the reference marks. As described above, a feedback control can be applied to the galvo mirror 540 to correct a vertical shift caused by a pyramidal error of a facet in the polygon scanner 550. Because the pyramidal error can vary from facet to facet, the incident laser beams are not uniformly reflected to the display in the vertical dimension on each horizontal sweep.

Figure 41:
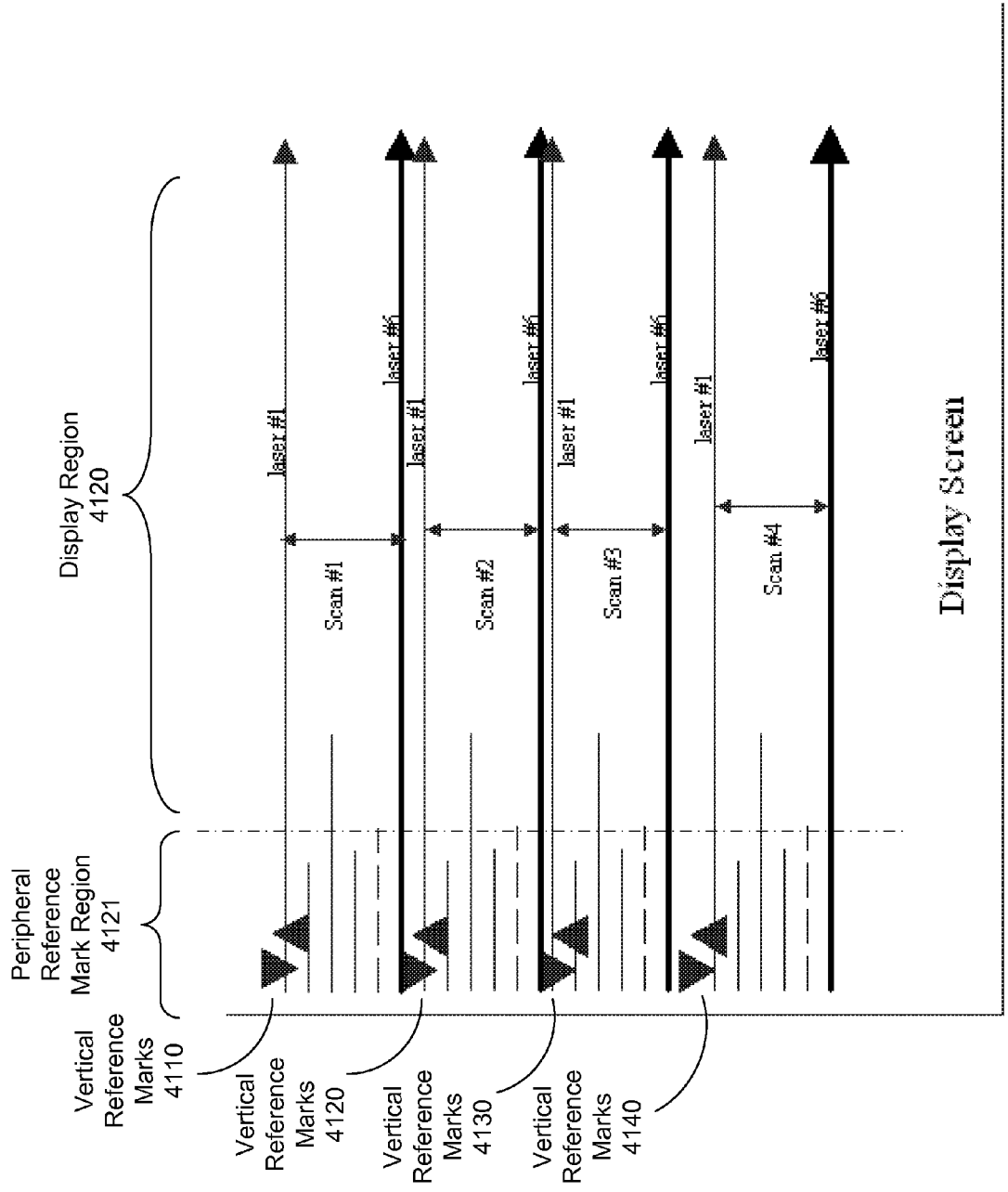
FIGS. 41 and 42 illustrate use of vertical reference marks in a peripheral region of the screen to detect pyramidal errors of facets of the polygon scanner in a scanning display system.
Figure 42:
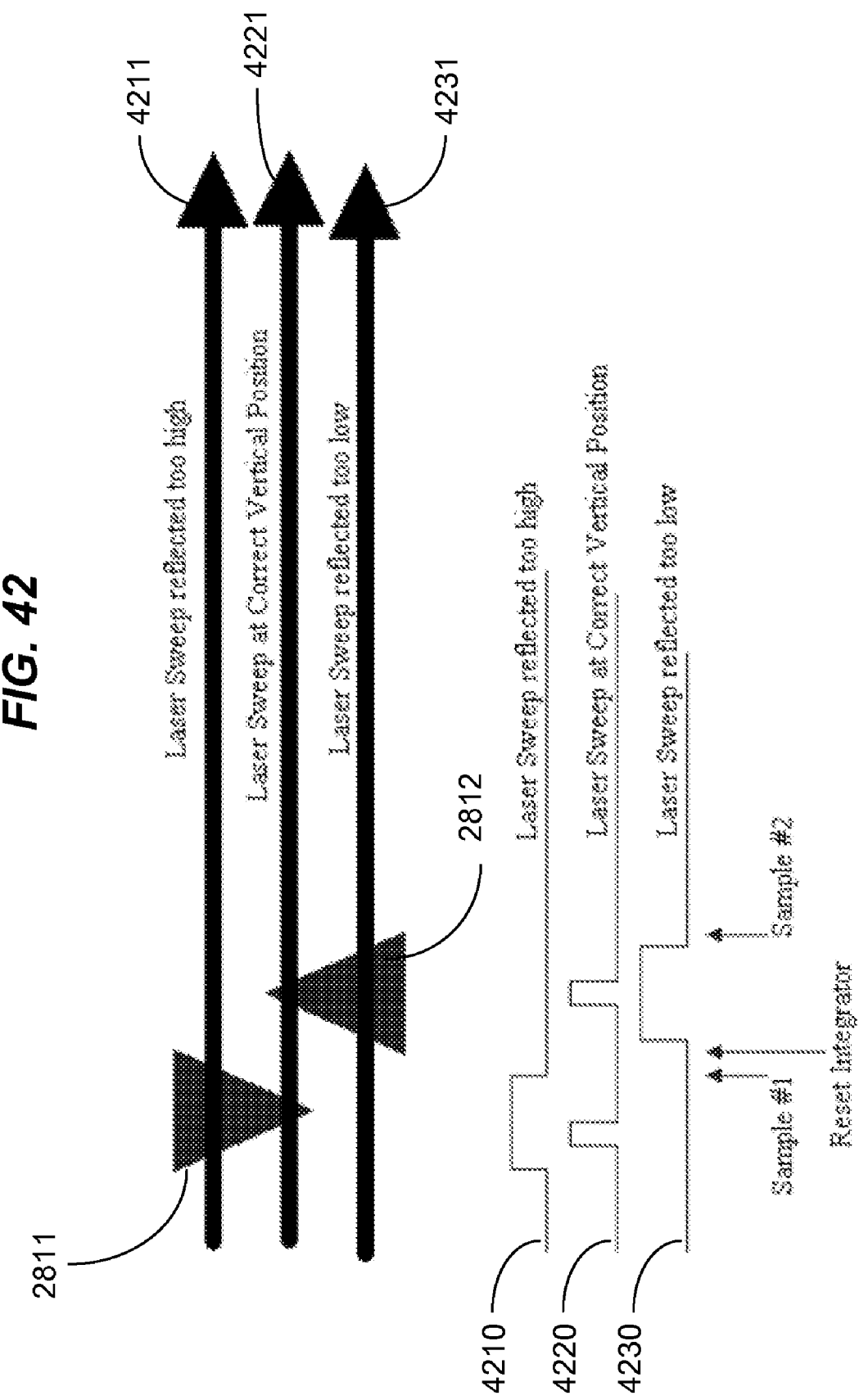
Figure 43:
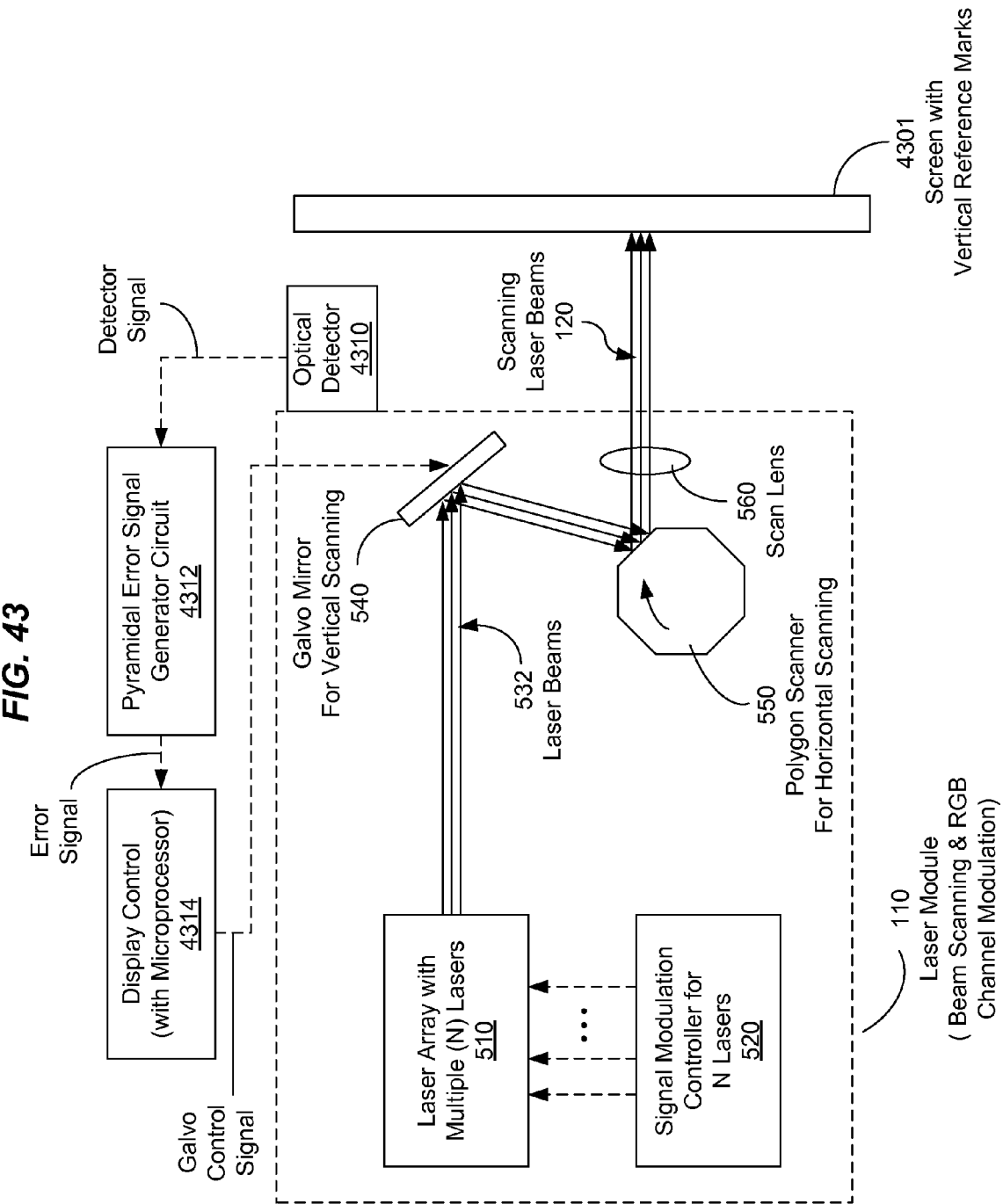
FIG. 43 shows an example of a scanning beam display system that implements a pyramidal error monitor mechanism and a pyramidal error correction mechanism.

FIGS. 41, 42 and 43 show an exemplary implementation of a servo-based pyramidal correction using the vertical scanner and on-screen vertical reference marks for scanning display systems with either passive or active screens.

In this example, the scanning display has six lasers to direct six laser beams to the screen. Referring to FIG. 7, the six laser beams are scanned at the same time to over one segment of the screen at a time and then sequentially to scan other segments sequentially arranged in the vertical direction of the screen. One polygon facet scans all six laser beams along the horizontal direction to cover one vertical screen segment at a time and different polygon facets sequentially scan different vertical segments.

The screen in this system is designed to include vertical reference marks in each of the multiple vertical screen segments for monitoring the pyramidal error of the polygon scanner. FIG. 41 shows four exemplary successive horizontal scans labeled as Scan#1, Scan#2, Scan#3 and Scan#4 over four successive vertical screen segments, respectively, by four successive facets on the polygon scanner. Each scan has six laser beams from six lasers labeled as laser#1, laser#2, laser#3, laser#4, laser#5 and laser#6. The screen includes a peripheral reference mark region 4121 where displayed images do not appear and a central display region 4120 where the displayed images appear. In the peripheral reference mark region 4121, vertical reference marks 4110 are located in the upper left corner of the first vertical screen segment to measure the vertical location of the first laser beam from the laser#1. Similarly, vertical reference marks 4120, 4130 and 4140 are located in the upper left corner of the second, third and fourth vertical screen segments, respectively, to measure the vertical position of laser#1. Alternatively, the vertical reference marks in each screen segment can be located at a different and known location to measure the vertical position of the laser beam from the laser#1 or another laser beam. The vertical reference marks in each screen segment are used to measure a vertical position of one of the six laser beams and this measured vertical location is used to represent the vertical position of that laser scan reflected from a corresponding polygon facet. The vertical reference marks in each screen segment and the detection of the vertical position can be implemented by the examples in FIGS. 13-16.

When the polygon scanner is free of any pyramidal error, the laser scans #1 through #4 should be evenly spaced from one scan to another. The vertical position signals from the different vertical reference marks in different screen segments should either indicate an identical offset in the vertical position for each polygon facet, or no error in the vertical position of all scans. When the polygon scanner has a pyramidal error in at least one facet, the error signals are different. The position of the vertical scanner can be controlled to either equalize the errors in the vertical position or minimize the error in the vertical position to correct the effect of a pyramidal error on the screen.

In the illustrated four successive scans on the screen from four successive polygon facets, scan #1 and scan #2 are aligned vertically with their respective vertical reference marks and thus do not show pyramidal errors from the corresponding facets on the polygon scanner. However, the facets for producing the scan#3 and scan#4 show pyramidal errors: scan #2 and scan #3 are too close to each other because the scan#3 is too high in its vertical position, and scan #3 and #4 are too far apart because the scan#3 is too high vertically and the scan#4 is too low vertically. This is due to pyramidal error displacing the beam from facet to facet.

FIG. 42 illustrates operation of the vertical reference marks in each screen segment shown in FIG. 41 based on the reference mark in FIG. 13. Each reference mark includes two symmetric triangular reference marks 2811 and 2812 that are displaced from each other. In operation, laser light reflected from the triangular features 2811 and 2812 on the screen generates the waveform shown in the lower part of FIG. 42. The light from the first triangle is integrated. The detector circuit can be designed to generate a pulse with a pulse width proportional to the length of the scanning beam on each reference mark. The light from the second triangle reference mark 2812 is integrated, then compared to the value for the detector signal from the first triangle mark 2811. When the beam is vertically centered between the two triangle reference marks 2811 and 2812, subtracting the first integrated value from the second should result in zero. This error signal is passed to the micro-controller, which is used by the micro-controller to determine the amplitude and direction of the galvo position error, and to correct the corresponding pyramidal error in a subsequent scan by the same facet.

In the example illustrated in FIG. 42, the beam position 4211 is too high and thus generates a detector signal 4210. The difference between the pulses from the two reference marks is negative and indicates the beam's vertical position is too high. Accordingly, the next time the same facet performs a horizontal scan, the vertical scanner position is adjusted to offset this measured pyramidal error. As another example, the beam position 4221 is proper and generates two equal pulses in the detector signal 4220. The corresponding error signal is zero and no correction is needed for that facet. As yet another example, the beam position 4231 is too low and thus generates a detector signal 4230. The difference between the pulses from the two reference marks is positive and indicates the beam's vertical position is too low. Accordingly, the next time the same facet performs a horizontal scan, the vertical scanner is adjusted to offset this measured pyramidal error.

FIG. 43 shows a block diagram of the vertical scanner control. The screen 4301 has a peripheral reference region with vertical reference marks and a central display region for display images. An optical detector 4310 is at a location in front of the screen 4301 to receive light from the vertical reference marks and to produce a detector signal. A pyramidal error signal generator circuit 4312 is used to receive and process the detector signal to produce the error signal. For example, the circuit in FIG. 14A can be used to construct this circuit 4312. A control 4314 uses the error signal to produce a galvo control signal that controls the vertical position of the galvo mirror 540 to correct the detected pyramidal error of a respective polygon facet. The control 4314 may include a microprocessor or microcontroller which generates the control signal. In operation, the microcontroller uses the error signal described above to slightly re-position the galvo mirror 540 from its normal ramp position. This re-positioning corrects the small vertical deflection error of the laser beams caused by the pyramidal polygon error.

In a single frame, the laser beams are deflected from top to bottom of the screen 4301 in a continuous manner by a rotary motion of the galvo mirror 540. Ideally, the galvo mirror 540 scans in a continuous, linear angle to direct light from top to bottom of the screen 4301. However, during this vertical scanning, different successive polygon facets are involved in the horizontal scanning and thus a polygon pyramidal error for any of the horizontal scans need to be corrected by a small offset of the galvo mirror 540 at each respective horizontal scan in the middle of otherwise continuous vertical scanning by the galvo mirror 540. To avoid any visible effect on the screen, the small offset to the vertical positioning of the galvo mirror 540 is applied when the beam is in the peripheral reference mark region and outside the central display region of the screen 4301.

Figure 44:
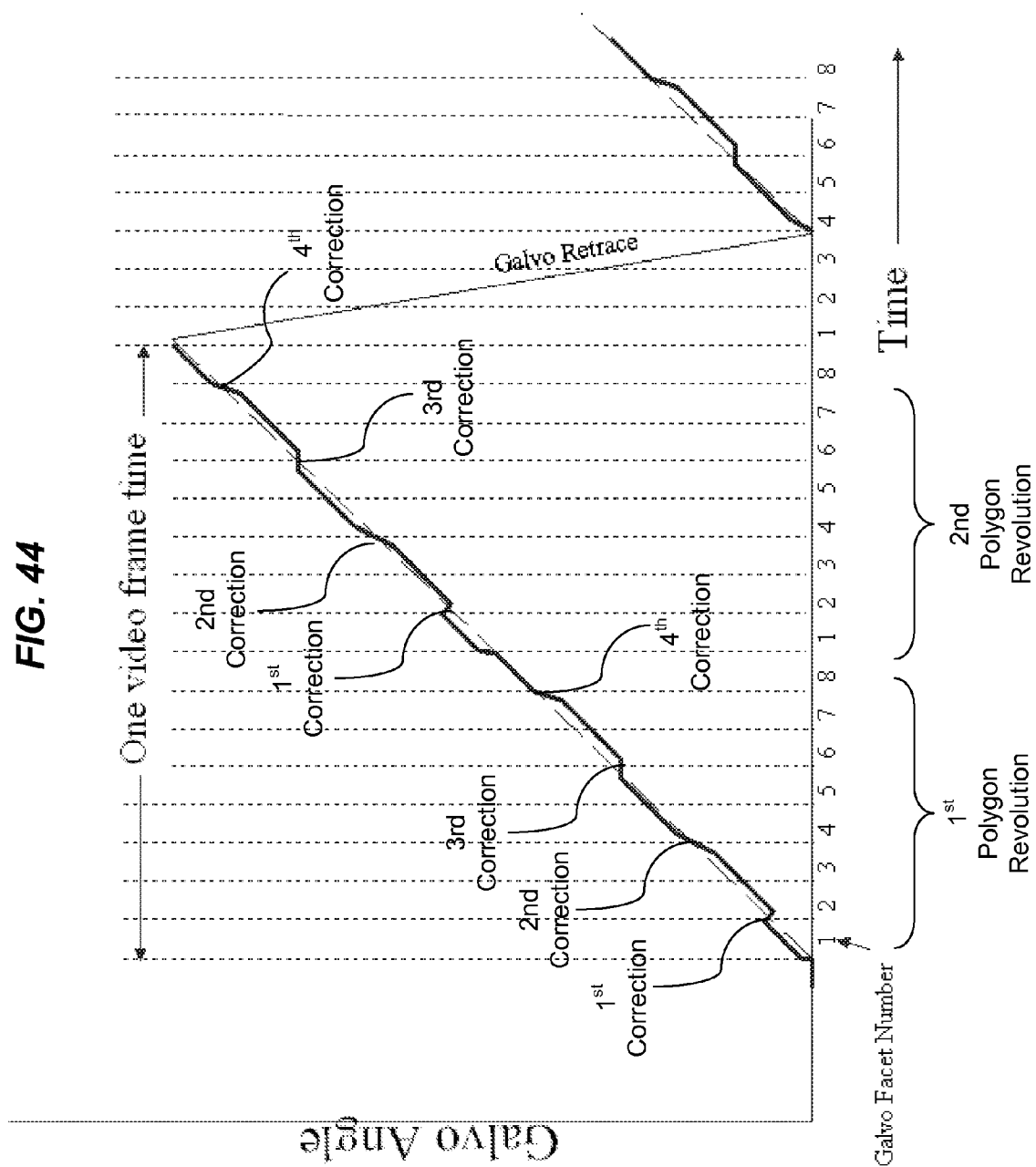
FIG. 44 shows correction of pyramidal errors in display one video frame in an example system based on the design in FIG. 43.

FIG. 44 illustrates the operation of the galvo mirror 540 in correcting pyramidal errors during the scanning for a single video frame on the screen 4301. In this example, a polygon scanner with eight facets is used as the scanner 550 and the screen 4301 is divided into sixteen vertical screen segments so that the polygon scanner 550 rotates two revolutions to scan through the entire screen and to produce a single video frame. As illustrated, each correction to the galvo angle is changed slightly between the end of one horizontal and the start of a subsequent new horizontal scan. During this transition time between the two successive horizontal scans, the laser beam is not viewable on the display. In the example, four pyramidal corrections are applied during one revolution of the polygon: a first correction at the beginning of the horizontal scan by the second facet which also applies to the next scan by the third facet, a second correction at the beginning of the horizontal scan by the fourth facet which continues to the fifth facet, and a third correction at the beginning of the horizontal scan by the sixth facet which continues to the seventh facet, and a fourth correction at the beginning of the eighth facet. The pattern for the correction has changes that are usually relatively small and form a microjog pattern. The same corrections are repeated for each revolution. In this example, the galvo retrace is done in a time for scanning through three polygon facets. The pattern in this example is slipped by three facet times, and the next video frame scan begins on facet #4. The microjog pattern repeats for each rotation of the polygon, and not for each video frame.

The microjog timing can be performed by the micro-controller in the control 4314 in FIG. 43, and the angle is increased or decreased by the amplitude and direction determined from the error signal. The polygon 550 can be configured to include a facet number sensor which provides facet ID numbers for the facets. The micro-controller receives the facet ID numbers and knows which facet on the polygon will be the next facet to direct the laser beams on the screen, and will control the galvo mirror 540 according to the sequence of the facets for the horizontal scanning.

The above pyramidal correction includes an error measurement mechanism based on vertical reference marks on the screen and optical detection of scattered or reflected light from the vertical reference marks to measure a pyramidal error of each polygon facet and an error correction mechanism that controls the vertical scanner in subsequent horizontal scans to correct the measured pyramidal error. Hence, as the pyramidal error changes, the error measurement mechanism can detect the change and thus can adjust the correction to the vertical scanner accordingly. This dynamic nature of the pyramidal correction can be used to enhance the display performance and to improve the reliability.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination. For example, based on the screen designs described above, a screen may be structured to include the first dichroic layer D1, the fluorescent layer and the contrast enhancement layer without the second dichroic layer D2. In another example, a screen may include a lenticular layer or the lens array layer with an array of parallel cylindrical lenses, and a fluorescent layer with parallel fluorescent stripes that respectively are aligned with the cylindrical lenses. Hence, screens with various structures may be formed based on various layer designs described in this application to meet specific considerations in applications.

Only a few implementations are disclosed. However, it is understood that variations and enhancements may be made.

What is claimed is:

1. A scanning beam display system, comprising:
    an optical module comprising a first scanner to scan along a first direction at least one scanning beam having optical pulses that are sequential in time and carry image information, and a second scanner having a polygon with a plurality of reflective facets, the polygon operable to rotate around a rotation axis that is along the first direction to scan the at least one scanning beam along a second direction perpendicular to the first direction;
    a screen positioned to receive the at least one scanning beam from the optical module and configured to include (1) a display region which displays images carried by the at least one scanning beam, and (2) reference marks positioned in paths along the second direction of the least one scanning beam on the screen and displaced from one another along the first direction, each reference mark operable to produce, in response to the at least one scanning beam, an optical monitor signal of light, and to direct the optical monitor signal of light to propagate in space away from the screen, the optical monitor signal of light containing information on a position offset of the least one scanning beam relative to the reference mark along the first direction on the screen when illuminated by the at least one scanning beam;
    an optical detector positioned to receive light of the optical monitor signals from the reference marks on the screen that propagate through space between the screen and the optical detector and to produce respective electrical detector signals, each detector signal containing the information on a position offset of the least one scanning beam relative to a respective reference mark along the first direction on the screen; and
    a first scanner control that measures a pyramidal error of the polygon from each detector signal and controls scanning of the first scanner to correct the position offset caused by the pyramidal error.

2. The system as in claim 1, wherein:
    the screen comprises parallel fluorescent stripes in the display region which absorb light of the at least scanning one beam to emit fluorescent light and to produce the images carried by the at least one scanning beam, and
    wherein the reference marks are located outside the display region.

3. The system as in claim 2, wherein:
    each reference mark is optically reflective.

4. The system as in claim 2, wherein:
    each reference mark is optically fluorescent to emit light of the optical monitor signal under illumination by the at least one scanning beam.

5. The system as in claim 4, wherein:
    the optical monitor signal is at a wavelength different from the fluorescent light emitted by the screen.

6. The system as in claim 1, wherein:
    the display region of the screen is free of a light-emitting fluorescent material and operates to use light of the at least one scanning beam to present the images carried by the at least one scanning beam.

7. The system as in claim 1, wherein:
    each reference mark is optically reflective.

8. The system as in claim 1, wherein:
    each reference mark is optically fluorescent to emit light of the optical monitor signal under illumination by the at least one scanning beam.

9. The system as in claim 1, wherein:
    each reference mark comprises first and second features separated from each other along the first direction and along the second direction.

10. The system as in claim 9, wherein:
    the first scanner control comprises an error signal generator that generates an error signal from first and second signal components in the detector signal that are generated by the first and second features, respectively, to indicate the position offset of the least one scanning beam relative to a respective reference mark on the screen.

11. The system as in claim 1, wherein:
    the first scanner control comprises a mechanism that identifies a facet of the polygon that generates the measured pyramidal error and controls the scanning of the second scanner to correct the position offset caused by the pyramidal error when the identified facet subsequently scans the at least one scanning beam.

12. The system as in claim 1, wherein:
    the first scanner is a galvo mirror.

13. A method for operating a scanning beam display system, comprising:
    using a first scanner to scan at least one beam of light modulated with optical pulses to carry images along a first direction on a screen and a second polygon scanner with a plurality of reflective facets to scan the at least one beam along a second, perpendicular direction on the screen to display the images;
    using a plurality of reference marks on the screen at positions that are respectively in beam scanning paths of the at least one beam at different positions along the first direction to produce optical monitor signals of light when illuminated by the at least one beam during scanning, and to direct the optical monitor signals of light to propagate in space away from the screen, each optical monitor signal of light having information on a position offset of the at least one beam relative to a respective reference mark along the first direction on the screen caused by a pyramidal error of a respective reflective facet in the polygon scanner;
    collecting light of the optical monitor signals from the reference marks on the screen to convert collected light of the optical monitor signals into respective electrical detector signals, each detector signal containing the information on the position offset corresponding to each detected optical monitor signal; and
    adjusting the scanning of the first scanner along the first direction to reduce the position offset of the at least one beam on the screen in response to the position offset in the detector signal.

14. The method as in claim 13, further comprising:
    controlling the scanning of the at least one beam to display the images in a central region of the screen; and
    making the adjusting of the scanning of the first scanner to reduce the position offset when the at least one beam is outside the central region.

15. The method as in claim 14, wherein:
the reference marks are located outside the central region.

16. The method as in claim 13, further comprising:
measuring the position offset of the least one beam relative to a respective reference mark on the screen caused by a pyramidal error of a respective reflective facet in the polygon scanner in a first scan of the at least one beam along the second direction; and
making the adjusting of the scanning of the first scanner to reduce the position offset in a subsequent scan by the respective reflective facet.

17. A scanning beam display system, comprising:
an optical module operable to produce a scanning beam of excitation light having optical pulses that are sequential in time and carry image information;
a first scanner to scan the scanning beam along a first direction;
a second scanner comprising a polygon having reflective facets and operable to spin around an axis parallel to the first direction and to use the reflective facets to scan the scanning beam along a second, perpendicular direction;
a fluorescent screen comprising a fluorescent area having a plurality of parallel fluorescent stripes each along the first direction and spatially displaced from one another along the second direction and a peripheral servo reference mark area outside the fluorescent area,
wherein fluorescent stripes absorb the excitation light and emit visible fluorescent light to produce images carried by the scanning beam, and the fluorescent area comprises a plurality of first servo reference marks producing a first feedback optical signal of light under illumination of the scanning beam to indicate a spatial alignment of the optical pulses to the fluorescent stripes along the second direction and to direct the first feedback optical signal of light to propagate in space away from the screen,
wherein the peripheral servo reference mark area comprises a plurality of second servo reference marks each producing a second feedback optical signal of light under illumination of the scanning beam indicating a position offset of the scanning beam along the first direction and to direct the second feedback optical signals of light to propagate in space away from the screen;
a first optical sensor positioned to receive light of the first feedback optical signal and to convert the received light of the first feedback optical signal into a first electrical monitor signal indicating the spatial alignment of the optical pulses relative to the fluorescent stripes along the second direction;
a second optical sensor positioned to receive light of a second feedback optical signal and to convert the received light of the second feedback optical signal into a second electrical monitor signal indicating the position offset of the scanning beam along the first direction when scanned by a respective reflective facet of the polygon; and
a control unit operable to adjust the scanning beam in response to the first and second monitor signals to control at least the spatial alignment of spatial positions of the optical pulses relative to the fluorescent stripes and to reduce the position offset of the scanning beam along the first direction.

18. The system as in claim 17, wherein:
each second servo reference mark is optically reflective.

19. The system as in claim 17, wherein:
each second servo reference mark is optically fluorescent to emit light of the second feedback optical signal under illumination by the scanning beam.

20. The system as in claim 17, wherein:
each second servo reference mark comprises first and second features separated from each other along the first direction and along the second direction.

21. The system as in claim 20, wherein:
the control unit comprises an error signal generator that generates an error signal from first and second signal components in the second feedback optical signal that are generated by the first and second features, respectively, to indicate the position offset of the at least one scanning beam relative to a respective reference mark on the screen.

22. The system as in claim 17, wherein:
the control unit comprises a mechanism that identifies a facet of the polygon that generates a pyramidal error that causes a position offset and controls the scanning of the second scanner to correct the position offset caused by the pyramidal error when the identified facet scans the scanning beam.

23. The system as in claim 17, wherein:
the optical module produces a plurality of scanning beams,
the first and second scanners scan the scanning beams along the first and second directions on the screen, and
the second scanner scans the scanning beams simultaneously with a common reflective facet along the second direction over one screen segment at a time and scans the scanning beams over the entire screen by sequentially scanning different screen segments at different times with different reflective facets.

24. The system as in claim 1, wherein:
the first scanner includes a dither mechanism which dithers the first scanner to, in addition to scanning the scanning beam along the first direction, dither the at least one scanning beam to change a beam direction back and forth along the first direction while scanning the scanning beam along the first direction; and
the first scanner control further operates to control an amount of the dithering of the first scanner and a frequency of the dithering to be higher than a frame rate of an image carried by the scanning beam to reduce an effect of the pyramidal error.

25. The system as in claim 24, comprising:
a mechanism to control a light intensity of the optical beam in a relation with pyramidal errors of different facets in the polygon scanner.

26. The system as in claim 17, wherein:
the first scanner includes a dither mechanism which dithers the first scanner to, in addition to scanning the scanning beam along the first direction, dither the scanning beam to change a beam direction back and forth along the first direction while scanning the scanning beam along the first direction; and
the control unit includes a first scanner dither control mechanism that operates to control an amount of the dithering of the first scanner and a frequency of the dithering to be higher than a frame rate of an image carried by the scanning beam to reduce an effect of the pyramidal error.

27. The system as in claim 26, comprising:
a mechanism to control a light intensity of the optical beam in a relation with pyramidal errors of different facets in the polygon scanner.

28. The method as in claim 13, comprising:

dithering the first scanner, in addition to scanning the at least one beam in the first direction, to dither a beam direction back and forth along the first direction during each scanning along the first direction at a dither frequency higher than a frame rate of an image carried by the at least one beam.

29. The method as in claim 28, comprising:

controlling a light intensity of the at least one beam in a relation with pyramidal errors of different reflective facets in the second polygon scanner.

30. The method as in claim 13, comprising:

using different facets of the second polygon scanner to scan the at least one beam to generate each scanning line in the second direction in successive frames, respectively, so that the same scanning line at a given position along the second direction in successive frames is scanned by different polygon reflective facets of the second polygon scanner onto the screen at respective positions around the given position determined by pyramidal errors of the polygon reflective facets.

* * * * *